US012516080B2

(12) United States Patent
Sun et al.

(10) Patent No.: US 12,516,080 B2
(45) Date of Patent: Jan. 6, 2026

(54) REMDESIVIR AND REMDESIVIR ANALOGS, SOLUTIONS, AND NANOPARTICLE, LIPOSOMAL, AND MICROPARTICLE COMPOSITIONS FOR TREATING VIRAL INFECTIONS

(71) Applicant: THE REGENTS OF THE UNIVERSITY OF MICHIGAN, Ann Arbor, MI (US)

(72) Inventors: Duxin Sun, Ann Arbor, MI (US); Wei Gao, Ann Arbor, MI (US); Hongxiang Hu, Ann Arbor, MI (US); Mohamed Dit Mady Traore, Ann Arbor, MI (US); Yudong Song, Ann Arbor, MI (US); Bo Wen, Ann Arbor, MI (US); Miao He, Ann Arbor, MI (US); Hebao Yuan, Ann Arbor, MI (US); Ruiting Li, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 527 days.

(21) Appl. No.: 17/995,254

(22) PCT Filed: Apr. 1, 2021

(86) PCT No.: PCT/US2021/025427
§ 371 (c)(1),
(2) Date: Sep. 30, 2022

(87) PCT Pub. No.: WO2021/202907
PCT Pub. Date: Oct. 7, 2021

(65) Prior Publication Data
US 2023/0183282 A1 Jun. 15, 2023

Related U.S. Application Data

(60) Provisional application No. 63/160,407, filed on Mar. 12, 2021, provisional application No. 63/004,122, filed on Apr. 2, 2020.

(51) Int. Cl.
| | | |
|---|---|---|
| C07H 7/06 | (2006.01) | |
| A61K 9/127 | (2025.01) | |
| A61K 9/51 | (2006.01) | |
| A61P 31/12 | (2006.01) | |

(52) U.S. Cl.
CPC .............. *C07H 7/06* (2013.01); *A61K 9/127* (2013.01); *A61K 9/5169* (2013.01); *A61P 31/12* (2018.01)

(58) Field of Classification Search
CPC ........ A61P 31/12; A61K 9/127; A61K 9/5169
See application file for complete search history.

(56) References Cited

U.S. PATENT DOCUMENTS

2016/0016980 A1* 1/2016 Cho ................... A61K 31/7042
558/179

FOREIGN PATENT DOCUMENTS

| WO | WO 2012/012465 A1 | 1/2012 | |
| WO | WO-2017218355 A1 * | 12/2017 | ............. A61K 38/00 |
| WO | WO-2017223421 A1 | 12/2017 | |

OTHER PUBLICATIONS

Cho et al.; Discovery of the First C-Nucleoside HCV Polymerase Inhibitor (GS-6620) with Demonstrated Antiviral Response in HCV Infected Patients; ACS Publications; J. Med. Chem. 2014, 57, 1812-1825 (Year: 2014).*
Yates et al.; The evolution of antiviral nucleoside analogues: A review for chemists and non-chemists. Part II: Complex modifications to the nucleoside scaffold; Elsevier; Antiviral Research 162 (2019) 5-21 (Year: 2019).*
International Search Report and Written Opinion for PCT/US21/25427. Mailed Sep. 27, 2021. 17 pages.
Cahard et al., Aryloxy phosphoramidate triesters as pro-tides. Mini Rev Med Chem. May 2004;4(4):371-81.
CAO Mild/Moderate 2019-nCOV Remdesivir RCT Feb. 12, 2020]; Available from: https://clinicaltrials.gov/ct2/show/NCT04252664. 11 pages.
Cherian et al., Perspectives for repurposing drugs for the coronavirus disease 2019. Indian J Med Res. 2020;151(2 & 3):160-171.
Cho et al., Discovery of the first C-nucleoside HCV polymerase inhibitor (GS-6620) with demonstrated antiviral response in HCV infected patients. J Med Chem. Mar. 13, 2014;57(5):1812-25.
Davies et al., Physiological parameters in laboratory animals and humans. Pharm Res. Jul. 1993;10(7):1093-5.
De Wit et al., Prophylactic and therapeutic remdesivir (GS-5734) treatment in the rhesus macaque model of MERS-CoV infection. Proc Natl Acad Sci U S A. Mar. 24, 2020;117(12):6771-6776.
D'Mello et al., The evolving landscape of drug products containing nanomaterials in the United States. Nat Nanotechnol. Jul. 2017;12(6):523-529.
Dowden et al., Trends in clinical success rates and therapeutic focus. Nat Rev Drug Discov. Jul. 2019;18(7):495-496.

(Continued)

Primary Examiner — Danah Al-Awadi
Assistant Examiner — John W Lippert, III
(74) Attorney, Agent, or Firm — Casimir Jones, S.C.; Kelly A. Barton

(57) ABSTRACT

The present invention relates to methods, compounds, and compositions for treating viral infections, including COVID-19 viral infections. In certain embodiments, the compositions comprise: i) a remdesivir analog, ii) remdesivir or a remdesivir analog, and a surfactant, a cyclodextrin, or a combination thereof, iii) nanoparticles comprising albumin and remdesivir or remdesivir analog, iv) liposomes comprising lipids and remdesivir or remdesivir analog; and/or v) microparticles comprising PLA and/or PLGA, and remdesivir or remdesivir analog. In certain embodiments, the compositions are aqueous (e.g., for intravenous administration). In other embodiments, the compositions are nebulized or in the form of a dry powder (e.g., for inhalation by an infected subject).

18 Claims, 25 Drawing Sheets

(56) References Cited

OTHER PUBLICATIONS

Emami et al., Poly(lactic acid)/poly(lactic-co-glycolic acid) particulate carriers for pulmonary drug delivery. Journal of Pharmaceutical Investigation, 2019. 49(4): p. 427-442.

FDA News Release. FDA approves a new antibacterial drug to treat a serious lung disease using a novel pathway to spur innovation. https://www.fda.gov/news-events/press-announcements/fda-approves- new-antibacterial-drug-treat-serious-lung-disease-using-novel-pathway-spur-innovation. Sep. 28, 2018. 3 pages.

Flynn et al., Correlation and prediction of mass transport across membranes. I. Influence of alkyl chain length on flux-determining properties of barrier and diffusant. J Pharm Sci. Jun. 1972;61(6):838-52.

Holshue et al., First Case of 2019 Novel Coronavirus in the United States. N Engl J Med. Mar. 5, 2020;382(10):929-936.

Ingle et al., Chapter 15—Nanotechnological applications for the control of pulmonary infections, in the Microbiology of Respiratory System Infections, K. Kon and M. Rai, Editors. 2016, Academic Press. p. 223-235.

Li et al., Butyrylcholinesterase, paraoxonase, and albumin esterase, but not carboxylesterase, are present in human plasma. Biochem Pharmacol. Nov. 25, 2005;70(11):1673-84.

Li et al., Different Nanoformulations Alter the Tissue Distribution of Paclitaxel, Which Aligns with Reported Distinct Efficacy and Safety Profiles. Mol Pharm. Oct. 1, 2018;15(10):4505-4516.

Li et al., Recent progress in drug delivery. Acta Pharm Sin B. Nov. 2019;9(6):1145-1162.

Lo et al., Remdesivir (GS-5734) protects African green monkeys from Nipah virus challenge. Sci Transl Med. May 29, 2019;11(494):eaau9242. 12 pages.

Luo et al., Distinct biodistribution of doxorubicin and the altered dispositions mediated by different liposomal formulations. Int J Pharm. Mar. 15, 2017;519(1-2):1-10.

Mehta. Dry Powder Inhalers: A Focus on Advancements in Novel Drug Delivery Systems. J Drug Deliv. 2016:2016:8290963. 18 pages.

Miele et al., Albumin-bound formulation of paclitaxel (Abraxane ABI-007) in the treatment of breast cancer. Int J Nanomedicine. 2009:4:99-105.

Mulangu et al., A Randomized, Controlled Trial of Ebola Virus Disease Therapeutics. N Engl J Med. Dec. 12, 2019;381(24):2293-2303.

Muralidharan et al., Inhalable nanoparticulate powders for respiratory delivery. Nanomedicine. Jul. 2015;11(5):1189-99.

Nikolic. Administration Routes for Nano Drugs and Characterization of Nano Drug Loading. Characterization and Biology of Nanomaterials for Drug Delivery, 2019, pp. 587-625.

Pilcer et al., Formulation strategy and use of excipients in pulmonary drug delivery. Int J Pharm. Jun. 15, 2010;392(1-2):1-19.

PubChem-CID-121304016, Remdesivir, create date Aug. 6, 2016. 36 pages.

Qin et al., Polymeric micelles for enhanced lymphatic drug delivery to treat metastatic tumors. J Control Release. Oct. 28, 2013;171(2):133-42.

Rudokas et al., Liposome Delivery Systems for Inhalation: A Critical Review Highlighting Formulation Issues and Anticancer Applications. Med Princ Pract. 2016;25 Suppl 2(Suppl 2):60-72.

Samad et al., Liposomal drug delivery systems: an update review. Curr Drug Deliv. Oct. 2007;4(4):297-305.

Sercombe et al., Advances and Challenges of Liposome Assisted Drug Delivery. Front Pharmacol. Dec. 1, 2015:6:286. 13 pages.

Sheahan et al., Broad-spectrum antiviral GS-5734 inhibits both epidemic and zoonotic coronaviruses. Sci Transl Med. Jun. 28, 2017;9(396):eaal3653. 1-10.

Sheahan et al., Comparative therapeutic efficacy of remdesivir and combination lopinavir, ritonavir, and interferon beta against MERS-CoV. Nat Commun. Jan. 10, 2020;11(1):222. 14 pages.

Siegel et al., Discovery and Synthesis of a Phosphoramidate Prodrug of a Pyrrolo[2,1-f][triazin-4-amino] Adenine C-Nucleoside (GS-5734) for the Treatment of Ebola and Emerging Viruses. J Med Chem. Mar. 9, 2017;60(5):1648-1661.

Slusarczyk et al., Phosphoramidates and phosphonamidates (ProTides) with antiviral activity. Antivir Chem Chemother. Jan.-Dec. 2018:26:2040206618775243. 31 pages.

Slusarczyk et al., Synthesis and biological evaluation of 6-substituted-5-fluorouridine ProTides. Bioorg Med Chem. Feb. 1, 2018;26(3):551-565.

Van Der Vusse. Albumin as fatty acid transporter. Drug Metab Pharmacokinet. 2009;24(4):300-7.

Wang et al., Pulmonary surfactant-biomimetic nanoparticles potentiate heterosubtypic influenza immunity. Science. Feb. 21, 2020;367(6480):eaau0810. 13 pages.

Wang et al., Remdesivir and chloroquine effectively inhibit the recently emerged novel coronavirus (2019-nCOV) in vitro. Cell Res. Mar. 2020;30(3):269-271.

Warren et al., Therapeutic efficacy of the small molecule GS-5734 against Ebola virus in rhesus monkeys. Nature. Mar. 17, 2016;531(7594):381-5.

Yates et al., The evolution of antiviral nucleoside analogues: A review for chemists and non-chemists. Part II: Complex modifications to the nucleoside scaffold. Antiviral Res. Feb. 2019:162:5-21.

Yong et al., Mononuclear phagocytes as a target, not a barrier, for drug delivery. J Control Release. Aug. 10, 2017:259:53-61.

\* cited by examiner

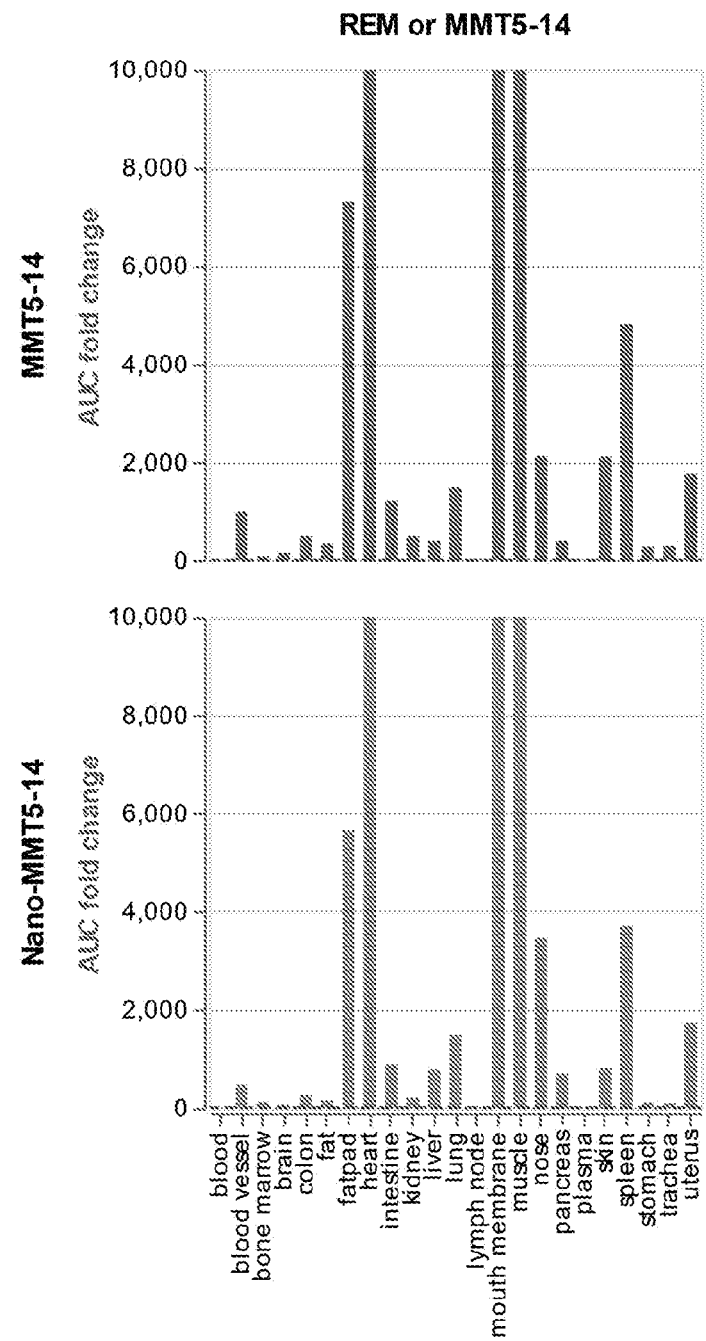

REMDESIVIR AND REMDESIVIR ANALOGS, SOLUTIONS, AND NANOPARTICLE, LIPOSOMAL, AND MICROPARTICLE COMPOSITIONS FOR TREATING VIRAL INFECTIONS

CROSS-REFERENCE TO RELATED APPLICATIONS

This application claims the benefit of U.S. Provisional Application No. 63/004,122, filed Apr. 2, 2020, and U.S. Provisional Application No. 63/160,407, filed Mar. 12, 2021, the content of each of which is herein incorporated by reference in their entirety.

FIELD OF THE INVENTION

The present invention relates to methods, compounds, and compositions for treating viral infections, including COVID-19 (SARS-CoV-2) viral infections. In certain embodiments, the compositions comprise: i) a remdesivir analog, ii) remdesivir or a remdesivir analog, and a surfactant, a cyclodextrin, or a combination thereof, iii) nanoparticles comprising albumin and remdesivir or remdesivir analog, iv) liposomes comprising lipids and remdesivir or remdesivir analog; and/or v) microparticles comprising PLA and/or PLGA, and remdesivir or remdesivir analog. In certain embodiments, the compositions are aqueous (e.g., for intravenous administration). In other embodiments, the compositions are nebulized or in the form of a dry powder (e.g., for inhalation by an infected subject).

BACKGROUND OF THE INVENTION

The pandemic of coronavirus disease 2019 (COVID-19) is not showing any sign of slowdown. Experts predict this pandemic may continue to become seasonal disease. It is critical and urgent to develop treatment options for COVID-19. Remdesivir (development code GS-5734), a novel antiviral drug in the class of nucleotide analogs, are considered to be the most promising drug to treat COVID-19[1]. The hope for remdesivir against COVID-19 is based on the following facts. (a) remdesivir has broad spectrum antiviral activity by inhibiting viral RNA synthesis[2]; (b) remdesivir has in vitro anti-COVID-19 virus activity (IC50 0.77 μM) [1]; (c) remdesivir shows efficacy against other coronavirus MERS and SARS virus in vitro and in mice[3, 4] and monkeys[5]; (d) remdesivir has been evaluated in human Ebola patients with adequate plasma exposure and safety profiles (although it failed to show efficacy against Ebola) [6]. Remdesivir was introduced on the first case of COVID-19 in the US as compassionate use when patients develop severs pneumonia. Clinical condition improvement was observed the day following the treatment [7]. Clinical trials on large number of patients are demanded to determine the clinical efficacy and safety of the drugs. Ten clinical trials[8] are undergoing, and the conclusions have not been clear [9].

Remdesivir, a prodrug of nucleoside monophosphate (Nuc-MP), is designed to improve the cell permeability of Nuc-MP and bypass the rate-limiting first phosphorylation step of nucleoside (Nuc) (FIG. 1) [2]. After cellular uptake of remdesivir by passive diffusion, remdesivir is converted into Nuc-MP by intracellular hydrolases and then forms active metabolite nucleoside triphosphate (Nuc-TP), which is expected to interfere with the activity of viral RNA-dependent RNA-polymerases (RdRp) [2]. Despite good in vitro antiviral activity for remdesivir, several shortcomings might limit its in vivo efficacy in treating COVID-19 caused Pneumonia.

SUMMARY OF THE INVENTION

The present invention relates to methods, compositions, and compounds for treating viral infections, including COVID-19 viral infections. In certain embodiments, the compositions comprise: i) a remdesivir analog, ii) remdesivir or a remdesivir analog, and a surfactant, a cyclodextrin, or a combination thereof, iii) nanoparticles comprising albumin and remdesivir or remdesivir analog, iv) liposomes comprising lipids and remdesivir or remdesivir analog; and/or v) microparticles comprising PLA and/or PLGA, and remdesivir or remdesivir analog. In certain embodiments, the compositions are aqueous (e.g., for intravenous administration). In other embodiments, the compositions are nebulized or in the form of a dry powder (e.g., for inhalation by an infected subject).

In some embodiments, provided herein are methods of treating a subject comprising: administering or providing a composition to a subject infected with a virus, wherein the composition comprises: a) a remdesivir analog, b) remdesivir or a remdesivir analog, and a surfactant, a cyclodextrin, or a combination thereof, c) a plurality of nanoparticles each comprising albumin and remdesivir or a remdesivir analog, and/or d) a plurality of liposomes each comprising lipids forming a bilayer and remdesivir or a remdesivir analog, and/or e) a plurality of microparticles each comprising: i) poly(lactic acid) (PLA) and/or poly(lactic-co-glycolic acid) (PLGA), and remdesivir or a remdesivir analog, and wherein each remdesivir analog is independently a compound of Formula I or Formula II:

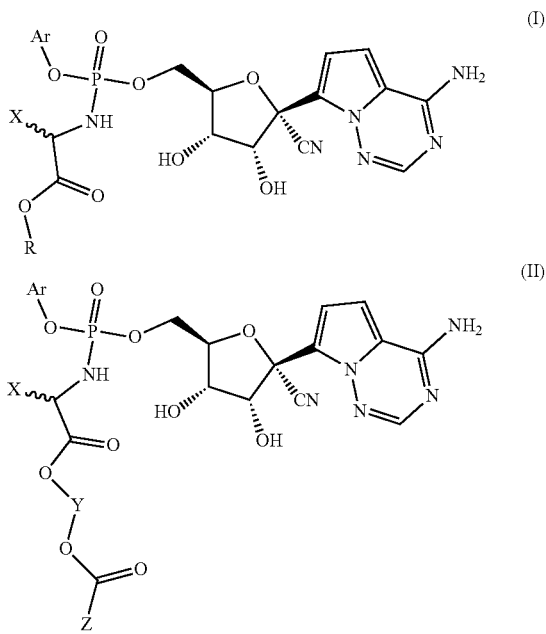

wherein X is or comprises an amino acid side chain, R is or comprises a lipid chain or benzyl (formula I), Ar is a substituted or unsubstituted aryl or heteroaryl, Y is $C_2$-$C_{20}$alkylene or $C_2$-$C_{20}$alkenylene; and Z is $C_4$-$C_{40}$alkyl, $C_4$-$C_{40}$alkenyl, or $C_4$-$C_{40}$alkynyl (formula II).

In some embodiments, the remdesivir analog is a compound of Formula Ia:

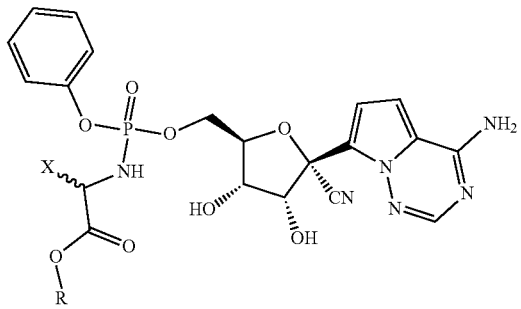

(Ia)

wherein X is or comprises an amino acid side chain and R is or comprises a lipid chain or benzyl.

In certain embodiments, the virus is SARS-CoV-2, which causes COVID-19. In particular embodiments, the subject is a human. In further embodiments, the virus is a severe acute respiratory syndrome-related coronavirus (SARS-CoV). In other embodiments, the virus is a Coronavirus or a virus that causes respiratory illness. In some embodiments, the virus is an Ebola virus. In some embodiments, the compounds inhibit viral entry to the cells and replication.

In some embodiments, the composition is in the form of an aqueous solution and wherein the administering is via intravenous injection into the subject. In other embodiments, the composition is in a nebulized form and wherein the administering comprises discharging the composition into the airway of the subject such In some embodiments, the pH is between 2 and 5 (e.g., about 2.5, about 3.0, about 3.5, about 4.0, about 4.5). In certain embodiments, the pH is between 3 and 3.5.

In some embodiments, provided herein are compositions comprising: a plurality of nanoparticles each comprising albumin and remdesivir or a remdesivir analog, wherein each remdesivir analog is independently a compound of Formula I or II:

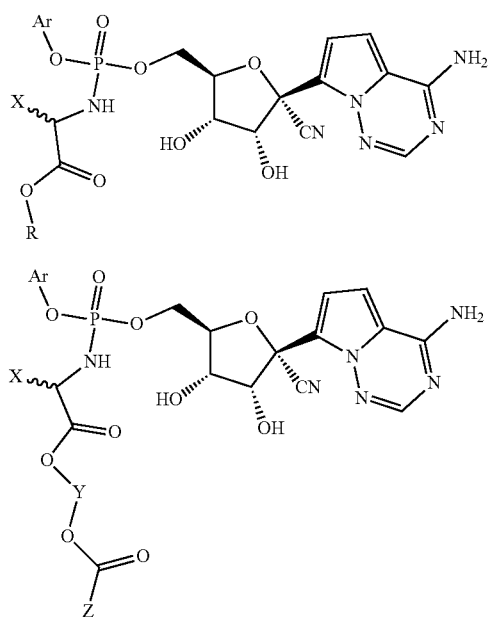

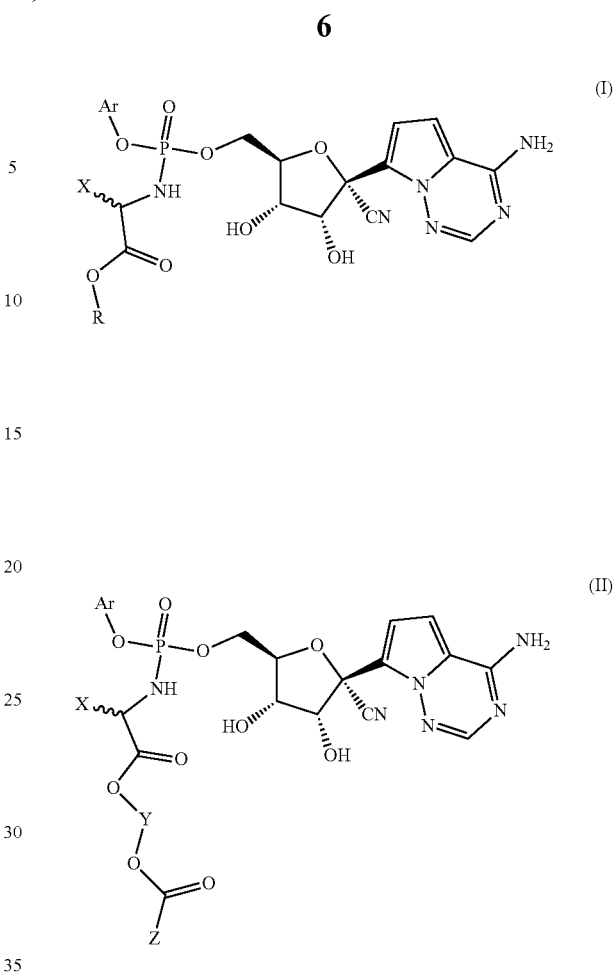

wherein X is or comprises an amino acid side chain, R is or comprises a lipid chain or benzyl, Ar is a substituted or unsubstituted aryl or heteroaryl, Y is $C_2$-$C_{20}$alkylene or $C_2$-$C_{20}$alkenylene; and Z is $C_4$-$C_{40}$alkyl, $C_4$-$C_{40}$alkenyl, or $C_4$-$C_{40}$alkynyl.

In some embodiments, the remdesivir analog is a compound of Formula Ia:

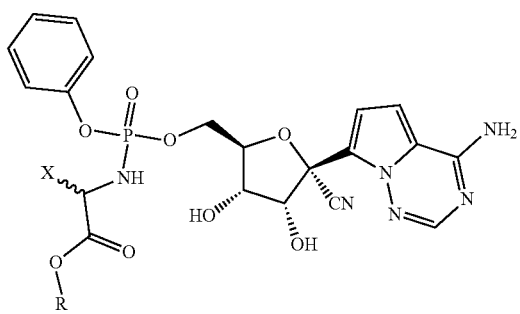

wherein X is or comprises an amino acid side chain and R is or comprises a lipid chain or benzyl.

In particular embodiments, provided herein are compositions comprising: a plurality of liposomes each comprising lipids forming a bilayer and remdesivir or a remdesivir analog, wherein each remdesivir analog is independently a compound of Formula I or II:

wherein X is or comprises an amino acid side chain, R is or comprises a lipid chain or benzyl, Ar is a substituted or unsubstituted aryl or heteroaryl, Y is $C_2$-$C_{20}$alkylene or $C_2$-$C_{20}$alkenylene, and Z is $C_4$-$C_{40}$alkyl, $C_4$-$C_{40}$alkenyl, or $C_4$-$C_{40}$alkynyl.

In some embodiments, the remdesivir analog is a compound of Formula Ia:

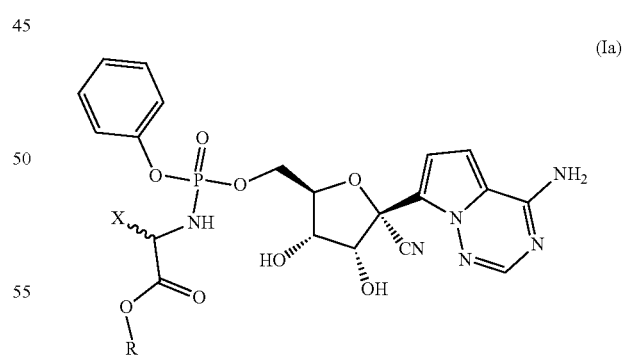

wherein X is or comprises an amino acid side chain and R is or comprises a lipid chain or benzyl.

In particular embodiments, provided herein are compositions comprising: a plurality of microparticles each comprising: i) poly(lactic acid) (PLA) and/or poly(lactic-co-glycolic acid) (PLGA), and remdesivir or a remdesivir analog, wherein each remdesivir analog is independently a compound of Formula I or II:

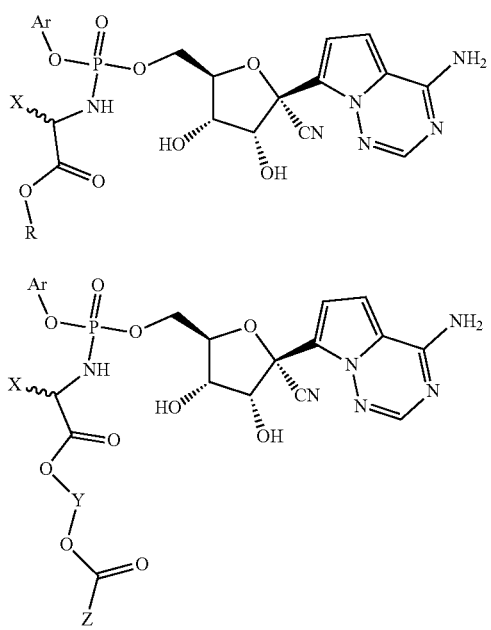
(I)

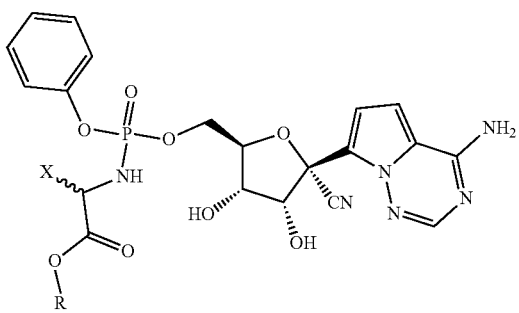
(II)

wherein X is or comprises an amino acid side chain, R is or comprises a lipid chain, Ar is a substituted or unsubstituted aryl or heteroaryl, Y is $C_2$-$C_{20}$alkylene or $C_2$-$C_{20}$alkenylene, and Z is $C_4$-$C_{40}$alkyl, $C_4$-$C_{40}$alkenyl, or $C_4$-$C_{40}$alkynyl.

In some embodiments, the remdesivir analog is a compound of Formula Ia:

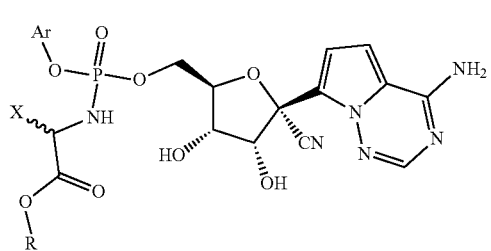
(Ia)

wherein X is or comprises an amino acid side chain and R is or comprises a lipid chain or benzyl.

In further embodiments, provided herein are compositions comprising a compound of Formula I or Formula II:

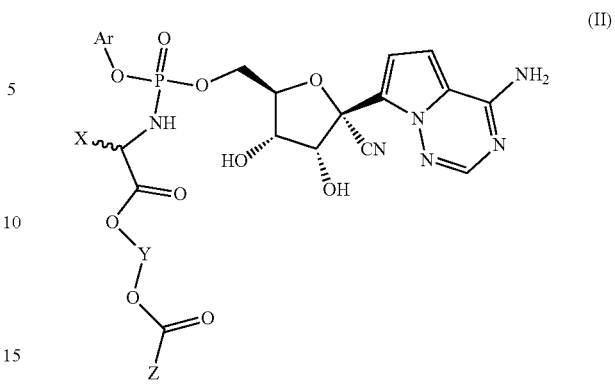
(I)

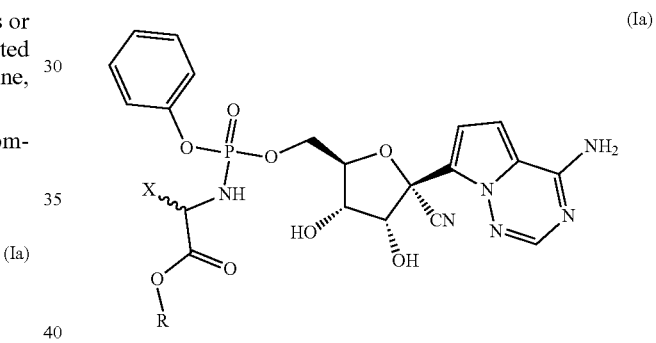
(II)

wherein X is or comprises an amino acid side chain, R is or comprises a lipid chain or benzyl, Ar is a substituted or unsubstituted aryl or heteroaryl, Y is $C_2$-$C_{20}$alkylene or $C_2$-$C_{20}$alkenylene, and Z is $C_4$-$C_{40}$alkyl, $C_4$-$C_{40}$alkenyl, or $C_4$-$C_{40}$alkynyl.

In some embodiments, the remdesivir analog is a compound of Formula Ia:

(Ia)

wherein X is or comprises an amino acid side chain and R is or comprises a lipid chain or benzyl.

In certain embodiments, the plurality of nanoparticles each have a diameter between 50 and 200 nm. In other embodiments, in each of the nanoparticles, the albumin forms a shell surrounding the remdesivir or remdesivir analog. In certain embodiments, the compositions further comprise water (e.g., sterile saline). In other embodiments, the albumin is human serum albumin. In certain embodiments, the crystal form of remdesivir or remdesivir analog in the nanoparticles is amorphous solid.

In some embodiments, the molar ratio of the remdesivir or remdesivir analog to the lipids is about 0.0001:1 to about 0.5:1 (e.g., 0.0001:1 . . . 0.01 . . . 0.5:1). In other embodiments, the molar ratio of the remdesivir or remdesivir analog to the lipids is about 0.01:1 to about 0.5:1. In other embodiments, the molar ratio of the remdesivir or remdesivir analog to the albumin is about 0.05:1 to about 1:1. In certain embodiments, the plurality of liposomes each have a diameter between 50 and 200 nm (e.g., 50 . . . 75 . . . 125 . . . 175 . . . 200 nm). In some embodiments, the composition comprises the plurality of nanoparticles. In other embodiments, the composition comprises the plurality of liposomes.

Provided herein are compounds of Formula I:

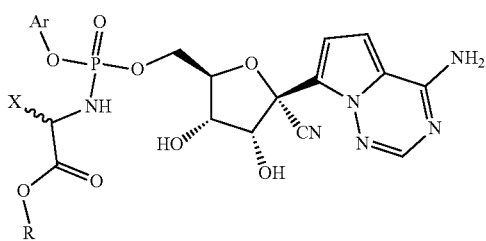

(I)

wherein X is or comprises an amino acid side chain, R is or comprises a lipid chain or benzyl, and Ar is a substituted or unsubstituted aryl or heteroaryl.

In some embodiments, the compound is a compound of Formula Ia:

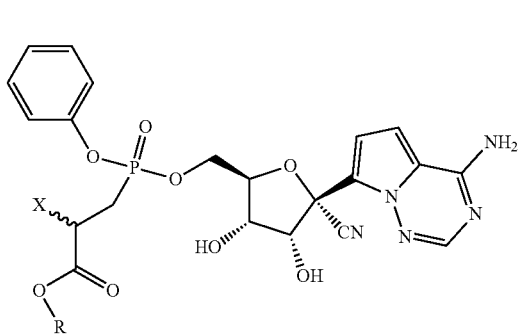

(Ia)

wherein X is or comprises an amino acid side chain and R is or comprises a lipid chain or benzyl.

Also provided herein are compounds of Formula II:

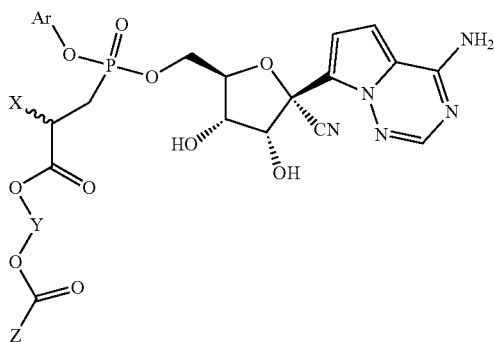

(II)

wherein X is or comprises an amino acid side chain, Y is $C_2$-$C_{20}$alkylene or $C_2$-$C_{20}$alkenylene; Z is $C_4$-$C_{40}$alkyl, $C_4$-$C_4$-alkenyl, or $C_4$-$C_{40}$alkynyl, and Ar is a substituted or unsubstituted aryl or heteroaryl.

In additional embodiments, the X in Formula I, Ia, or II is or comprises an alanine side chain. In other embodiments, the X in Formula I, Ia, or II is or comprises a tryptophan side chain. In additional embodiments, the X in Formula I, Ia, or II is or comprises a phenylalanine side chain. In additional embodiments, the X in Formula I, Ia, or II is or comprises an amino acid side chain selected from the group consisting of: alanine, phenylalanine, valine, leucine, isoleucine, methionine, tryptophan, proline, glycine, cysteine, glutamine, asparagine, serine, tyrosine, threonine.

In some embodiments, the R in Formula I, Ia, or II is or comprises a lipid chain with 4 to 30 carbons. In additional embodiments, the R in Formula I, Ia, or II is derived from di-aliphatic chain lipids, phospholipids, sphingolipids, diglycerides, di-aliphatic glycolipids, sphingomyelin, glycosphingolipid, steroidal lipids, hydrophilic polymer derivatized lipids, a fatty alcohol, or mixtures thereof. Fatty alcohols include, for example, 1) Normal chain alcohols (saturated): Ethanol, 1-Propanol, 1-Butanol, 1-Hexanol, 1-Pentanol, 1-Heptanol, 1-Octanol, 1-Nonanol, 1-Decanol, 1-Undecanol, 1-Dodecanol, 1-Tridecanol, 1-Tetradecanol, 1-Pentadecanol, 1-Hexadecanol, 1-Heptadecanol, l-Octadecanol, 1-Nonadecanol, 1-Eicosanol, 1-Heneicosanol, 1-Docosanol, 1-Tricosanol, 1-Tetracosanol, 1-Hexacosanol, 1-Octacosanol, 1-Triacontanol; and (unsaturated) 3-Buten-1-ol, Crotyl Alcohol (cis- and trans-), cis-2-Penten-1-ol, 4-Penten-1-ol, 2,4-Hexadien-1-o, cis-3-Hexen-1-ol, trans-2-Hexen-1-ol, 5-Hexen-1-ol, cis-2-Hexen-1-ol, cis-4-Hexen-1-ol, trans-2-Hepten-1-ol, cis-4-Hepten-1-ol, 6-Hepten-1-ol, trans-2-Octen-1-ol, cis-3-Octen-1-ol, cis-5-Octen-1-ol, 7-Octen-1-ol, cis-6-Nonen-1-ol, cis-2-Nonen-1-ol, trans-2-Nonen-1-o, cis-3-Nonen-1-ol, 8-Nonen-1-ol, 9-Decen-1-ol, cis-4-Decen-1-ol, trans-5-Decen-1-ol, 10-Undecen-1-ol, trans-2-Tridecen-1-o, Linoleyl Alcohol, Oleyl Alcohol, trans-9-Octadecenol, trans-2-Dodecenol, cis-13-Docosenol. Others include: Branched-chain alcohols. Classes include Phthiocerols; Isopranols (such as tetrahydrogeraniol, farnesol or phytanol); Polyprenols (such as geraniol, farnesol, geranylgeraniol or geranylfarnesol). Still other include Phenolic alcohols. Classes include monolignols (such as coniferyl alcohol, sinapyl alcohol), phenol phthiocerol Cyclic alcohols; such as 3-(4-methylfuran-3-yl) propan-1-ol.

In some embodiments, Y is $C_2$alkylene, $C_3$alkylene, $C_4$alkylene, $C_5$alkylene, $C_6$alkylene, $C_7$alkylene, $C_8$alkylene, $C_9$alkylene, $C_{10}$alkylene, $C_{12}$alkylene, $C_{14}$alkylene, or $C_{16}$alkylene.

In some embodiments, Y is $C_2$-$C_{10}$alkylene. In some embodiments, Y is $C_4$alkylene.

In some embodiments, Y is $C_2$-$C_{10}$alkenylene. In some embodiments, X is $C_2$, $C_3$, $C_4$, $C_5$, $C_6$, $C_7$, $C_8$, $C_9$, or $C_{10}$ alkenylene.

In some embodiments, Z is $C_4$-$C_{20}$alkyl or $C_4$-$C_{20}$alkenyl. In some embodiments, Z is $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$alkenyl. In select embodiments, Z is $C_4$-$C_{10}$alkyl. In some embodiments, X is $C_4$, $C_5$, $C_6$, $C_7$, $C_8$, $C_9$, or $C_{10}$alkyl.

In some embodiments, the Z in Formula II is derived from a fatty acid with 4 to 30 carbons. In additional embodiments, the Z in Formula II is derived from a fatty acid moiety selected from the group consisting of: Fatty Acids: 1) Saturated Fatty Acids: Acetic acid, Propionic acid, Butyric acid, Valeric acid, Hexanoic acid, Heptanoic acid, n-Octanoic acid, Nonanoic acid, Decanoic acid, Undecanoic acid, Lauric acid, Tridecanoic acid, Myristic acid, Pentadecanoic acid, Palmitic acid, Heptadecanoic acid, Stearic acid, Nonadecanoic acid, Arachidic acid, Heneicosanoic acid, Behenic acid, Tricosanoic acid, Lignoceric acid, Pentadecanoic acid, Cerotic acid, Heptacosanoic acid, Octacosanoic acid, Nonacosanoic acid, and Melissic acid. 2) Unsaturated Fatty acid: Crotonic Acid, trans-2-Pentenoic Acid, trans-3-Pentenoic Acid, trans-2-Hexenoic Acid, trans-3-Hexenoic Acid, 2-Heptenoic Acid (contains 3-Heptenoic Acid), 3-Heptenoic Acid, trans-2-Octenoic Acid, 3-Octenoic Acid, 2-Nonenoic Acid, 3-Nonenoic Acid, trans-2-Decenoic Acid, 3-Decenoic Acid, 4-Decenoic Acid, 2-Undecenoic Acid, 10-Undecenoic Acid, 2-Tridecenoic Acid, Gaidic Acid, Palmitoleic Acid, Elaidic Acid, Petroselinic Acid, Oleic Acid, Ricinoleic Acid, Erucic Acid, cis-15-Tetracosenoic Acid, Sorbic Acid, Linoleic Acid, Linoleic Acid, γ-Linolenic Acid, Dihomo-γ-linolenic Acid, Linolenic Acid, Arachidonic Acid, EPA, DHA; 3) Fatty Dicarboxylic Acids: Glutaric Acid, Adipic Acid, Suberic Acid, Azelaic Acid, Sebacic Acid, 1,9-Nonanedicarboxylic Acid, Dodecanedioic Acid, Tetradecanedioic Acid, Hexadecanedioic Acid, Octadecanedioic Acid, and Nonadecanedioic Acid.

In some embodiments, Ar is unsubstituted phenyl.

In some embodiments, Ar is substituted phenyl. In some embodiments, Ar is phenyl substituted with —COOM, wherein M is hydrogen or $C_1$-$C_6$alkyl. In some embodiments, Ar is phenyl substituted with —$NL^1L^2$, wherein each of $L^1$ and $L^2$ is independently selected from hydrogen and $C_1$-$C_6$alkyl. In some embodiments, Ar is phenyl substituted with —COOM, wherein M is hydrogen or $C_1$-$C_6$alkyl and —$NL^1L^2$, wherein each of $L^1$ and L is independently selected from hydrogen and alkyl. In certain embodiments, Ar is a phenyl substituted with —COOH and —$NH_2$.

In certain embodiments, Ar is

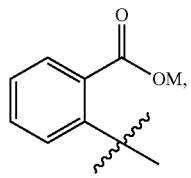

wherein M is hydrogen or $C_1$-$C_6$alkyl. In certain embodiments, Ar is

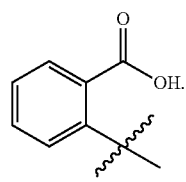 [SMILES: *c1ccccc1C(=O)O]

In certain embodiments, Ar is

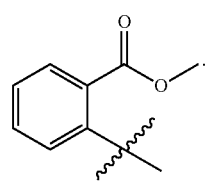 [SMILES: *c1ccccc1C(=O)OC]

In certain embodiments, Ar is

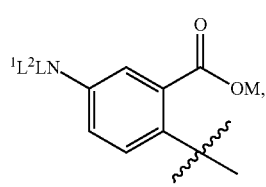

wherein M is hydrogen or $C_1$-$C_6$alkyl and each of $L^1$ and $L^2$ is independently selected from hydrogen and $C_1$-$C_6$alkyl. In certain embodiments, Ar is

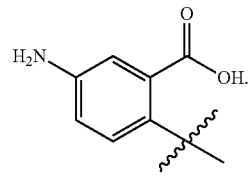 [SMILES: *c1ccc(N)cc1C(=O)O]

In certain embodiments, Ar is

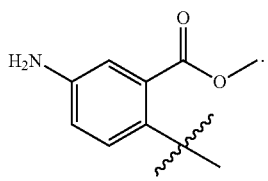 [SMILES: *c1ccc(N)cc1C(=O)OC]

In some embodiments, Ar is unsubstituted naphthyl.

In certain embodiments, each of the plurality of microparticles have a diameter between 5 and 30 μm (e.g., 5 . . . 10 . . . 15 . . . 25 . . . or 30 um). In other embodiments, the composition comprises the plurality of microparticles and is in the form of a dry powder. In particular embodiments, the composition comprises the plurality of microparticles, and the microparticles are: solid microparticles, porous microparticles, or nano-in-microparticles. In some embodiments, the composition comprises the plurality of liposomes. In other embodiments, the composition comprises the plurality of microparticles.

DESCRIPTION OF THE DRAWINGS

FIG. 1 shows the chemical structures of GS-5734 (remdesivir) and metabolic conversion to NTP.

FIG. 2 shows nano-in-micro particles of remdesivir and new analogs for dry powder inhalation.

Figure 3:
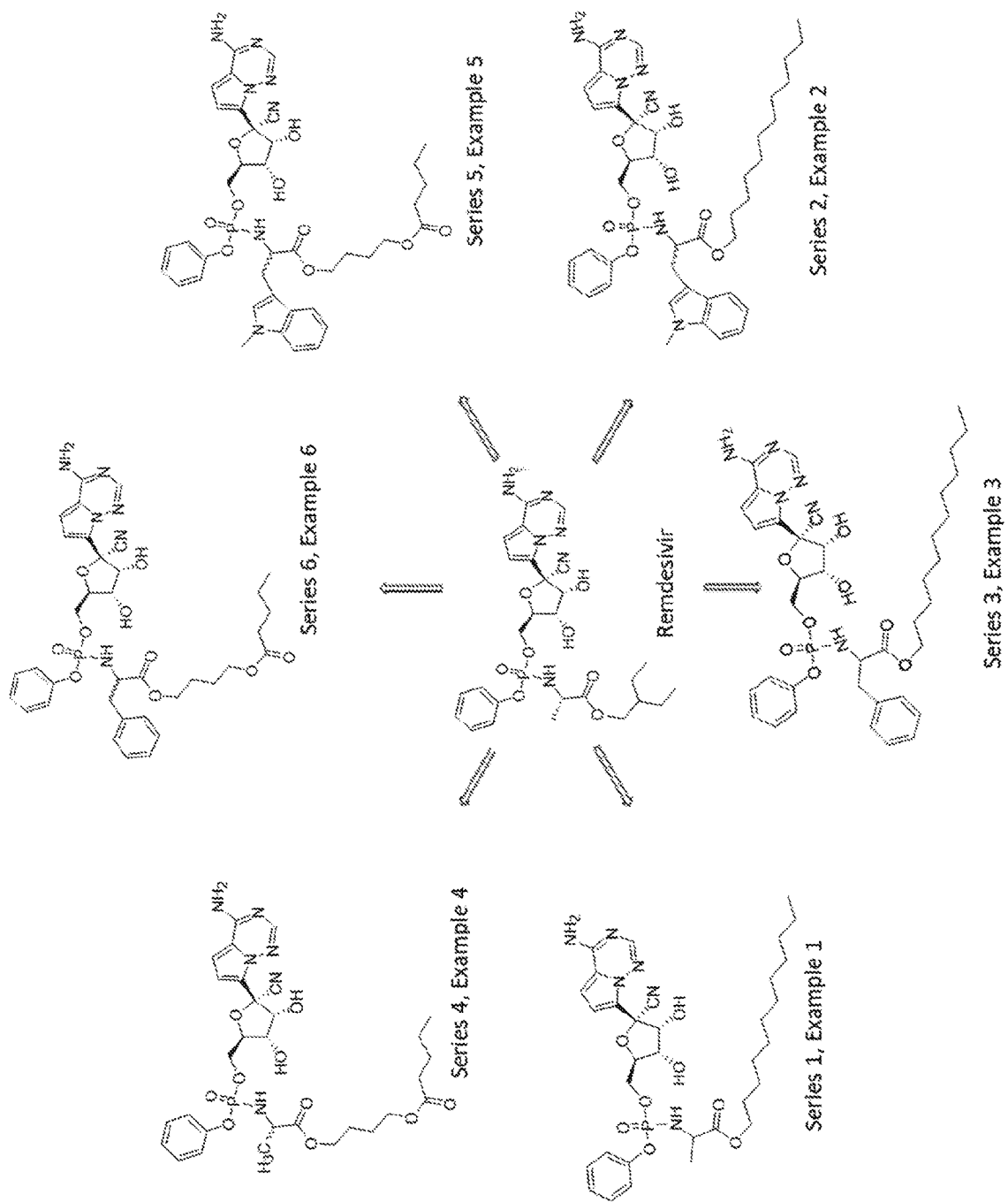
FIG. 3 shows exemplary remdesivir analogs.
Figure 4:
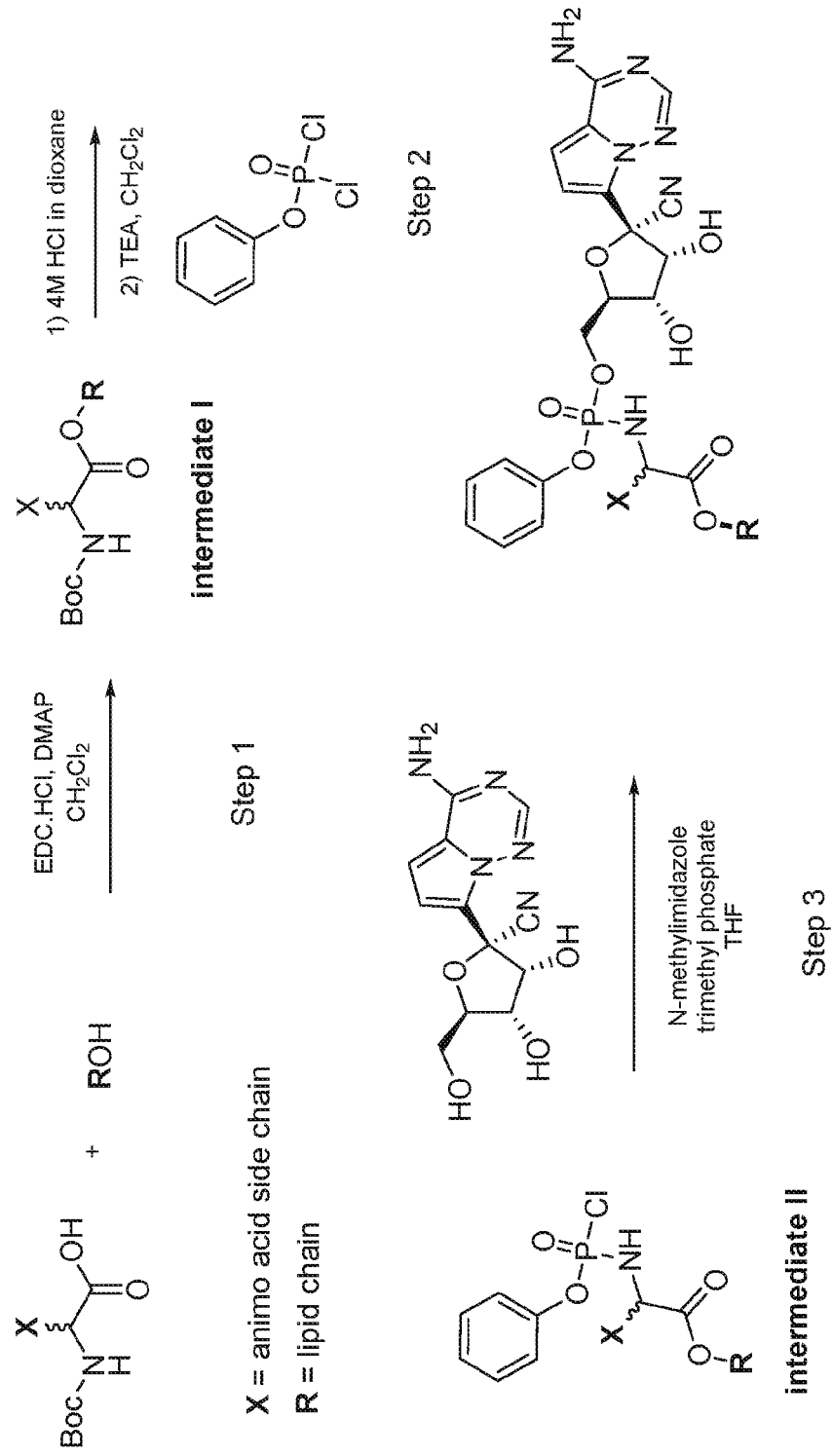
FIG. 4 shows an exemplary synthesis scheme for the remdesivir analogs of Formula Ia disclosed herein.

FIG. 5 shows an exemplary synthesis scheme for the remdesivir analogs of Formula II disclosed herein.

FIG. 6 shows an exemplary synthesis scheme for the remdesivir analogs of Formula I disclosed herein.

FIG. 7 is graphs of the stability of synthesized compounds in plasma of human, hamster, and mouse.

FIGS. 8A and 8B is graphs of screening and selection of compounds targeting the lung.

FIGS. 9A-9H are graphs of tissue targeting of two formulations of MMT5-14 and remdesivir.

FIGS. 10A-10F show AUC comparisons of tissue targeting of two formulations of MMT5-14 and remdesivir.

FIGS. 11A and 11B show the fold increase of tissue targeting of two formulations of MMT5-14 and remdesivir.

FIG. 12 shows the cellular uptake of two formulations of MMT5-14 and remdesivir.

DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, the terms "host," "subject" and "patient" refer to any animal, including but not limited to, human and non-human animals (e.g., dogs, cats, cows, horses, sheep, poultry, fish, etc.) that is studied, analyzed, tested, diagnosed, or treated. As used herein, the terms "host," "subject" and "patient" are used interchangeably, unless indicated otherwise. In certain embodiments, the subject is a human (e.g., a human with a viral infection, such as COVID-19 infection).

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein.

Additionally, general principles of organic chemistry, as well as specific functional moieties and reactivity, are described in Organic Chemistry, Thomas Sorrell, University Science Books, Sausalito, 1999; Smith and March March's Advanced Organic Chemistry, 5$^{th}$ Edition, John Wiley & Sons, Inc., New York, 2001; Larock, Comprehensive Organic Transformations, VCH Publishers, Inc., New York, 1989; Carruthers, Some Modern Methods of Organic Synthesis, 3$^{rd}$ Edition, Cambridge University Press, Cambridge, 1987; the entire contents of each of which are incorporated herein by reference.

The term "aliphatic" or "aliphatic group," as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms, 1-8 carbon atoms, 1-6 carbon atoms, 1-4 carbon atoms, 1-3 carbon atoms, or 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "alkyl," as used herein, means a straight or branched, saturated hydrocarbon chain. For example, $C_4$-$C_{40}$alkyl means a straight or branched, saturated hydrocarbon chain containing from 4 to 40 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, 4,4-dimethylpentan-2-yl, n-heptyl, n-octyl, n-nonyl, and n-decyl.

The term "alkenyl," as used herein, means a straight or branched, hydrocarbon chain containing at least one carbon-carbon double bond.

The term "alkynyl," as used herein, means a straight or branched, hydrocarbon chain containing at least one carbon-carbon triple bond.

The term "alkenylene," as used herein, refers to a divalent group derived from a straight or branched chain hydrocarbon having at least one carbon-carbon double bond.

The term "alkylene," as used herein, refers to a divalent group derived from a straight or branched chain saturated hydrocarbon of 1 to 20 carbon atoms.

The term "amino acid side chain," as used herein, refers to a moiety which is attached to the α-carbon (or another backbone atom) of an amino acid or amino acid residue. For example, the amino acid side chain for alanine is methyl, the amino acid side chain for phenylalanine is phenylmethyl, the amino acid side chain for cysteine is thiomethyl, the amino acid side chain for aspartate is carboxymethyl, and the amino acid side chain for tyrosine is 4-hydroxyphenylmethyl.

As used herein, the term "aryl" refers to an aromatic carbocyclic ring system having a single ring (monocyclic) or multiple rings (bicyclic or tricyclic) including fused ring systems, and zero heteroatoms. The term "aryl," as used herein, contains 6-20 carbon atoms ($C_6$-$C_{20}$ aryl), 6 to 14 ring carbon atoms ($C_6$-$C_{14}$ aryl), 6 to 12 ring carbon atoms ($C_6$-$C_{12}$ aryl), or 6 to 10 ring carbon atoms ($C_6$-$C_{10}$ aryl). Representative examples of aryl groups include, but are not limited to, phenyl, naphthyl, anthracenyl, and phenanthrenyl.

The term "benzyl," as used herein, refers to a group having the structure $C_6H_5CH_2$—.

The term "fatty acid chain," as used herein, refers to a molecule, an ester or residue thereof, that is derived from a triglyceride or phospholipid and is comprised of a carboxylic acid with a long aliphatic tail (chain) which is either saturated or unsaturated. The fatty acid chain can have any degree of unsaturation and at any position within the tail. Most naturally occurring fatty acids have a chain of an even number of carbon atoms, usually greater than 4 carbon atoms. Short chain fatty acids (SCFA) are fatty acids with aliphatic tails of fewer than six carbons. Medium chain fatty acids (MCFA) are fatty acids with aliphatic tails of 6-12 carbons which can form medium chain triglycerides. Long chain fatty acids (LCFA) are fatty acids with aliphatic tails 13 to 21 carbons. Very long chain fatty acids (VLCFA) are fatty acids with aliphatic tails longer than 22 carbons. In some embodiments, the fatty acid chain, or ester or residue thereof, can contain 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 carbon atoms, where any of the stated values can form an upper or lower endpoint when appropriate.

The term "heteroaryl," as used herein, refers to an aromatic monocyclic ring or an aromatic bicyclic ring system. The aromatic monocyclic rings are five or six membered rings containing at least one heteroatom independently selected from the group consisting of N, O and S (e.g., 1, 2, 3, or 4 heteroatoms independently selected from O, S, and N). The five membered aromatic monocyclic rings have two double bonds and the six membered six membered aromatic monocyclic rings have three double bonds. The bicyclic heteroaryl groups are exemplified by a monocyclic heteroaryl ring appended to the parent molecular moiety and fused to a monocyclic cycloalkyl group, as defined herein, a monocyclic aryl group, as defined herein, a monocyclic heteroaryl group, as defined herein, or a monocyclic heterocycle, as defined herein. Representative examples of heteroaryl include, but are not limited to, indolyl, pyridinyl, pyrimidinyl, pyrazinyl, pyridazinyl, pyrazolyl, pyrrolyl, benzopyrazolyl, 1,2,3-triazolyl, 1,3,4-thiadiazolyl, 1,2,4-thiadiazolyl, 1,3,4-oxadiazolyl, 1,2,4-oxadiazolyl, imidazolyl, thiazolyl, isothiazolyl, thienyl, benzimidazolyl, benzothiazolyl, benzoxazolyl, benzoxadiazolyl, benzothienyl, benzofuranyl, isobenzofuranyl, furanyl, oxazolyl, isoxazolyl, purinyl, isoindolyl, quinoxalinyl, indazolyl, quinazolinyl, 1,2,4-triazinyl, 1,3,5-triazinyl, isoquinolinyl, quinolinyl, 6,7-dihydro-1,3-benzothiazolyl, imidazo[1,2-a]pyridinyl, and naphthyridinyl.

The term "lipid chain," as used herein, refers to saturated or unsaturated hydrocarbon chains derived from hydrophobic tails of lipids, for example alkyl, alkenyl or alkynyl chains, as described elsewhere herein. The lipid chain may be derived from di-aliphatic chain lipids, phospholipids, diglycerides, di-aliphatic glycolipids, sphingomyelin, glycosphingolipid, steroidal lipids, or hydrophilic polymer derivatized lipids. In some embodiments, the lipid chain comprises 4 to 40 carbons, e.g., 4 to 20 carbons, 10 to 40 carbons, 10 to 30 carbons, 10 to 20 carbons, or 20 to 30 carbons.

The term "substituted" refers to a group that may be further substituted with one or more substituent groups. Substituent groups include, but are not limited to, halogen, =O (oxo), =S (thioxo), cyano, nitro, fluoroalkyl, alkoxyfluoroalkyl, fluoroalkoxy, alkyl, alkenyl, alkynyl, haloalkyl, haloalkoxy, heteroalkyl, cycloalkyl, cycloalkenyl, aryl, heteroaryl, heterocycle, cycloalkylalkyl, heteroarylalkyl, arylalkyl, hydroxy, hydroxyalkyl, alkoxy, alkoxyalkyl, alkylene, aryloxy, phenoxy, benzyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, —COOH, ketone, amide, carbamate, and acyl. For example, if a group is described as being "optionally substituted" (such as an alkyl, alkenyl, alkynyl, aryl, heteroaryl, cycloalkyl, heteroalkyl, heterocycle or other group such as an R group), it may have 0, 1, 2, 3, 4 or 5 substituents independently selected from halogen, =O (oxo), =S (thioxo), cyano, nitro, fluoroalkyl, alkoxyfluoroalkyl, fluoroalkoxy, alkyl, alkenyl, alkynyl, haloalkyl, haloalkoxy, heteroalkyl, cycloalkyl, cycloalkenyl, aryl, heteroaryl, heterocycle, cycloalkylalkyl, heteroarylalkyl, arylalkyl, hydroxy, hydroxyalkyl, alkoxy, alkoxyalkyl, alkylene, aryloxy, phenoxy, benzyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, —COOH, ketone, amide, carbamate, and acyl.

In some instances, the number of carbon atoms in a hydrocarbyl substituent (e.g., alkyl and alkenyl) is indicated by the prefix "$C_x$-$C_y$", wherein x is the minimum and y is the maximum number of carbon atoms in the substituent. Thus, for example, "$C_1$-$C_3$alkyl" refers to an alkyl substituent containing from 1 to 3 carbon atoms.

For compounds described herein, groups and substituents thereof may be selected in accordance with permitted valence of the atoms and the substituents, such that the selections and substitutions result in a stable compound, e.g., which does not spontaneously undergo transformation such as by rearrangement, cyclization, elimination, etc.

When substituent groups are specified by their conventional chemical formula, written from left to right, such a formula also encompasses the same substituent that would result from writing the structure from right to left. For example, —CH$_2$NH— is also intended to encompass —NHCH$_2$—.

DETAILED DESCRIPTION OF THE INVENTION

The present invention relates to methods and compositions for treating viral infections, including COVID-19 viral infections. In certain embodiments, the compositions comprise: i) a remdesivir analog with tissue targeting and antiviral activities including inhibition of viral entry and viral replication, ii) remdesivir or a remdesivir analog, and a surfactant, a cyclodextrin, or a combination thereof, iii) nanoparticles comprising albumin and remdesivir or remdesivir analog, iv) liposomes comprising lipids and remdesivir or remdesivir analog; and/or v) microparticles comprising PLA and/or PLGA, and remdesivir or remdesivir analog. In certain embodiments, the compositions are aqueous (e.g., for intravenous administration (i.v.)). In other embodiments, the compositions are nebulized or in the form of a dry powder (e.g., for inhalation by an infected subject).

Prodrug remdesivir is not stable and is rapidly hydrolyzed to nucleoside monophosphate (Nuc-MP) [10, 11]. Only prodrug remdesivir have potential to distribute and penetrate to tissue. However, nucleoside monophosphate (Nuc-MP) is charged and polar in plasma, thus cannot penetrate membrane to enter cells to show efficacy (unless it is taken up by a transporter that is unknown and less likely since Nuc-MP did not show activity).

When remdesivir was i.v. administered to monkey (10 mg/kg, equivalent to 100-200 mg in human), remdesivir plasma concentration was several micromolar and quickly decreased below 0.5 μM in 30 min [2]. The plasma nucleoside monophosphate (Nuc-MP) concentration was around 0.5-1 μM for 12-24 hrs. The plasma exposure of both prodrug remdesivir and nucleoside monophosphate (Nuc-MP) is misleading to predict its efficacy.

The active metabolite nucleoside triphosphate (Nuc-TP) can only be formed intracellularly by nucleoside phosphate kinase, which cannot be detected in plasma, but can only be detected in blood cells such as PBMC at high concentrations (30-40 PM) [2]. This is indeed helpful to inhibit the COVID-19 virus in PBMC (or may be even in lymphocytes) since COVID-19 patients indeed have low lymphocytes count[4]. However, the high intracellular concentration of Nuc-TP in PBMC may not translate high intracellular concentration in the lung cells.

The treating of COVID-19 induced Pneumonia requires drug accumulation in lung, especially the alveolus where the virus mainly attacked, so the low accumulation of remdesivir in lung by i.v. injection will limit its efficacy [2, 10]. However, any polar molecule will have high plasma exposure (high concentration and AUC), but it may have very limited tissue exposure based on the mass balance principle of pharmacokinetics. This is likely the reason for many polar molecules to have high plasma exposure and good safety profiles because they do accumulate in organs. In such cases, the high plasma exposure (low tissue exposure) may result in poor efficacy. This phenomenon is often overlooked in the drug discovery and development process, where the high plasma exposure is often used as good surrogate as tissue exposure, which is selected as good drug candidate for efficacy studies. Although many drug plasma exposures are a good predictor, many others (may be more than 30% cases, as seen for remdesivir) are not.

Preclinical data in mice (25-50 mg/kg) and in monkey (10 mg/kg), which is equivalent to 100-200 mg dose in human, did not achieve measurable concentration of remdesivir in the lung [2, 3], while only low concentration (0.8-1.5 µM in the lung of the monkey, ~3 µM in the lung of mice) of active metabolite nucleoside triphosphate (Nuc-TP) is detected in the lung [2, 3]. Based on the physio-chemical properties of remdesivir and its stability in the plasma, these low concentrations in the lung are expected, which raises the question for remdesivir's efficacy to treat COVID-19 with mild/severe/critical pneumonia.

The inactive prodrug remdesivir needs to enter intracellular lung cells and form active metabolite nucleoside triphosphate (Nuc-TP) for its antiviral activity. Consequently, the newly formed Nuc-TP is negatively charged and accumulated intracellularly, which is >25-100 folds higher than extracellular concentration of remdesivir. This phenomenon is confirmed in multiple human and rhesus monkey cells (PBMC, monocytes, Hela, microphage, and HUVEC)[2]. In another study with B24 cells, the intracellular Nuc-TP accumulates more than 3-fold to extracellular remdesivir [10]. On average, it is reasonable to assume that the intracellular Nuc-TP accumulates more than 10-fold to extracellular remdesivir. Therefore, the in vitro $EC_{50}$ (0.77 µM) and $EC_{90}$ (1.76 IM) of remdesivir against COVID-19 virus cell lines [1] are at least equivalent to the $EC_{50}$ (>7.7 µM) and $EC_{90}$ (>17.6 µM) of intracellular Nuc-TP against COVID-19 virus.

However, after an i.v. bolus of remdesivir in marmosets (10 mg/kg) (equivalent to 100-200 mg in human), remdesivir was not detectable in the lungs and the concentration of Nuc-TP in the lung was 0.8-1.5 µM [3]. If the same lung Nuc-TP/plasma remdesivir concentration ratio between monkey and human is assumed, a single i.v. dose of 200 mg remdesivir can only achieve a concentration (2-4 µM) of Nuc-TP in the lung in which the intracellular concentration of Nuc-TP in the lung may be only at 4-8 µM, which is below the estimated $EC_{50}$ and $EC_{90}$ of Nuc-TP to inhibit COVID-19. Unfortunately, systemic adverse effects such as hepatotoxicity preclude escalation of remdesivir i.v. dose to >200 mg/day.

In addition to inhibition of virus in the lung of COVID-19, the inhibition of virus in lymphocytes, lymph nodes, and spleen may need to be considered. In fact, most viruses usually also attack these lymphatic organs. Indeed, COVID-19 patients usually have low lymphocyte counts and significantly small spleens[4]. In certain embodiments, remdesivir is delivered into these lymphatic organs (in addition to the lung) for its efficacy, or better efficacy, against COVID-19. Based on the physio-chemical properties of remdesivir, one would expect low drug exposure in these lymphatic organs. It is also not clear if high concentration of nucleoside triphosphate (Nuc-TP) in PBMC[2] can be translated into high concentration in lymphocytes, lymph nodes or spleen.

Provided herein are methods, compounds, compositions, and systems for improving remdesivir's efficacy. In certain embodiments, nanoformulations of remdesivir are generated for IV infusion to improve drug delivery to the lung, spleen, and lymph nodes. Particular nanoformulations, such as albumin nanoparticles and liposomes may be employed to enhance the exposure of the drugs in the lung, lymph node and spleen to improve efficacy in COVID-19 patients or other respiratory viral diseases.

Nanoparticles (such as liposomes, albumin nanoparticles, PLGA) form a stable shell outside of drug core, which may protect the drug degradation in water or by in vivo enzyme [16]. Different nanoformulations will have different ability to improve drug exposure in the lung, spleen, and lymph node[12, 13]. Spleen and lung are part of the reticuloendothelial system, where nanoparticles are naturally accumulated[17]. Previous research also demonstrated that nanomedicine could enhance lymphatic drug delivery to treat metastatic tumors[18].

Compared to i.v. infusion, pulmonary delivery of remdesivir provides higher lung concentrations of remdesivir and Nuc-TP and reduces systemic toxicity. The total volume of human lung tissue is 1.17 L and the total intracellular fluid volume in lungs is 0.54 L (46%)[19]. In vitro metabolism data showed that approximately 55% remdesivir in human cells was converted into Nuc-TP and other metabolites accounted for 45%[2]. To reach an intracellular Nuc-TP concentration of 17.6 µM (in vitro $EC_{90}$) in human lungs, the total amount of remdesivir to be delivered into lung cells is approximately 17.6 µM*0.54 L+55%*603 g/mole=10.5 mg. If it is assumed that 50% remdesivir is swallowed during inhalation and the remaining 50% dose is delivered to lung, a daily inhalation dose of about 21 mg remdesivir is expected to achieve the $EC_{90}$ of intracellular Nuc-TP in human lungs. This dose is achievable by inhalation.

Pulmonary drug delivery using devices such as metered dose inhalers, nebulizers, and dry powder inhalers, provide higher lung concentrations and reduce systemic toxicity compare to i.v. infusion, facilitating a targeted treatment of respiratory diseases[20]. Some clinicians suggested a nebulization treatment to directly delivery the drug to lung, but due to its instability of remdesivir in aqueous phase, the aerosol inhalation from aqueous solution is not feasible because once remdesivir is hydrolyzed into nucleoside monophosphate (Nuc-MP), it will be harder to enter into cells for its efficacy being maximized.

Provided herein are at least two approaches to solve this problem. In certain embodiments, one employs dry powder inhalation where about 2.5 um remdesivir crystalline form can be mixed with different size of lactose (15 um and 200 um) for formulation and manufacture. Another solution of to make a nanoformulation to protect remdesivir from degradation in aqueous phase (such as liposome, albumin nanoparticles, or PLGA nanoparticles). The nanoformulations can be used as nebulizer inhalation from aqueous solution or used as 2.5 um nanoparticle aggregates in dry powder inhalation.

Previous results show nanomedicine can protect drug from degradation in aqueous phase[21]. Additionally, nanoformulation process unique advantages compared to the traditional microparticulate form of the drug: (1) increase the solubility and stability of drug in pulmonary secretions [22]; (2) lead to an even distribution and longer retention of drug in lung[22]; (3) facilitate the penetration of drugs through pulmonary surfactant (PS) layer which is the strong barrier to prevent drug or particles accessing to the alveolus [23]. Amikacin liposome inhalation suspension (Arikayce®)

has been proved by FDA in 2018, for the treatment of *Mycobacterium avium* complex (MAC) lung disease[24].

I. Albumin Nanoformulations of Remdesivir for iv Injection

In certain embodiments, to improve the tissue distribution of remdesivir or analog thereof, especially in lungs, spleen and lymph node distribution, an injectable albumin nanoformulation for remdesivir, or a remdesivir analog, is employed to treat COVID-19 infection and other viral infections. The formulation contains albumin and the drug in different ratios. An exemplary manufacture process is illustrated in Example 1 below. In some embodiments, the size of the nanoparticles is tunable in the range of 50 to 200 nm with a narrow size distribution (PDI<0.15). In certain embodiments, the nanoformulation achieves a high encapsulate efficiency (>90%/0) and good stability. The product is generally in the form of lyophilization powder.

Nanoformulations of albumin and remdesivir (or analogs thereof) can provide improved properties. First, albumin nanoparticle shows very quick tissue distribution and high volume distribution [26]. More importantly, an albumin nanoparticle has the ability to increase lung accumulation and penetration of encapsulated drug [12]. Second, stable albumin nanoparticles of drugs increase spleen and lymph node accumulation. Third, albumin nano-formulations can form a stable albumin shell outside the drug which may prevent drug hydrolysis by various enzymes in blood. With the increased stability of drug, the total amount of drug distributed to the tissues especially lung is increased. Fourth, albumin nanoparticles decrease drug blood concentration compared to free drugs, thus decreasing the uptake of drugs by blood cells to further increase the amount of drug being distributed to tissues.

II. Liposomal Nanoformulation of Remdesivir for iv Injection

In certain embodiments, injectable liposomal nanoformulation of remdesivir, or analogs thereof, are employed to treat COVID-19 infection and other viral infections. In certain embodiments, such formulations are composed of one or more vesicle forming lipid, selected from di-aliphatic chain lipid, such as phospholipids; diglycerides; di-aliphatic glycolipids; single lipids such as sphingomyelin or glycosphingolipid; steroidal lipids; hydrophilic polymer derivatized lipids, or mixtures thereof. In some embodiments, the one or more vesicle forming lipid, that are used in the liposome prepared according to the method of the present invention, is present in an amount such that the molar ratio of ionizable drug to vesicle forming lipids is in the range of about 0.0001:1 to about 0.5:1, preferably from about 0.01:1 to about 0.5:1. In particular embodiments, the liposomal nanoformulation for remdesivir (or analog thereof) is prepared by various methods including: 1) lipid film hydration with sonication or extrusion to optimize size distribution; 2) solvent evaporation such as ethanol injection, ether injection, reverse phase evaporation; or 3) detergent removal methods. remdesivir or analog can be encapsulated into the liposomes by combining drug and lipid before formation of the vesicles (passive loading technique), or by "loading" drug into lipid vesicles after they are formed (active loading technique). In certain embodiments, the liposomes prepared by the method of the present invention are unilamellar liposomes with the size of 50 nm to about 200 nm. In some embodiments, after i.v. injection, liposome formulation prolongs the circulating time. Liposomal formulation increases the stability of drug and prevents its degradation in the blood. In particular embodiments, the liposomal formulation changes the mass balance of drug biodistribution and increases the drug distribution in the lung and spleen [27].

III. Albumin and Liposome Nanoformulation of Remdesivir for Nebulizer Inhalation Nebulizer inhalation has many advantages in the treatment of respiratory diseases over other routes of administration. However, remdesivir cannot be used for nebulization treatment due to the instability in water. In certain embodiments, albumin or liposome nanoformulations are employed to form a stable shell outside the remdesivir (or analog) drug core, thus preventing remdesivir or analog hydrolysis in water medium. In some embodiments, the albumin nanoformulation encapsulates remdesivir or analog drug amorphous form inside and stabilize the form, so that no crystalline forms of the drug are needed for this formulation. In certain embodiments, for nebulizer delivery, the size of albumin or liposome nanoparticle can be tuned from 20-1000 nm.

In certain embodiments, to prepare the liquid aerosols used in nebulizers, medical saline is used to resuspend the lyophilized albumin or liposome formulation powder and the concentration of compound should be adjusted based on the inhalable dosage. In certain embodiments, the drug (remdesivir or analog) is evenly distributed in the droplets of nebulization. In some embodiments, the nebulizer inhalation allows drug particle dispersion in lung, then the nanoparticle will be released from the microparticle in lung for better alveolus accumulation and longer lung retention. In particular embodiments, the nebulizer inhalation of nanoformulation reduces premature mucociliary clearance of hydrophobic drugs and increase absorption, and/or the nebulizer inhalation increases cellular uptake by the lung cells. In some embodiments, the nebulizer inhalation prolongs the drug retention in the lung [28, 29]. Muralidharan, P., et al., (Nanomedicine, 2015. 11(5): p. 1189-99) provides guidance of other drugs that have been made into nanoformulations used in dry powder inhalers. In particular embodiments, the nebulizer inhalation directly delivers the drug into lung to achieve high local concentration using lower dose but reduces systemic drug exposure to reduce liver toxicity. In some embodiments, nebulizer inhalation using liposomes encapsulating drugs in the lipid bilayer or inside the liposomes increase stability and solubility. In other embodiments, the nebulizer inhalation using liposomal formulation provide sustained drug release properties and prolong the drug retention in the lung.

IV. Remdesivir for Dry Powder Inhalation

Generally, the preferred size of particles for inhalation is around 2.5 μm (e.g., 1-5 um). Particles smaller than 0.5 μm may not deposit into the lung at all because they can be easily breathed out [30]. Preparing remdesivir or an analog thereof for dry powder inhalation may be performed as follows. First, the crystalline form of remdesivir (or analog) is selected and milled to generate microparticles (e.g., 0.5-5 um). Drug Microparticles (0.5-5 um) are mixed with excipients, such as lactose, mannitol, and PVA with different size (~200 um, <15 um) to form micronized particle. Second, dry powder inhalation directly delivers the drug into lung to achieve high local concentration using lower dose but reduces systemic drug exposure to decrease liver toxicity.

Figures 1, 2:
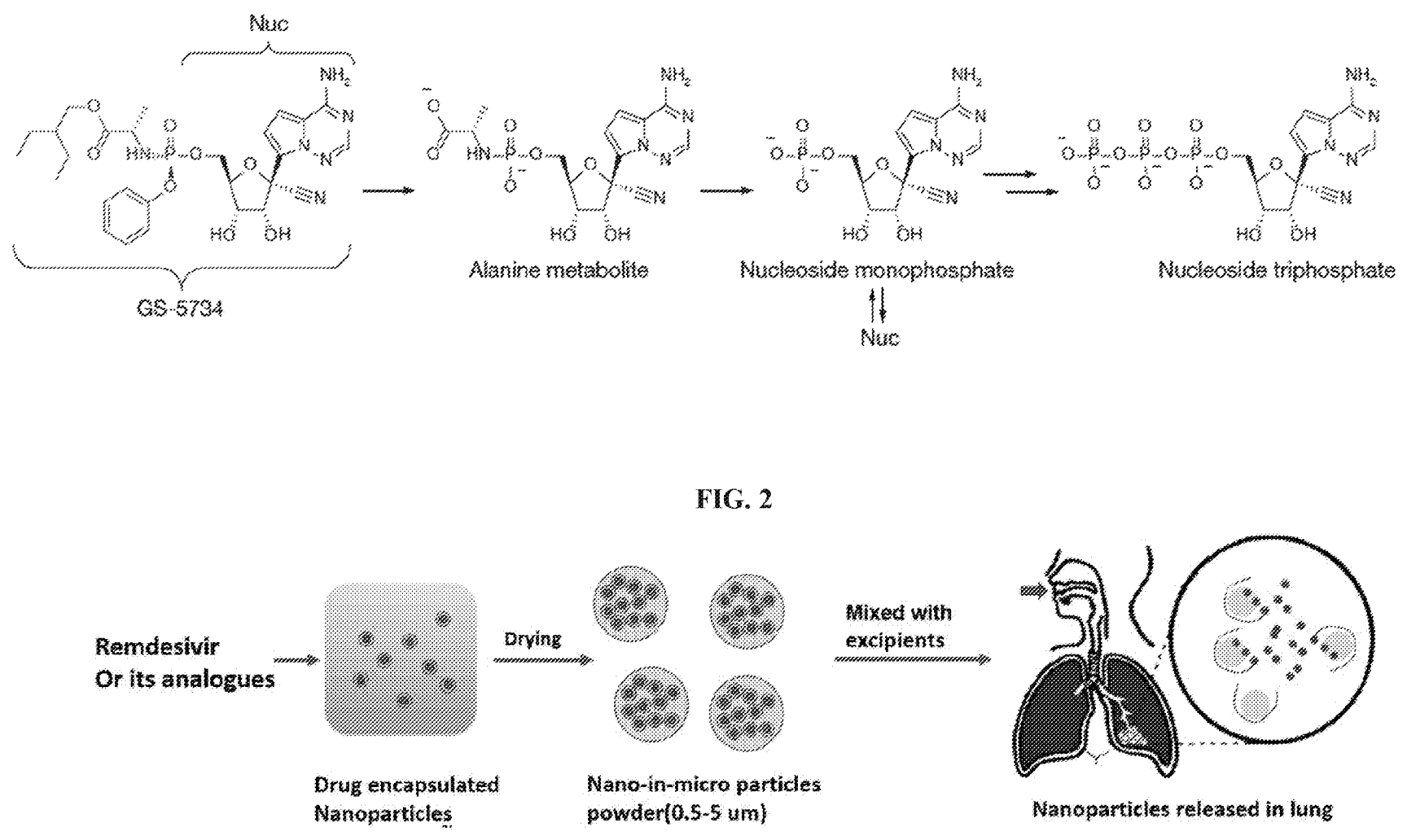

V. Albumin and Liposome Nanoformulation of Remdesivir for Dry Powder Inhalation It is difficult to directly use dry powder for inhalation, since nanoparticles have tendency for agglomeration due to an enormous increase in Gibb's free energy resulting from the large surface area. Also, the preferred size for inhalation particles is around 2.5 μm; particles smaller than 0.5 μm may not deposit into lung at all because they can be easily breathed out[30]. Therefore, in some embodiments, albumin or liposome nano-in-micro dry powder of remdesivir (or analog thereof) are constructed for inhalation (as shown in FIG. 2). First, albumin or liposome nanoparticles of remdesivir (or analog) are prepared as described herein. Any number of methods can be used to turn nanoparticle to microparticle. One is to use the freeze-dried cake to generate nano-in-micro particles (0.5-5 um). Another method is to transform nanosuspension in water to inhalable microaggregates via techniques like spray drying and spray freeze drying (0.5-5 um). The nano-in-micro particles (0.5-5 um) are then mixed with excipients, such as lactose, mannitol, and PVA with different size (~200 um, <15 um) to form micronized particle. Second, the micronized powder allows the drug particle dispersed in lung, then the nanoparticle will be released from the microparticle in lung for better alveolus accumulation and longer lung retention. In some embodiments, the nanoformulation used in dry powder inhalation reduces premature mucociliary clearance of hydrophobic drugs and increase absorption. In particular embodiments, the nanoformulation used in dry powder inhalation increases cellular uptake by the lung cells. In further embodiments, the nanoformulation used in dry powder inhalation prolong the drug retention in the lung [28, 29]. Many drugs have been made into nanoformulations as dry powder inhalers [28]. In some embodiments, nano drug powder inhalation directly delivers the drug into lung to achieve high local concentration using lower dose but reduces systemic drug exposure to reduce liver toxicity. In particular embodiments, albumin nanoparticle inhalation encapsulates drug amorphous form inside, which increase drug solubility, stability. This also eliminate the needs for crystalline form of the drugs. In certain embodiments, liposomal formulation inhalation encapsulate drug in the lipid bilayer or inside to increase stability and solubility. In some embodiments, the liposomal formulation inhalation provides sustained drug release properties to prolong the drug retention in the lung.

VI. PLA/PLGA Microparticles of Remdesivir for Dry Powder Formulations

Due to unique biocompatibility and versatility, poly(lactic acid) (PLA) or poly(lactic-co-glycolic acid)(PLGA) particles are proved to be an excellent carrier of drugs, and the number of its commercial products for drug delivery system is increasing. Therefore, in certain embodiments, inhalable PLA/PLGA microparticles (MPs) incorporating microparticles, large porous microparticles (LMPs) and nano-in-microparticles are prepared by various methods such as single/double emulsion-solvent evaporation technique, spray drying, spray freeze drying, supercritical fluid drying and nanoprecipitation [31, herein incorporated by reference in its entirety, particularly for forms of microparticles]. Large porous microparticles (LMPs) demonstrate large geometric diameter (5-30 um), low density (<0.4 g/cm3), and acceptable aerodynamic diameter (1-3 um), which is important to improve deep lung localization and avoid macrophage clearance[31]. In certain embodiments, nano-in-microparticles (nanocomposites) are designed to release primary NPs from inert microcarriers into lung lining fluid after reaching the alveolar surface, which prolong the drug (remdesivir or analog) retention in lung.

VII. Remdesivir Modification to Alter Tissue Targeting and Enable High Encapsulation of Nanoformulation Provided herein are remdesivir analogues of compounds of Formula I or II:

(I)

(II)

wherein X is or comprises an amino acid side chain, R is or comprises a lipid chain or benzyl, Ar is a substituted or unsubstituted aryl or heteroaryl, Y is $C_2$-$C_{20}$alkylene or $C_2$-$C_{20}$alkenylene; and Z is $C_4$-$C_{40}$alkyl, $C_4$-$C_{40}$alkenyl, or $C_4$-$C_{40}$alkynyl.

In some embodiments, Ar is a substituted or unsubstituted phenyl or naphthyl.

In some embodiments, Ar is unsubstituted phenyl. In some embodiments, Ar is substituted phenyl. In some embodiments, Ar is phenyl substituted with —COOM, wherein M is hydrogen or $C_1$-$C_6$alkyl. In some embodiments, Ar is phenyl substituted with —NL$^1$L$^2$, wherein each of L$^1$ and L$^2$ is independently selected from hydrogen and $C_1$-$C_6$alkyl. In some embodiments, Ar is phenyl substituted with —COOM, wherein M is hydrogen or $C_1$-$C_6$alkyl and —NL$^1$L$^2$, wherein each of L$^1$ and L$^2$ is independently selected from hydrogen and alkyl. In certain embodiments, Ar is a phenyl substituted with —COOH and —NH$_2$.

In certain embodiments, Ar is wherein M is hydrogen or $C_1$-$C_6$alkyl. In certain embodiments, Ar is

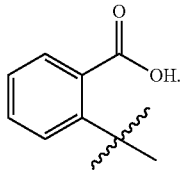 [SMILES: *c1ccccc1C(=O)O]

In certain embodiments, Ar is

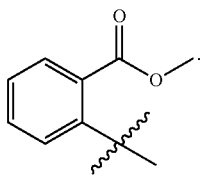 [SMILES: *c1ccccc1C(=O)OC]

In certain embodiments, Ar is

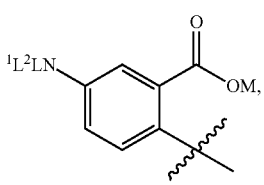

wherein M is hydrogen or $C_1$-$C_6$alkyl and each of $L^1$ and $L^2$ is independently selected from hydrogen and $C_1$-$C_6$alkyl. In certain embodiments, Ar is

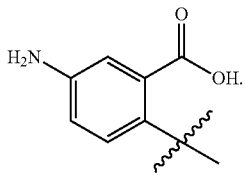

In certain embodiments, Ar is

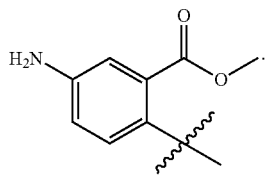 [SMILES: *c1ccc(N)cc1C(=O)OC]

In some embodiments, Ar is unsubstituted naphthyl.

In some embodiments, the remdesivir analog is a compound of Formula Ia:

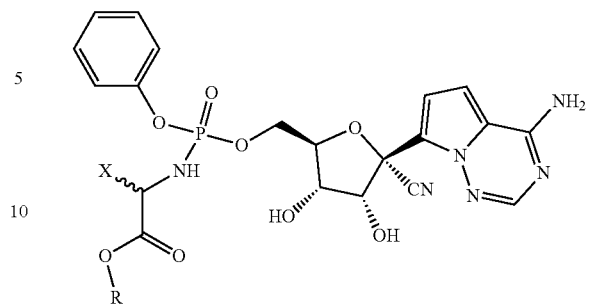

(Ia)

wherein X is or comprises an amino acid side chain and R is or comprises a lipid chain or benzyl.

In some embodiments, X is or comprises an amino acid side chain selected from the group consisting of: alanine, phenylalanine, valine, leucine, isoleucine, methionine, tryptophan, proline, glycine, cysteine, glutamine, asparagine, serine, tyrosine, and threonine. In some embodiments, X is or comprises an alanine side chain. In some embodiments, X is or comprises a tryptophan side chain. In some embodiments, X is or comprises an phenylalanine side chain.

In some embodiments, R comprises a lipid chain with 4 to 30 carbons. In some embodiments, the lipid chain comprises 10 to 20 carbons. In particular embodiments, the lipid chain comprises 12 carbons. In exemplary embodiments, the lipid chain comprises n-dodecane.

In some embodiments, R comprises a lipid chain with 18 carbons. In some embodiments, the lipid chain is

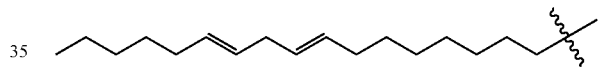

In some embodiments, R is benzyl.

In some embodiments, Y is $C_2$-$C_{10}$alkylene. In some embodiments, Y is $C_4$alkylene. In some embodiments, Y is $C_2$-$C_{10}$alkenylene In some embodiments, Z is $C_4$-$C_{20}$alkyl or $C_4$-$C_{20}$alkenyl. In select embodiments, Z is $C_4$-$C_{10}$alkyl.

Described below is the synthesis of remdesivir analogues by modulating its ProTide moiety to achieve a higher encapsulation for albumin and liposome nanoparticles. As the ProTide is cleaved intracellular to release the nucleoside monophosphate, which is then activated upon phosphorylation to nucleoside triphosphate, modification to the ProTide moiety should not alter the activity of remdesivir.

Formula Ta below shows a general analog structure:

(Ia)

wherein R is a lipid chain and X is an amino acid side chain.

More specific structures are shown, for example, in Series 1-3 shown in FIG. 3 and further described below.

Series 1. A first series of analogues is designed by conserving the L-alanine and replacing only the 2-ethylbutyl with various length of lipid chains (see FIG. 3). First, remdesivir (Sp isomer) and its Rp isomer were found to be similar in potency and the choice of the Sp isomer was based on its crystalline nature that enables rapid scale up in synthesis. Therefore, this stereogenic center is not taken into consideration for the design and the analogues presented herein are mixtures of the two diastereoisomers (Sp, Rp) [25]. Second, the 2-ethylbutyl is replaced with lipid chain for at least one of the following reasons: i) to increase lipophilicity for better permeability to enhance cell uptake; ii) to enhance drug tissue distribution especially in the lung, spleen, and lymph nodes; iii) to enhance encapsulation efficiency by albumin nanoparticles; iv) to incorporate the drug into liposomal bilayer; or v) so the lipid chain can form micelles to protect the drug from non-specific hydrolysis in the blood stream. However, once the drug enters the cells, the drug can be easily activated by hydrolysis enzymes inside of the cells.

Series 2. A second series of analogues is designed by replacing the L-alanine with N-methyl-D-tryptophan and the 2-ethylbutyl with various lipid chains (see FIG. 3). First, remdesivir (Sp isomer) and its Rp isomer were found to be similar in potency and the choice of the Sp isomer was based on its crystalline nature that enables rapid scale up in synthesis. Therefore, this stereogenic center is not taken into consideration for the design and the analogues presented herein are mixtures of the two diastereoisomers (Sp, Rp) [25]. In certain embodiments, the 2-ethylbutyl is replaced with lipid chain: i) to increase lipophilicity for better permeability to enhance cell uptake: ii) to enhance drug tissue distribution especially in the lung, spleen, and lymph nodes; iii) to enhance encapsulation efficiency by albumin nanoparticles; iv) to incorporate the drug into liposomal bilayer; or v) to the lipid chains can form micelles to protect the drug from non-specific hydrolysis in the blood stream. In certain embodiments, the alanine is replaced with N-methyl-D (or L)-tryptophan to: i) enhance encapsulation efficiency by albumin nanoparticles; ii) to increase lipophilicity for better permeability to enhance cell uptake, to enhance drug tissue distribution especially in the lung, spleen, and lymph nodes; iii) to incorporate the drug into liposomal bilayer; or iv) enhance immune cells function to improve anti-viral efficacy of the drug.

Series 3. A third series of analogues is designed by replacing the L-alanine with L (or D)-phenylalanine and the 2-ethylbutyl with various lipid chains (see FIG. 3). First, remdesivir (Sp isomer) and its Rp isomer were found to be similar in potency and the choice of the Sp isomer was based on its crystalline nature that enables rapid scale up in synthesis. Therefore, this stereogenic center is not taken into consideration for the design and the analogues presented herein are mixtures of the two diastereoisomers (Sp, Rp) [25]. In certain embodiments, the 2-ethylbutyl is replaced with lipid chain: i) to increase lipophilicity for better permeability to enhance cell uptake; ii) to enhance drug tissue distribution especially in the lung, spleen, and lymph nodes; iii) to enhance encapsulation efficiency by albumin nanoparticles; iv) to incorporate the drug into liposomal bilayer; or v) to the lipid chains can form micelles to protect the drug from non-specific hydrolysis in the blood stream. In certain embodiments, the alanine is replaced with L (or D)-phenylalanine to: i) enhance encapsulation efficiency by albumin nanoparticles; ii) to increase lipophilicity for better permeability to enhance cell uptake, iii) to enhance drug tissue distribution especially in the lung, spleen, and lymph nodes; iv) to incorporate the drug into liposomal bilayer.

Formula II below shows a general analog structure:

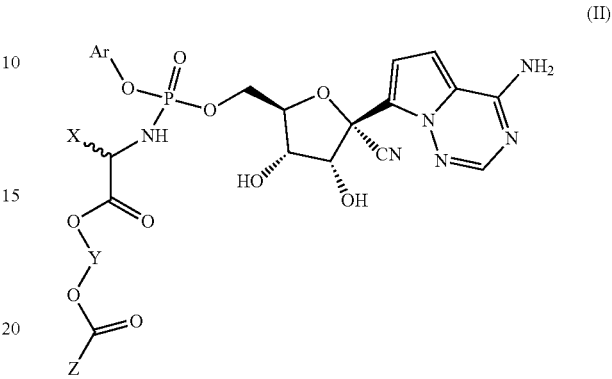

(II)

wherein X is an amino acid side chain, Y is $C_2$-$C_{20}$alkylene or $C_2$-$C_{20}$alkenylene; Ar is a substituted or unsubstituted aryl or heteroaryl; and Z is $C_4$-$C_{40}$alkyl, $C_4$-$C_{40}$alkenyl, or $C_4$-$C_{40}$alkynyl. More specific structures are show in Series 4-6 shown in FIG. 3 and further described below.

Series 4. A fourth series of analogues is designed by conserving the L-alanine and replacing the 2-ethylbutyl with various length of fatty acid chains using an aliphatic diol as linker between the fatty acid and alanine (see FIG. 3). First, remdesivir (Sp isomer) and its Rp isomer were found to be similar in potency and the choice of the Sp isomer was based on its crystalline nature that enables rapid scale up in synthesis. Therefore, this stereogenic center is not taken into consideration for the design and the analogues presented herein are mixtures of the two diastereoisomers (Sp, Rp) [25]. Second, the 2-ethylbutyl is replaced with fatty acid chain for at least one of the following reasons: i) to increase lipophilicity for better permeability to enhance cell uptake; ii) to enhance drug tissue distribution especially in the lung, spleen, and lymph nodes; iii) to enhance encapsulation efficiency by albumin nanoparticles; iv) to incorporate the drug into liposomal bilayer; or v) so the fatty acid chain can form micelles to protect the drug from non-specific hydrolysis in the blood stream. However, once the drug enters the cells, the drug can be easily activated by hydrolysis enzymes inside of the cells.

Series 5. A fifth series of analogues is designed by replacing the L-alanine with N-methyl-D-tryptophan and the 2-ethylbutyl with various length of fatty acid chains using an aliphatic diol as linker between the fatty acid and N-methyl-D-tryptophan (see FIG. 3). First, remdesivir (Sp isomer) and its Rp isomer were found to be similar in potency and the choice of the Sp isomer was based on its crystalline nature that enables rapid scale up in synthesis. Therefore, this stereogenic center is not taken into consideration for the design and the analogues presented herein are mixtures of the two diastereoisomers (Sp, Rp)[25]. In certain embodiments, the 2-ethylbutyl is replaced with fatty acid chain: i) to increase lipophilicity for better permeability to enhance cell uptake; ii) to enhance drug tissue distribution especially in the lung, spleen, and lymph nodes; iii) to enhance encapsulation efficiency by albumin nanoparticles; iv) to incorporate the drug into liposomal bilayer; or v) to the fatty acid chains can form micelles to protect the drug from non-specific hydrolysis in the blood stream. In certain embodiments, the alanine is replaced with N-methyl-D (or L)-tryptophan to: i) enhance encapsulation efficiency by albumin nanoparticles; ii) to increase lipophilicity for better permeability to enhance cell uptake, iii) to enhance drug tissue distribution especially in the lung, spleen, and lymph nodes; iv) to incorporate the drug into liposomal bilayer; or v) enhance immune cells function to improve anti-viral efficacy of the drug.

Series 6. A sixth series of analogues is designed by replacing the L-alanine with L (or D)-phenylalanine and the 2-ethylbutyl with various length of fatty acid chains using an aliphatic diol as linker between the fatty acid and L (or D)-phenylalanine (see FIG. 3). First, remdesivir (Sp isomer) and its Rp isomer were found to be similar in potency and the choice of the Sp isomer was based on its crystalline nature that enables rapid scale up in synthesis. Therefore, this stereogenic center is not taken into consideration for the design and the analogues presented herein are mixtures of the two diastereoisomers (Sp, Rp)[25]. In certain embodiments, the 2-ethylbutyl is replaced with fatty acid chain: i) to increase lipophilicity for better permeability to enhance cell uptake; ii) to enhance drug tissue distribution especially in the lung, spleen, and lymph nodes; iii) to enhance encapsulation efficiency by albumin nanoparticles; iv) to incorporate the drug into liposomal bilayer; or v) to the fatty acid chains can form micelles to protect the drug from non-specific hydrolysis in the blood stream. In certain embodiments, the alanine is replaced with L (or D)-phenylalanine to: i) enhance encapsulation efficiency by albumin nanoparticles; ii) to increase lipophilicity for better permeability to enhance cell uptake, iii) to enhance drug tissue distribution especially in the lung, spleen, and lymph nodes; iv) to incorporate the drug into liposomal bilayer.

Formula I below shows a general remdesivir analog structure:

formula I

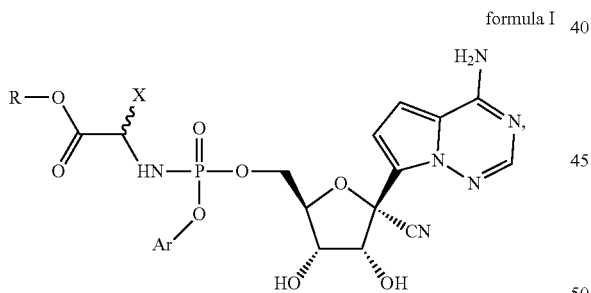

where R is a lipid chain or benzyl group, X is an amino acid side chain and Ar is a substituted or unsubstituted aryl. Specific compounds are contemplated in Series 7 and Examples 10 and 11.

Series 7. A seventh series of analogues is designed by replacing the phenyl group with naphthalene, the L-alanine with N-methyl-D-tryptophan, and the 2-ethylbutyl with various lipid chains and benzyl group. First, remdesivir (Sp isomer) and its Rp isomer were found to be similar in potency and the choice of the Sp isomer was based on its crystalline nature that enables rapid scale up in synthesis. Therefore, this stereogenic center is not taken into consideration for the design and the analogues presented herein are mixtures of the two diastereoisomers (Sp, Rp). In certain embodiments, the phenyl group is replaced with naphthalene group: i) to enhance encapsulation efficiency by albumin nanoparticles; ii) to increase lipophilicity for better permeability to enhance cell uptake, iii) to enhance drug tissue distribution especially in the lung, spleen, and lymph nodes; iv) to incorporate the drug into liposomal bilayer. In certain embodiments, the 2-ethylbutyl is replaced with lipid chain and benzyl group: i) to increase lipophilicity for better permeability to enhance cell uptake; ii) to enhance drug tissue distribution especially in the lung, spleen, and lymph nodes; iii) to enhance encapsulation efficiency by albumin nanoparticles; iv) to incorporate the drug into liposomal bilayer; or v) to the lipid chains can form micelles to protect the drug from non-specific hydrolysis in the blood stream. In certain embodiments, the alanine is replaced with N-methyl-D (or L)-tryptophan to: i) enhance encapsulation efficiency by albumin nanoparticles; ii) to increase lipophilicity for better permeability to enhance cell uptake, iii) to enhance drug tissue distribution especially in the lung, spleen, and lymph nodes; iv) to incorporate the drug into liposomal bilayer; or v) enhance immune cells function to improve anti-viral efficacy of the drug.

Further disclosed is a compound selected from the group consisting of:

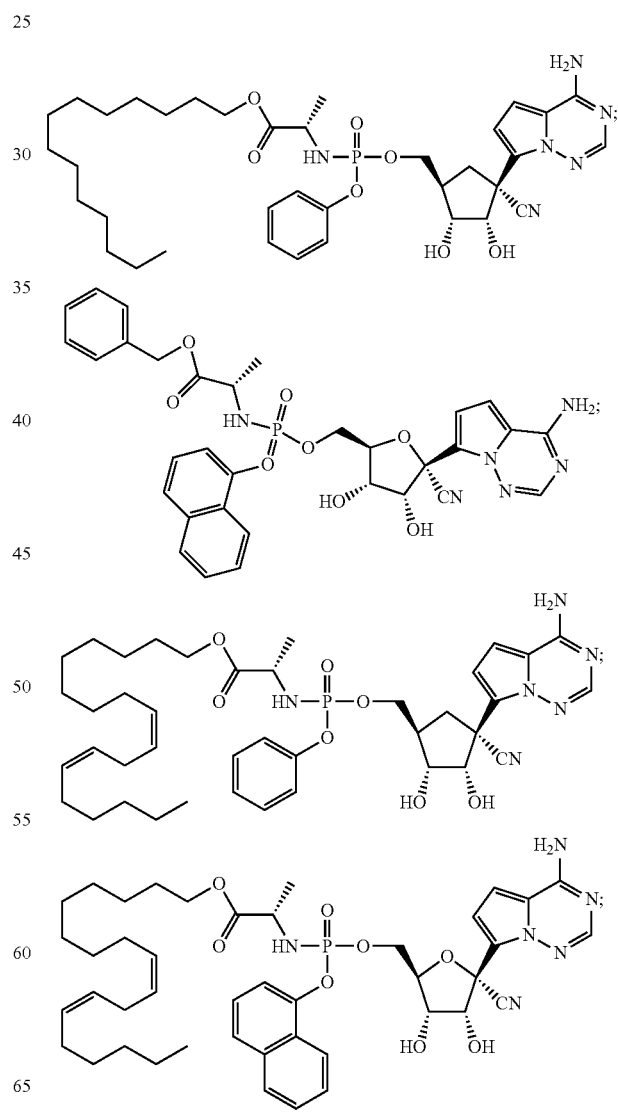

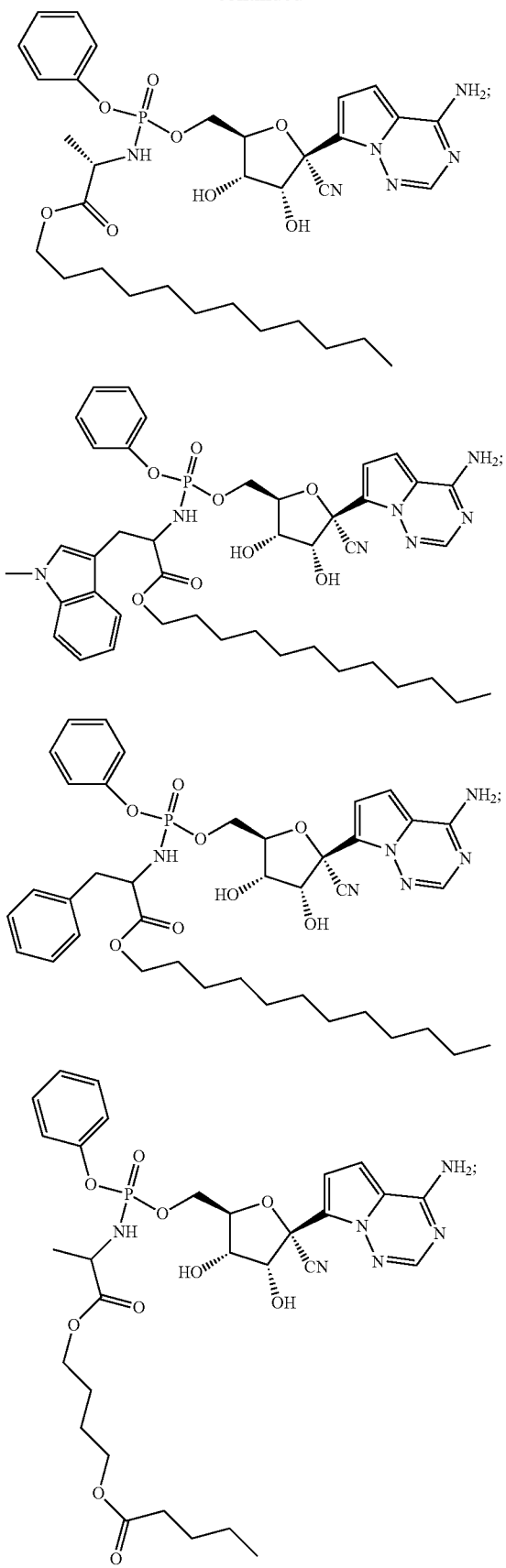

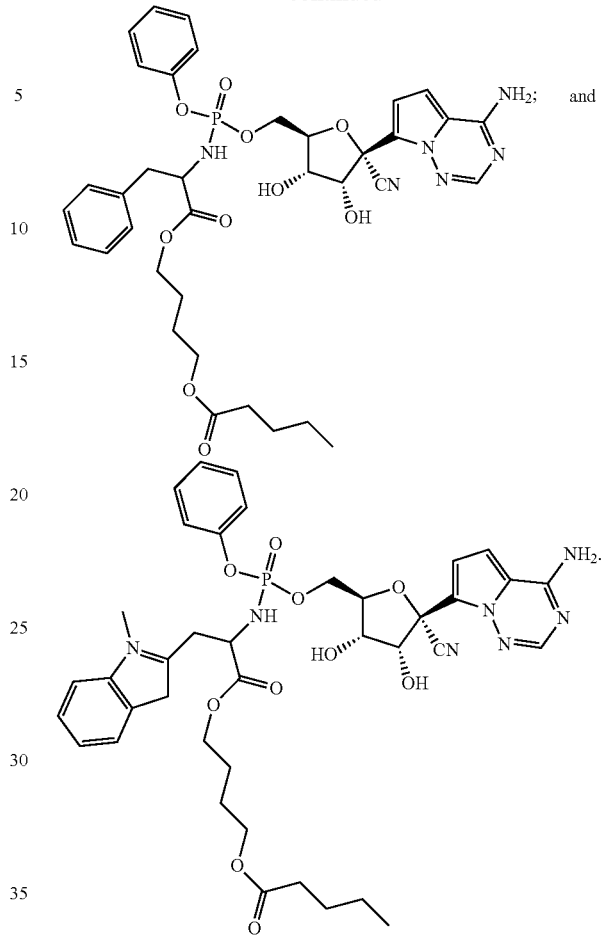

The compounds may exist as a stereoisomer wherein asymmetric or chiral centers are present. The stereoisomer is "R" or "S" depending on the configuration of substituents around the chiral carbon atom. The terms "R" and "S" used herein are configurations as defined in IUPAC 1974 Recommendations for Section E, Fundamental Stereochemistry, in *Pure Appl. Chem.*, 1976, 45: 13-30. The disclosure contemplates various stereoisomers and mixtures thereof and these are specifically included within the scope of this disclosure. Stereoisomers include enantiomers and diastereomers, and mixtures of enantiomers or diastereomers. Individual stereoisomers of the compounds may be prepared synthetically from commercially available starting materials, which contain asymmetric or chiral centers or by preparation of racemic mixtures followed by methods of resolution well-known to those of ordinary skill in the art. These methods of resolution are exemplified by (1) attachment of a mixture of enantiomers to a chiral auxiliary, separation of the resulting mixture of diastereomers by recrystallization or chromatography and optional liberation of the optically pure product from the auxiliary as described in Furniss, Hannaford, Smith, and Tatchell, "Vogel's Textbook of Practical Organic Chemistry," 5th edition (1989), Longman Scientific & Technical, Essex CM20 2JE, England (or more recent versions thereof), or (2) direct separation of the mixture of optical enantiomers on chiral chromatographic columns, or (3) fractional recrystallization methods.

It should be understood that the compounds may possess tautomeric forms, as well as geometric isomers, and that these also constitute embodiments of the disclosure.

The present disclosure also includes isotopically-labeled compounds, which is identical to those recited in Formulas I, Ia, or II, but for the fact that one or more atoms are replaced by an atom having an atomic mass or mass number different from the atomic mass or mass number usually found in nature. Examples of isotopes suitable for inclusion in the compounds of the disclosure are hydrogen, carbon, nitrogen, oxygen, phosphorus, sulfur, fluorine, and chlorine, such as, but not limited to $^2$H, $^3$H, $^{13}$C, $^{14}$C, $^{15}$N, $^{18}$O, $^{17}$O, $^{31}$P, $^{32}$P, $^{35}$S, $^{18}$F, and $^{36}$Cl, respectively. Substitution with heavier isotopes such as deuterium, for example, $^2$H, can afford certain therapeutic advantages resulting from greater metabolic stability, for example increased in vivo half-life or reduced dosage requirements and, hence, may be preferred in some circumstances. The compound may incorporate positron-emitting isotopes for medical imaging and positron-emitting tomography (PET) studies for determining the distribution of receptors. Suitable positron-emitting isotopes that can be incorporated in compounds of formula (I) are $^{11}$C, $^{13}$N, $^{15}$O, and $^{18}$F. Isotopically-labeled compounds of Formulas I, Ia, or II, can generally be prepared by conventional techniques known to those skilled in the art or by processes analogous to those described in the accompanying. Examples using appropriate isotopically-labeled reagent in place of non-isotopically-labeled reagent.

The disclosed compounds may be incorporated into pharmaceutically acceptable compositions. The pharmaceutical compositions may include a "therapeutically effective amount" or a "prophylactically effective amount" of the compound(s). A "therapeutically effective amount" refers to an amount effective, at dosages and for periods of time necessary, to achieve the desired therapeutic result. A therapeutically effective amount of the composition may be determined by a person skilled in the art and may vary according to factors such as the disease state, age, sex, and weight of the individual, and the ability of the composition to elicit a desired response in the individual. A therapeutically effective amount is also one in which any toxic or detrimental effects of a compound of the invention (e.g., a compound of formula (I)) are outweighed by the therapeutically beneficial effects. A "prophylactically effective amount" refers to an amount effective, at dosages and for periods of time necessary, to achieve the desired prophylactic result. Typically, since a prophylactic dose is used in subjects prior to or at an earlier stage of disease, the prophylactically effective amount will be less than the therapeutically effective amount.

The pharmaceutical compositions and formulations may include pharmaceutically acceptable carriers. The term "pharmaceutically acceptable carrier," as used herein, means a non-toxic, inert solid, semi-solid or liquid filler, diluent, encapsulating material, or formulation auxiliary of any type. Some examples of materials which can serve as pharmaceutically acceptable carriers are sugars such as, but not limited to, lactose, glucose and sucrose; starches such as, but not limited to, corn starch and potato starch; cellulose and its derivatives such as, but not limited to, sodium carboxymethyl cellulose, ethyl cellulose and cellulose acetate; powdered tragacanth; malt; gelatin; talc; excipients such as, but not limited to, cocoa butter and suppository waxes; oils such as, but not limited to, peanut oil, cottonseed oil, safflower oil, sesame oil, olive oil, corn oil and soybean oil; glycols; such as propylene glycol; esters such as, but not limited to, ethyl oleate and ethyl laurate; agar; buffering agents such as, but not limited to, magnesium hydroxide and aluminum hydroxide; alginic acid; pyrogen-free water; isotonic saline; Ringer's solution; ethyl alcohol, and phosphate buffer solutions, as well as other non-toxic compatible lubricants such as, but not limited to, sodium lauryl sulfate and magnesium stearate, as well as coloring agents, releasing agents, coating agents, sweetening, flavoring and perfuming agents, preservatives and antioxidants can also be present in the composition, according to the judgment of the formulator.

The route by which the disclosed compounds are administered and the form of the composition will dictate the type of carrier to be used. The composition may be in a variety of forms, suitable, for example, for systemic administration (e.g., oral, rectal, nasal, sublingual, buccal, implants, or parenteral) or topical administration (e.g., dermal, pulmonary, nasal, aural, ocular, liposome delivery systems, or iontophoresis).

Carriers for systemic administration typically include at least one of diluents, lubricants, binders, disintegrants, colorants, flavors, sweeteners, antioxidants, preservatives, glidants, solvents, suspending agents, wetting agents, surfactants, combinations thereof, and others. All carriers are optional in the compositions.

Suitable diluents include sugars such as glucose, lactose, dextrose, and sucrose; diols such as propylene glycol; calcium carbonate; sodium carbonate; sugar alcohols, such as glycerin; mannitol; and sorbitol. The amount of diluent(s) in a systemic or topical composition is typically about 50 to about 90%.

Suitable lubricants include silica, talc, stearic acid and its magnesium salts and calcium salts, calcium sulfate; and liquid lubricants such as polyethylene glycol and vegetable oils such as peanut oil, cottonseed oil, sesame oil, olive oil, corn oil and oil of theobroma. The amount of lubricant(s) in a systemic or topical composition is typically about 5 to about 10%.

Suitable binders include polyvinyl pyrrolidone; magnesium aluminum silicate; starches such as corn starch and potato starch; gelatin; tragacanth; and cellulose and its derivatives, such as sodium carboxymethylcellulose, ethyl cellulose, methylcellulose, microcrystalline cellulose, and sodium carboxymethylcellulose. The amount of binder(s) in a systemic composition is typically about 5 to about 50%.

Suitable disintegrants include agar, alginic acid and the sodium salt thereof, effervescent mixtures, croscarmellose, crospovidone, sodium carboxymethyl starch, sodium starch glycolate, clays, and ion exchange resins. The amount of disintegrant(s) in a systemic or topical composition is typically about 0.1 to about 10%.

Suitable colorants include a colorant such as an FD&C dye. When used, the amount of colorant in a systemic or topical composition is typically about 0.005 to about 0.1%.

Suitable flavors include menthol, peppermint, and fruit flavors. The amount of flavor(s), when used, in a systemic or topical composition is typically about 0.1 to about 1.0%.

Suitable sweeteners include aspartame and saccharin. The amount of sweetener(s) in a systemic or topical composition is typically about 0.001 to about 1%.

Suitable antioxidants include butylated hydroxyanisole ("BHA"), butylated hydroxytoluene ("BHT"), and vitamin E. The amount of antioxidant(s) in a systemic or topical composition is typically about 0.1 to about 5%.

Suitable preservatives include benzalkonium chloride, methyl paraben and sodium benzoate. The amount of preservative(s) in a systemic or topical composition is typically about 0.01 to about 5%.

Suitable glidants include silicon dioxide. The amount of glidant(s) in a systemic or topical composition is typically about 1 to about 5%.

Suitable solvents include water, isotonic saline, ethyl oleate, glycerine, hydroxylated castor oils, alcohols such as ethanol, dimethyl sulfoxide, N-Methyl-2-Pyrrolidone, dimethylacetamide and phosphate (or other suitable buffer). The amount of solvent(s) in a systemic or topical composition is typically from about 0 to about 100%.

Suitable suspending agents include AVICEL RC-591 (from FMC Corporation of Philadelphia, Pa.) and sodium alginate. The amount of suspending agent(s) in a systemic or topical composition is typically about 1 to about 8%.

Suitable surfactants include lecithin, Polysorbate 80, and sodium lauryl sulfate, and the TWEENS from Atlas Powder Company of Wilmington, Del. Suitable surfactants include those disclosed in the C.T.F.A. Cosmetic Ingredient Handbook, 1992, pp. 587-592; Remington's Pharmaceutical Sciences, 15th Ed. 1975, pp. 335-337; and McCutcheon's Volume 1, Emulsifiers & Detergents, 1994, North American Edition, pp. 236-239. The amount of surfactant(s) in the systemic or topical composition is typically about 0.1% to about 5%.

Although the amounts of components in the systemic compositions may vary depending on the type of systemic composition prepared, in general, systemic compositions include 0.01% to 50% of an active compound (e.g., a compound of formula (I)) and 50% to 99.99% of one or more carriers. Compositions for parenteral administration typically include 0.1% to 10% of actives and 90% to 99.9% of a carrier including a diluent and a solvent.

Compositions for oral administration can have various dosage forms. For example, solid forms include tablets, capsules, granules, and bulk powders. These oral dosage forms include a safe and effective amount, usually at least about 5%, and more particularly from about 25% to about 50% of actives. The oral dosage compositions include about 50% to about 95% of carriers, and more particularly, from about 50% to about 75%.

Tablets can be compressed, tablet triturates, enteric-coated, sugar-coated, film-coated, or multiple-compressed. Tablets typically include an active component, and a carrier comprising ingredients selected from diluents, lubricants, binders, disintegrants, colorants, flavors, sweeteners, glidants, and combinations thereof. Specific diluents include calcium carbonate, sodium carbonate, mannitol, lactose, and cellulose. Specific binders include starch, gelatin, and sucrose. Specific disintegrants include alginic acid and croscarmellose. Specific lubricants include magnesium stearate, stearic acid, and talc. Specific colorants are the FD&C dyes, which can be added for appearance. Chewable tablets preferably contain sweeteners such as aspartame and saccharin, or flavors such as menthol, peppermint, fruit flavors, or a combination thereof.

Capsules (including implants, time release and sustained release formulations) typically include an active compound (e.g., a compound of formula (I)), and a carrier including one or more diluents disclosed above in a capsule comprising gelatin. Granules typically comprise a disclosed compound, and preferably glidants such as silicon dioxide to improve flow characteristics. Implants can be of the biodegradable or the non-biodegradable type.

The selection of ingredients in the carrier for oral compositions depends on secondary considerations like taste, cost, and shelf stability, which are not critical for the purposes of this invention.

Solid compositions may be coated by conventional methods, typically with pH or time-dependent coatings, such that a disclosed compound is released in the gastrointestinal tract in the vicinity of the desired application, or at various points and times to extend the desired action. The coatings typically include one or more components selected from the group consisting of cellulose acetate phthalate, polyvinyl acetate phthalate, hydroxypropyl methyl cellulose phthalate, ethyl cellulose, EUDRAGIT® coatings (available from Evonik Industries of Essen, Germany), waxes and shellac.

Compositions for oral administration can have liquid forms. For example, suitable liquid forms include aqueous solutions, emulsions, suspensions, solutions reconstituted from non-effervescent granules, suspensions reconstituted from non-effervescent granules, effervescent preparations reconstituted from effervescent granules, elixirs, tinctures, syrups, and the like. Liquid orally administered compositions typically include a disclosed compound and a carrier, namely, a carrier selected from diluents, colorants, flavors, sweeteners, preservatives, solvents, suspending agents, and surfactants. Peroral liquid compositions preferably include one or more ingredients selected from colorants, flavors, and sweeteners.

Other compositions useful for attaining systemic delivery of the subject compounds include sublingual, buccal and nasal dosage forms. Such compositions typically include one or more of soluble filler substances such as diluents including sucrose, sorbitol, and mannitol; and binders such as acacia, microcrystalline cellulose, carboxymethyl cellulose, and hydroxypropyl methylcellulose. Such compositions may further include lubricants, colorants, flavors, sweeteners, antioxidants, and glidants.

The disclosed compounds can be topically administered. Topical compositions that can be applied locally to the skin may be in any form including solids, solutions, oils, creams, ointments, gels, lotions, shampoos, leave-on and rinse-out hair conditioners, milks, cleansers, moisturizers, sprays, skin patches, and the like. Topical compositions include: a disclosed compound (e.g., a compound of formula (I)), and a carrier. The carrier of the topical composition preferably aids penetration of the compounds into the skin. The carrier may further include one or more optional components.

The amount of the carrier employed in conjunction with a disclosed compound is sufficient to provide a practical quantity of composition for administration per unit dose of the compound. Techniques and compositions for making dosage forms useful in the methods of this invention are described in the following references: Modern Pharmaceutics, Chapters 9 and 10, Banker & Rhodes, eds. (1979); Lieberman et al., Pharmaceutical Dosage Forms: Tablets (1981); and Ansel, Introduction to Pharmaceutical Dosage Forms, 2nd Ed., (1976).

A carrier may include a single ingredient or a combination of two or more ingredients. In the topical compositions, the carrier includes a topical carrier. Suitable topical carriers include one or more ingredients selected from phosphate buffered saline, isotonic water, deionized water, monofunctional alcohols, symmetrical alcohols, aloe vera gel, allantoin, glycerin, vitamin A and E oils, mineral oil, propylene glycol, PPG-2 myristyl propionate, dimethyl isosorbide, castor oil, combinations thereof, and the like. More particularly, carriers for skin applications include propylene glycol, dimethyl isosorbide, and water, and even more particularly, phosphate buffered saline, isotonic water, deionized water, monofunctional alcohols, and symmetrical alcohols.

The carrier of a topical composition may further include one or more ingredients selected from emollients, propellants, solvents, humectants, thickeners, powders, fragrances, pigments, and preservatives, all of which are optional.

Suitable emollients include stearyl alcohol, glyceryl monoricinoleate, glyceryl monostearate, propane-1,2-diol, butane-1,3-diol, mink oil, cetyl alcohol, isopropyl isostearate, stearic acid, isobutyl palmitate, isocetyl stearate, oleyl alcohol, isopropyl laurate, hexyl laurate, decyl oleate, octadecan-2-ol, isocetyl alcohol, cetyl palmitate, di-n-butyl sebacate, isopropyl myristate, isopropyl palmitate, isopropyl stearate, butyl stearate, polyethylene glycol, triethylene glycol, lanolin, sesame oil, coconut oil, arachis oil, castor oil, acetylated lanolin alcohols, petroleum, mineral oil, butyl myristate, isostearic acid, palmitic acid, isopropyl linoleate, lauryl lactate, myristyl lactate, decyl oleate, myristyl myristate, and combinations thereof. Specific emollients for skin include stearyl alcohol and polydimethylsiloxane. The amount of emollient(s) in a skin-based topical composition is typically about 5% to about 95%.

Suitable propellants include propane, butane, isobutane, dimethyl ether, carbon dioxide, nitrous oxide, and combinations thereof. The amount of propellant(s) in a topical composition is typically about 0% to about 95%.

Suitable solvents include water, ethyl alcohol, methylene chloride, isopropanol, castor oil, ethylene glycol monoethyl ether, diethylene glycol monobutyl ether, diethylene glycol monoethyl ether, dimethylsulfoxide, dimethyl formamide, tetrahydrofuran, and combinations thereof. Specific solvents include ethyl alcohol and homotopic alcohols. The amount of solvent(s) in a topical composition is typically about 0% to about 95%.

Suitable humectants include glycerin, sorbitol, sodium 2-pyrrolidone-5-carboxylate, soluble collagen, dibutyl phthalate, gelatin, and combinations thereof. Specific humectants include glycerin. The amount of humectant(s) in a topical composition is typically 0% to 95%.

The amount of thickener(s) in a topical composition is typically about 0% to about 95%.

Suitable powders include O-cyclodextrins, hydroxypropyl cyclodextrins, chalk, talc, fullers earth, kaolin, starch, gums, colloidal silicon dioxide, sodium polyacrylate, tetra alkyl ammonium smectites, trialkyl aryl ammonium smectites, chemically-modified magnesium aluminum silicate, organically-modified montmorillonite clay, hydrated aluminum silicate, fumed silica, carboxyvinyl polymer, sodium carboxymethyl cellulose, ethylene glycol monostearate, and combinations thereof. The amount of powder(s) in a topical composition is typically 0% to 95%.

The amount of fragrance in a topical composition is typically about 0% to about 0.5%, particularly, about 0.001% to about 0.1%.

Suitable pH adjusting additives include HCl or NaOH in amounts sufficient to adjust the pH of a topical pharmaceutical composition.

VIII. Methods of Treatment

Disclosed herein are methods of treating a viral infection using compounds and compositions described herein (e.g., a compound of formula (I) or a compound of formula (II), or a composition comprising a compound of formula (I) or a compound of formula (II)).

Viruses causing infections treatable by the methods, compounds, and compositions disclosed herein include, but are not limited to Herpes simplex, type 1; Herpes simplex, type 2; encephalitis virus; papillomavirus; Varicella-zoster virus; Epstein-Barr virus; cytomegalovirus; Human herpes virus, type 8; BK virus; JC virus; Smallpox (herpes zoster virus); adenovirus; Hepatitis A virus; Hepatitis B virus; Hepatitis D virus; Hepatitis E virus; Human bocavirus; Parvovirus B19; Human astrovirus; Norwalk virus; coxsackievirus; hepatitis A virus; poliovirus; rhinovirus; foot and mouth virus, Severe acute respiratory syndrome virus (SARS); SARS-CoV-2; coronaviruses; flaviviruses; Hepatitis C virus; Yellow Fever virus; Dengue virus; West Nile virus; Rubella virus; Hepatitis E virus; Human Immunodeficiency virus (HIV); vaccinia virus; Influenza virus; Guanarito virus; Junin virus; Lassa virus; Machupo virus; Sabia virus; Crimean-Congo hemorrhagic fever virus; Ebola virus (e.g., Ebola-Zaire, Ebola-Sudan, and Ebola-Ivory Coast, and Ebola-Reston); Marburg virus; Measles virus; Mumps virus; Parainfluenza virus; Respiratory syncytial virus; Human metapneumovirus; Hendra virus; Nipah virus; Rabies virus; Hepatitis D; Rotavirus; Orbivirus; Coltivirus; Banna virus; Human Enterovirus; Hanta virus; West Nile virus; Middle East Respiratory Syndrome (MERS) Coronavirus; Japanese encephalitis virus; arboviral encephalitis virus; Vesicular exanthernavirus; and Eastern equine encephalitis. In some embodiments, the virus is SARS-CoV-2. In some embodiments, the virus is Ebola virus.

A non-limiting list of viral diseases includes AIDS (HIV), AIDS related Cytomegalovirus infection, HIV-associated nephropathy, Lipodystrophy, hepatitis A, B, C, D or E, herpes, herpes zoster (chicken pox), monkey pox, cow pox, German measles (rubella virus), yellow fever, dengue fever etc. (flaviviruses), flu (influenza viruses), haemorrhagic infectious diseases such as Ebola virus disease (Marburg or Ebola viruses), Ross river virus infection, West Nile virus (WNV) disease, Human papillomavirus (HPV) infections, respiratory infections such as adenovirus infection, avian (H5N1) influenza, influenza, RSV infections, severe acute respiratory syndrome (SARS), and swine (H1N1) influenza, viral skin diseases such as B19 parvovirus infections, epidemic diseases such as Ebola haemorrhagic fever, Marburg haemorrhagic fever, Nipah virus disease, SARS, MERS, and COVID-19. In some embodiments, the viral disease is COVID-19. In some embodiments, the viral disease is Ebola virus disease.

A therapeutically effective amount of a compound disclosed herein, or compositions thereof, may be administered alone or in combination with a therapeutically effective amount of at least one additional therapeutic agent. In some embodiments, effective combination therapy is achieved with a single composition or pharmacological formulation that includes both agents, or with two distinct compositions or formulations, administered at the same time, wherein one composition includes a compound of this invention, and the other includes the second agent(s). Alternatively, in other embodiments, the therapy precedes or follows the other agent treatment by intervals ranging from minutes to months.

A wide range of second therapies may be used in conjunction with the compounds and compositions of the present disclosure. The second therapy may be a combination of a second therapeutic agent or may be a second therapy not connected to administration of another agent. Such second therapies include, but are not limited to, steam inhalation, supplemental oxygen and/or mechanical ventilatory support, administration of a second therapeutic agent, e.g., a decongestant, a steroid, an analgesic, and a second antiviral agent.

In some embodiments of the methods disclosed herein, the compound or composition can be co-administered with an additional antiviral agent. In some embodiments, the additional antiviral agent is selected from abacavir, acyclovir, adefovir, amantadine, amprenavir, atazanavir, baloxavir marboxil, bictegravir, boceprevir, bulevirtide, cidofovir, cobicistat, daclatasvir, darunavir, delavirdine, didanosine, docosanol, dolutegravir, doravirine, edoxudine, efavirenz, elvitegravir, emtricitabine, enfuvirtide, entecavir, etravirine, famciclovir, fomivirsen, fosamprenavir, foscarnet, ganciclovir, ibacitabine, ibalizumab, idoxuridine, imiquimod, imunovir, indinavir, lamivudine, letermovir, lopinavir, loviride, maraviroc, methisazone, moroxydine, nelfinavir, nevirapine, nexavir, nitazoxanide, oseltamivir, penciclovir, peramivir, penciclovir, peramivir, pleconaril, podophyllotoxin, raltegravir, remdesivir, ribavirin, rilpivirine, rilpivirine, rimantadine, rintatolimod, ritonavir, saquinavir, simeprevir, sofosbuvir, stavudine, taribavirin, telaprevir, telbivudine, tenofovir (e.g., tenofovir alafenamide or tenofovir disoproxil), tipranavir, trifluridine, tromantadine, umifenovir, valaciclovir, valganciclovir, vicriviroc, vidarabine, zalcitabine, zanamivir, and zidovudine, and any combination thereof.

EXAMPLES

Example 1

The Preparation of Albumin Nanoparticle of Remdesivir for Injection or Nebulization Treatment This example describes the preparation of albumin nanoparticle of remdesivir for injection or nebulization, which will be used in next lung distribution and anti-COVID 19 virus efficacy test.

To make the albumin nanoparticle, organic phase is prepared by dissolving the remdesivir or modified remdesivir (100 mg) into chloroform (2 ml). 20 ml Marketed HSA solution (5%) is then mixed with organic phase and dispersed vigorously by a rotor-stator homogenizer (Ultra-Turrax T25, 8K rpm-12K rpm, 5 min) to generate milk-like emulsion. The emulsion is then processed by a high-pressure homogenizer (Nano DeBEE) with the parameters set as pressure=15,000 psi-20,000 psi, condensation temp=5° C., cycles=6. Remaining organic solvent in the product was removed by a rotatory evaporator. The final nano-suspension was filtered with 0.22 μm membrane, and then directly put into 10 ml vials (2 ml/vial) for lyophilization (primary drying temp=−5° C. for 30 h and secondary drying temp=30° C. for 6 h). The vials were filled with nitrogen before sealing and stored at −20° C.

To prepare the injection solution of remdesivir nano-formulation, 2 ml of medical saline is used to resuspend the freeze-dried powder which is supposed to have 5 mg/ml compound suspended in 5% HSA solution. To prepare the liquid aerosols used in nebulizer, medical saline is used to resuspend the powder and the concentration of compound should be adjusted based on the inhalable dosage. Normal external power supply can be used to produce the liquid aerosols.

Example 2

The Preparation of Liposome of Remdesivir for Injection and Nebulization Treatment This example describes the preparation of liposome of remdesivir for injection or nebulization, which will be used in next lung distribution and anti-COVID 19 virus efficacy test.

To make the liposome formulation of remdesivir and its modified compound, 100 mg compound together with other lipids is dissolved in organic solution like chloroform (conc. of lipid between 10-20 mg). The solvent is removed with rotatory evaporator and lipid/compound film is formed on the side of a round bottom flask. The lipid film is thoroughly dried to remove residual organic solvent by placing the flask on a vacuum pump overnight. 5 ml of $ddH_2O$ is added into the flask to hydrate the film with temp set as 60° C. and time as 1 hour. Vigorous shaking, mixing, or stirring is used to fully hydrate the lipid film. Large multilamellar vesicle will be generated after the hydration step and can be disrupted to form unilamellar vesicles (SUV) by bath sonicator and sonicating for 5-10 minutes above the Tc of the lipid. The final formulation is filtered with Sephadex column to get rid of free compound, and then directly put into 10 ml vials (2 ml/vial) for lyophilization (primary drying temp=−5° C. for 30 h and secondary drying temp=30° C. for 6 h). The vials were filled with nitrogen before sealing and stored at −20° C.

To prepare the injection solution of remdesivir nano-formulation, 2 ml of medical saline is used to resuspend the freeze-dried powder which is supposed to have 5 mg/ml compound suspended in 5% HSA solution. To prepare the liquid aerosols used in nebulizer, medical saline is used to resuspend the powder and the concentration of compound should be adjusted based on the inhalable dosage. Normal external power supply can be used to produce the liquid aerosols.

Example 3

The Preparation of Dry Powder Inhalation Formulation of Albumin or Liposomal Nanoparticle of Remdesivir This example describes the preparation of dry powder inhalation formulation of albumin or liposomal nanoparticle of remdesivir.

To make the albumin or liposomal nanoparticles of remdesivir and its modified compound, similar procedure is carried out and produce the nanosuspension in water. Spray freeze drying is used to prepare dry powders for inhalation. Non-respirable carrier like lactose with different size (~200 μm, <15 μm) will be blended with dry powder and prepare inhalation grade capsules. Upon actuation, the capsule breaks apart or is pin-holed by the DPI device and releases the powder for aerosolization.

Example 4

The Drug Modification for Higher Encapsulation for Albumin and Liposome Nanoparticle A remdesivir analog generation scheme is shown in FIG. 4.

Step 1: The alcohol was dissolved in dichloromethane and cooled to 0° C. A catalytic amount of 4-(dimethylamino) pyridine (DMAP, 10%) was added and the reaction mixture was stirred for 20 minutes at 0° C. under argon. N-Boc-amino acid (1 eq) and N-(3-diaminopropyl)-N'-ethylcarbodiimide hydrochloride (EDC·HCl, 1 eq) were added to the reaction at 0° C. The mixture was stirred for 1 h, warmed up to room temperature and stirred overnight. The mixture was diluted with dichloromethane ($CH_2Cl_2$), washed with sat. $NaHCO_3$ solution followed by brine and dried with sodium sulfate. The crude ester obtained after evaporation was purified by column chromatography on silica gel.

Step 2: The intermediate I was added in one portion to a solution HCl/dioxane (4 ml, 4 M) cooled to 0° C. under argon. The ice-bath was removed and the mixture was kept stirred at room temperature for 4 h. After completion, the reaction mixture was condensed by rotary evaporation under high vacuum. The residue was then taken into dry ethyl ether and collected by filtration to give the deprotected alanine ester as a salt. This crude product and the phenol dichlorophosphate (1 eq) were dissolved in anhydrous dichloromethane and cooled to −78° C. under argon. Anhydrous trimethylamine (2 eq) was added dropwise and the reaction was allowed to slowly warm to room temperature and stirred for 2 h. After completion, the solvent was evaporated under reduced pressure and the resulting residue was dissolved in anhydrous ethyl ether and filtered. The filtrate was reduced to dryness to give intermediate II which was used in the next step without further purification.

Step 3: To a stirring solution of remdesivir metabolite GS-441524, DCCHEMICALS (1 eq) in anhydrous THF, intermediate II (3 eq) dissolved in anhydrous THF was added dropwise under argon. To the reaction mixture was added dropwise methylimidazole (5 eq) over 5 minutes at −78° C. After 15 minutes, the reaction was allowed to slowly warm to room temperature and stirred overnight. After completion, the solvent was removed under reduced pressure and the residue was dissolved in dichloromethane and washed with 0.5M HCl. The organic layer was dried over sodium sulfate, filtered, evaporated, and purified by column chromatography on silica gel.

Example 5

Figure 5:
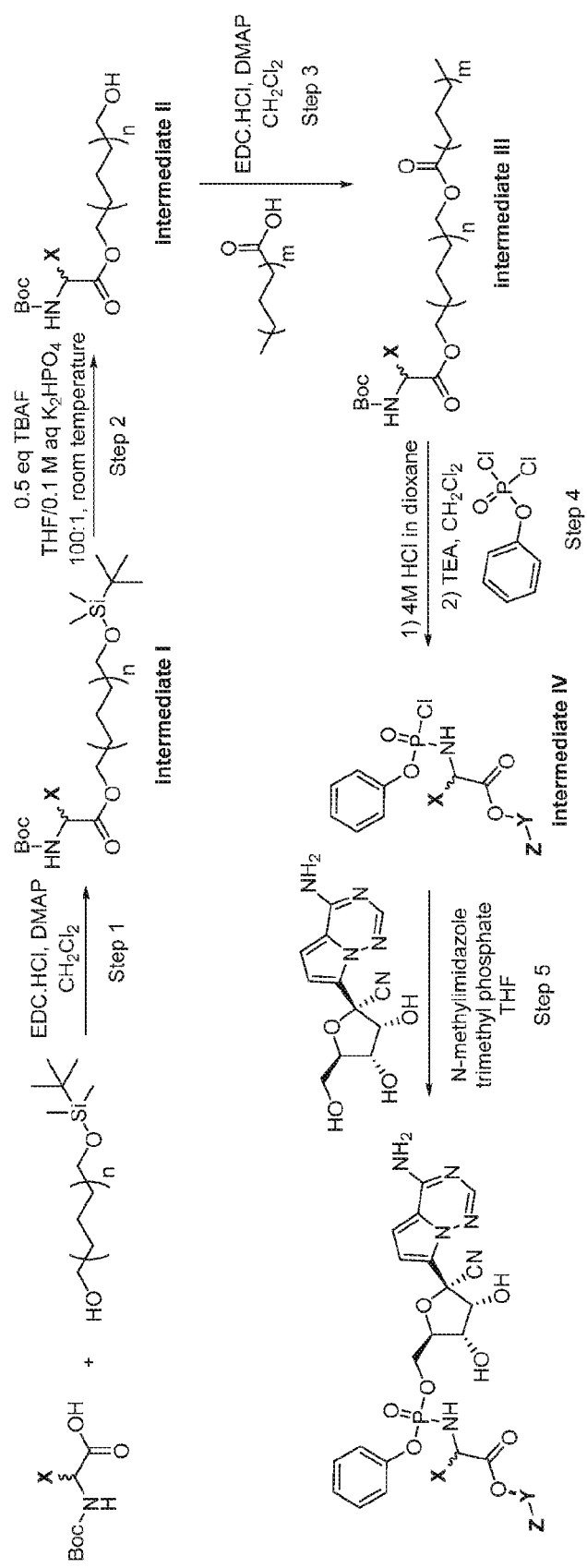

Further Modification for Higher Encapsulation for Albumin and Liposome Nanoparticle A remdesivir analog generation scheme is shown in FIG. 5.

Step 1: The mono TBDMS protected diol was dissolved in dichloromethane and cooled to 0° C. A catalytic amount of 4-(dimethylamino)pyridine (DMAP, 10%) was added and the reaction mixture was stirred for 20 minutes at 0° C. under argon. N-Boc-amino acid (1 eq) and N-(3-diaminopropyl)-N'-ethylcarbodiimide hydrochloride (EDC·HCl, 1 eq.) were added to the reaction at 0° C. The mixture was stirred for 1 h, warmed up to room temperature and stirred overnight. The mixture was diluted with dichloromethane ($CH_2Cl_2$), washed with sat. $NaHCO_3$ solution followed by brine and dried with sodium sulfate. The crude ester obtained after evaporation was purified by column chromatography on silica gel.

Step 2: General Procedure for the Deprotection of TBDMS from the parent compound. Using 1.1 Equiv. of TBAF. To a 15-mL polypropylene tube charged with a magnetic stirrer were added TBDMS protected alcohol (1.0 equiv) and anhydrous tetrahydrofuran. The buffered tetrabutylammonium fluoride solution (1.1 equiv fluoride) was added to the THF solution, the screw cap was added to the polypropylene tube, and the reaction mixture was stirred at 23° C. The reaction was complete after 3 h, at which point the crude material was loaded directly onto a silica gel flash column. Chromatography (30:70 ethyl acetate-hexanes, increasing to 50:50 ethyl acetate-hexanes) provided the intermediate II.

Step 3: The purified intermediate II was dissolved in dichloromethane and cooled to 0° C. A catalytic amount of 4-(dimethylamino)pyridine (DMAP, 10%) was added and the reaction mixture was stirred for 20 minutes at 0° C. under argon. Fatty acid (1 eq) and N-(3-diaminopropyl)-N'-ethylcarbodiimide hydrochloride (EDC·HCl, 1 eq.) were added to the reaction at 0° C. The mixture was stirred for 1 h, warmed up to room temperature and stirred overnight. The mixture was diluted with dichloromethane ($CH_2Cl_2$), washed with sat. $NaHCO_3$ solution followed by brine and dried with sodium sulfate. The crude intermediate III after evaporation was purified by column chromatography on silica gel.

Step 4: The intermediate III was added in one portion to a solution HCl/dioxane (4 ml, 4M) cooled to 0° C. under argon. The ice-bath was removed and the mixture was kept stirred at room temperature for 4 h. After completion, the reaction mixture was condensed by rotary evaporation under high vacuum. The residue was then taken into dry ethyl ether and collected by filtration to give the deprotected ester as a salt. This crude product and the phenol dichlorophosphate (1 eq) were dissolved in anhydrous dichloromethane and cooled to −78° C. under argon. Anhydrous trimethylamine (2 eq) was added dropwise and the reaction was allowed to slowly warm to room temperature and stirred for 2 h. After completion, the solvent was evaporated under reduced pressure and the resulting residue was dissolved in anhydrous ethyl ether and filtered. The filtrate was reduced to dryness to give intermediate IV which was used in the next step without further purification.

Step 5: To a stirring solution of remdesivir metabolite GS-441524, DCCHEMICALS (1 eq) in anhydrous THF, intermediate IV (3 eq) dissolved in anhydrous THF was added dropwise under argon. To the reaction mixture was added dropwise methylimidazole (5 eq) over 5 minutes at −78° C. After 15 minutes, the reaction was allowed to slowly warm to room temperature and stirred overnight. After completion, the solvent was removed under reduced pressure and the residue was dissolved in dichloromethane and washed with 0.5M HCl. The organic layer was dried over sodium sulfate, filtered, evaporated, and purified by column chromatography on silica gel.

Example 6

The Improvement of Stability of Remdesivir in Water by Nanoformulation

To verify the stability of remdesivir nanoformulation in saline, which is used in certain embodiments for Nebulization treatment, nanoformulation freeze-dried powder is resuspended with saline to make the final nebulizer-used medical solution. Controlled group is simply prepared by dissolving remdesivir with saline. Both groups are incubated at 4° C., 20° C. and 37° C. for 0, 2, 5, 10, 15 and 20 min, respectively. A small drop of samples is withdrawn from each group and mixed with a methanol/acetonitrile mixture (1:1, v/v) with 10% water containing 5-(2-Aminopropyl) indole (5-IT, 20 nM) in a volume ratio of 1:4. The concentration of parent drug (remdesivir) and metabolized compound (alanine metabolite, nucleoside monophosphate, nuc, nucleoside triphosphate) will be detected using LC-MS.

To verify the stability of remdesivir nanoformulation in plasma which is used for iv injection treatment, nanoformulation and controlled solution are prepared as described before. Both groups are incubated with plasma collected from wild-type (WT) C57BL/6 mice and or esterase-deficient (Ceslc−/−) C57BL/6 mice for 0, 5, 10, 30, 60 min and 2 hrs at 37° C., respectively. The samples are then prepared as previously described, and continuously filtered (Agilent Captiva 96 0.2 μm) and dried under a stream nitrogen. After reconstituted in a mixture of acetonitrile/formic acid solution (100:1:10000, V/V/V), a 10 μL aliquot is analyzed using LC-MS. The concentration of parent drug (remdesivir) and metabolized compound (alanine metabolite, nucleoside monophosphate, nuc, nucleoside triphosphate) will be detected through this method.

Example 7

The Improvement of Lung (Spleen, Lymph Node) Distribution and In Vivo Stability by Nanoformulation Nanoformulations were dissolved in 0.9% sterile saline and remdesivir was solubilized in 100% DMSO for in vitro studies and in vehicle containing 12% sulfobutylether-β-cyclodextrin in water (with HCl/NaOH) at pH 5 for in vivo studies. Hamsters were randomly assigned to 6 groups (n=24) were administered with remdesivir, albumin-nanoparticle of remdesivir, and liposome of remdesivir by I.V. injection at the dose of 5 mg/kg. And the nebulization of albumin based nanoparticle and nebulization of liposome and nebulization of PLA/PLGA NPs/MPs were dosed by inhalation with the equivalent dosage, after which plasma was isolated from triplicate mice at 0.25, 0.5, 1, 2, 4, 6, 8, and 12 hours after administration. Three male rhesus macaques of each groups (n=8) using the same dose regimen were administered a dose of remdesivir intravenously at 10 mg/kg, after which plasma was isolated at 0.083, 0.25, 0.5, 1, 2, 4, 8, and 24 hours after administration. The plasma concentrations of remdesivir, nucleotide monophosphate (Nuc-MP), diphosphate (Nuc-DP) and triphosphate (Nuc) were measured to determine the in vivo stability of prodrug and the pharmacokinetics profile of nanoformulation.

For both mouse and rhesus macaques, lung, spleen, lymph node tissues were isolated at different time point after administration and were snap-frozen. Frozen lung samples were pulverized and weighed. Dry ice-cold extraction buffer containing potassium hydroxide (0.1%) and EDTA (67 mM) in 70% methanol and containing chloroadenosine (0.5 mM). After clarifying centrifugation at 20,000 g for 20 min, supernatants were dried in a centrifuge evaporator. Dried samples were then reconstituted with 60 ml of mobile phase A, containing 3 mM ammonium formate (pH 5) with 10 mM dimethylhexylamine in water, and centrifuged at 20,000 g for 20 min, with final supernatants transferred to LC/MS injection vials to obtain the concentration of lung nucleotide monophosphate (Nuc-MP), diphosphate (Nuc-DP) and triphosphate (Nuc-TP). In addition, 25 ml of plasma isolated from both mice and rhesus macaques was treated and analyzed as described above in vitro improvement of stability by nanoformulation.

Example 8

The Improvement of Antivirals Efficacy by Nanoformulation

Nanoformulations were dissolved in 0.9% sterile saline and remdesivir was solubilized in 100% DMSO for in vitro studies and in vehicle containing 12% sulfobutylether-β-cyclodextrin in water (with HCl/NaOH) at pH 5 for in vivo studies.
1) In Vitro Efficacy and Cytotoxicity in Different Types of Human Lung Cell Lines.

To test whether the nano-based formulations have similar efficacy with remdesivir on viral replication inhibition in vitro, comparative antiviral assays was performed using the Calu-3 2B4 cells (human lung epithelial cell line), NHBE cells (human bronchiolar epithelial cell line), and HAE cells (primary human airway epithelial cell line). Briefly, cells were seeded into plates and 24 hours after plating $5 \times 10^4$ cells per well, fresh medium was added. In triplicate, cells were infected for 1 hour with SARS-CoV-2 (COVID 19) diluted in growth medium (MOI of 0.08) at 37° C., after which virus was removed, cultures were rinsed once, and fresh medium containing dilutions of remdesivir or nanoformulations was added. At the 48 hours postinfection (hpi), virus replication was measured by nLUC assay (Promega), and cytotoxicity was measured via CellTiter-Glo (Promega) assay and then read on a SpectraMax plate reader (Molecular Devices). The IC50 value was defined in GraphPad Prism7 (GraphPad) as the concentration at which there was a 50% decrease in viral replication using ultraviolet-treated MERS-nLUC (1000% inhibition) and vehicle alone (0% inhibition) as controls. CC50 value was determined through comparison of data with that from cell-free (100% cytotoxic) and vehicle-only (0% cytotoxic) samples. At 5 days postinfection (dpi), supernatants in plate well were collected, and the amount of virus was quantified by endpoint dilution assay, which was conducted by preparing serial dilutions of the assay media and adding these dilutions to fresh cell monolayers in plates to determine the tissue culture infectious dose that caused 50% cytopathic effects (TCID50) by Spearman-Karber method. Moreover, to measure levels of viral RNA from infected cells, total RNA was extracted using the RNA Isolation Kit and quantified using a quantitative reverse transcription polymerase chain reaction (qRT-PCR) assay with primers and probes specific for the SARS-Covid 19 nucleoprotein gene.
2) In Vivo Efficacy Studies:

Male and female hamsters were randomly assigned to 14 groups (n=8) inoculated intranasally with SARS-CoV-2 stock virus at a dosage of $10^5$ TCID50 respectively. Treatment in four groups including vehicle (1 ml/kg), remdesivir (5 mg/kg, IV), albumin-nanoparticle of remdesivir (5 mg/kg, IV), liposome of remdesivir (5 mg/kg), nebulization of albumin-based nanoparticle (5 mg/kg, inhalation), and nebulization of PLA/PLGA NPs/MPs before virus inoculation and continued once daily until 7 dpi. Another four groups were administered with the same regimen started at 12 h after inoculation. Then the body weight, respiratory rate, were recorded daily. At the 7 dpi, mice were dissected to collect different tissues to screen virus replication and histopathological changes. Major organs were grossly examined and then fixed in 10% buffered formalin solution, and paraffin sections (3-4 μm in thickness) were prepared routinely. Hematoxylin and Eosin (H&E) staining, periodic acid-Schiff (PAS) staining, and modified Masson's Trichrome staining were used to identify histopathological changes in all the organs. Blood was collected in EDTA tubes for ELISA analysis about the specific IgG against SARS-CoV after different formulations treatment. Then Lung tissues sections (3-4 μm in thickness) were prepared routinely and with IHC immunohistochemistry staining (microscope) combined immunofluorescence staining (confocal) to evaluate the viral antigens in different groups. Additionally, total RNA was extracted from the Lung and reverse transcription using the PrimerScript RT Reagent kit, following by a qRT-PCR reactions using the PowerUp SYBG Green Master Mix Kit to determine the virus replication in different groups.

Next a second experiment was performed to assess their therapeutic efficacy was evaluated on monkeys (*Macaca mulatta*). Rhesus macaques (3-6 years old) were randomly assigned to 12 experimental treatment groups (n=4), stratified by sex (with equal number of males and females per group) and balanced by body weight, using SAS statistical software. Treatments with remdesivir and remdesivir loaded nanoformulations as aforementioned (with the remdesivir dose of 10 mg/kg and vehicle 2 ml/kg) were initiated the day prior/after to infection by SARS-CoV-2 (COVID 19) virus. Animals were observed at least twice daily to monitor for disease signs and assigned a clinical score based on an Institutional Animal Care and Use Committee (IACUC)-approved scoring sheet including impaired ambulation preventing access to food or water, severe respiratory distress (open mouth breathing with lack of activity or cyanosis), lack of mental and physical alertness, or a body temperature of ≤35° C.

Example 9

Remdesivir Analog Synthesis

Figure 6:
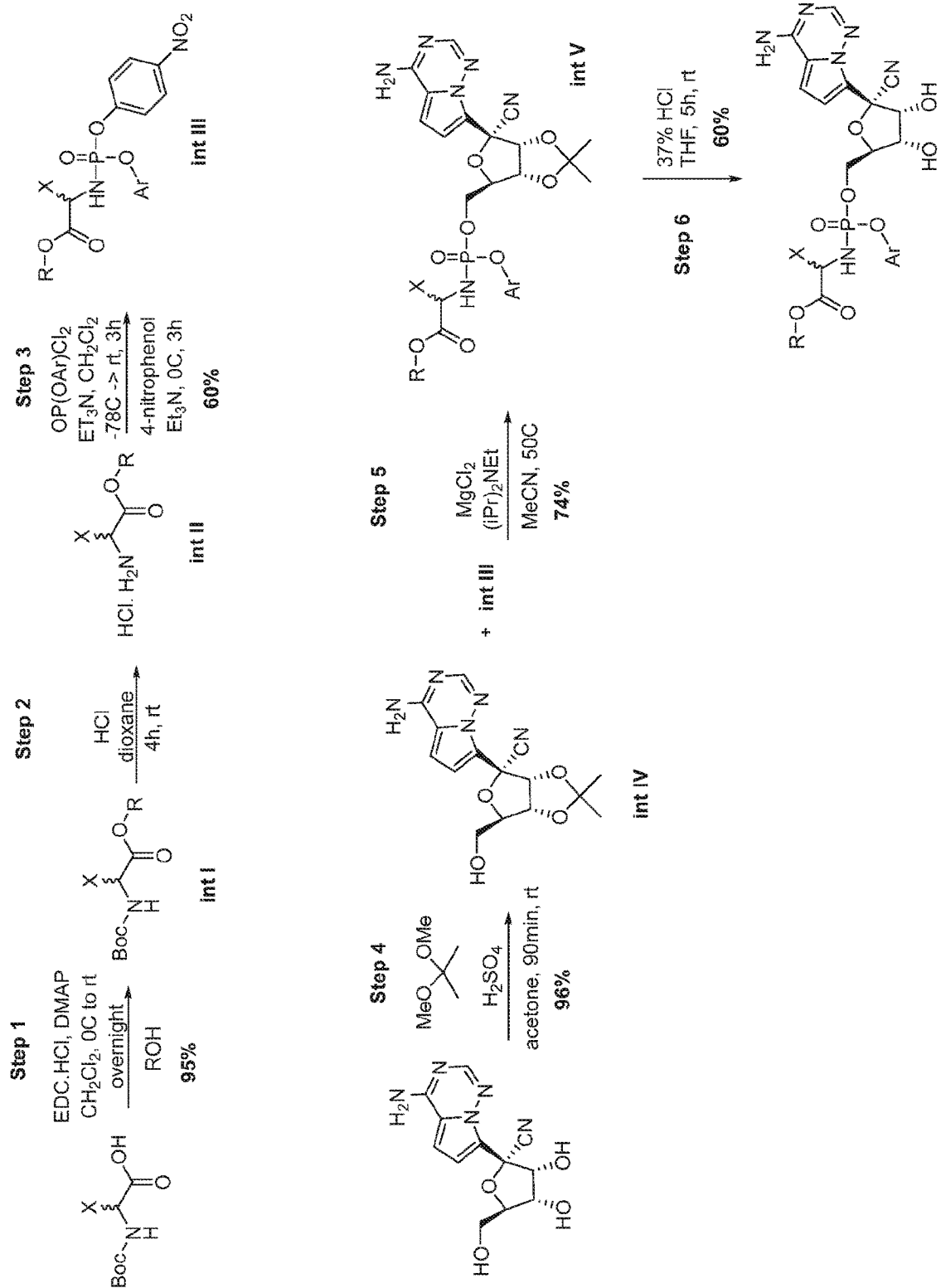

A remdesivir analog generation scheme is shown in FIG. 6.

Step 1: The alcohol was dissolved in dichloromethane and cooled to 0° C. A catalytic amount of 4-(dimethylamino)pyridine (DMAP, 10%) was added and the reaction mixture was stirred for 20 minutes at 0° C. under argon. N-Boc-amino acid (1 eq) and N-(3-diaminopropyl)-N'-ethylcarbodiimide hydrochloride (EDC·HCl, 1 eq) were added to the reaction at 0° C. The mixture was stirred for 1 h, warmed up to room temperature and stirred overnight. The mixture was diluted with dichloromethane ($CH_2Cl_2$), washed with sat. $NaHCO_3$ solution followed by brine and dried with sodium sulfate. The crude ester obtained after evaporation was purified by column chromatography on silica gel.

Step 2: The intermediate I was added in one portion to a solution of HC/dioxane (4 ml, 4M) cooled to 0° C. under argon. The ice-bath was removed and the mixture was kept stirred at room temperature for 4 h. After completion, the reaction mixture was condensed by rotary evaporation under high vacuum. The residue was then taken into dry ethyl ether and collected by filtration to give the deprotected alanine ester as a salt.

Step 3: The intermediate II (1.1 eq) and the aryloxy dichlorophosphate (I eq) were dissolved in anhydrous dichloromethane and cooled to −78° C. under argon. Triethylamine (5 eq) was added dropwise and the reaction was allowed to slowly warm to room temperature and stirred for 2 h. The mixture was then cooled to 0° C. and 4-nitrophenol (1 eq) was added followed by the slow addition of triethylamine (1.1 eq). The resulting mixture was allowed to slowly warm to room temperature and stirred for 3 h. After completion, the solvent was evaporated under reduced pressure and the resulting residue was dissolved in anhydrous ethyl ether and filtered. The filtrate was reduced to dryness to give intermediate III which was purified by column chromatography on silica gel.

Step 4: To a stirring solution of remdesivir metabolite GS-441524, DCCHEMICALS (1 eq) and 2,2-dimethoxypropane (4.8 eq) in acetone, sulfuric acid (18M, 1.3 eq) was added dropwise under argon at room temperature. The reaction mixture was stirred for 30 minutes and warmed to 45° C. After 30 minutes, the reaction was allowed to slowly cool to room temperature and solid sodium bicarbonate and water were sequentially added. The mixture was stirred for 20 minutes and the solvent was removed under reduced pressure. The residue was dissolved in ethyl acetate and water. The aqueous layer was extracted with ethyl acetate and the organic layer was dried over sodium sulfate, filtered, evaporated, and purified by column chromatography on silica gel.

Step 5: To a solution of intermediate III (1.2 eq) in acetonitrile, was added intermediate IV (1 eq), and magnesium chloride (1 eq) at room temperature. The solution was heated to 50° C. for 15 min, and N,N-diisopropylethylamine (2.5 eq) was added. After 1 hour, the reaction mixture was allowed to cool to room temperature, and then diluted with ethyl acetate. The organic layer was washed with 5% aqueous citric acid solution, saturated aqueous ammonium chloride solution, 5% aqueous potassium carbonate solution, and brine. The organic layer was dried over anhydrous sodium sulfate and reduced to dryness to give intermediate V, which was purified by column chromatography on silica gel.

Step 6: To a stirred solution of intermediate V (1 eq) in tetrahydrofuran was added 37% aqueous hydrochloric acid solution slowly at 0° C. The reaction mixture was allowed to warm to room temperature. After 6 h, the reaction mixture was diluted with water and adjusted to pH=8 by the addition of saturated aqueous sodium bicarbonate solution. The resulting mixture was extracted with ethyl acetate, and the organic layer was then washed with brine, dried over anhydrous sodium sulfate, and concentrated under reduced pressure. The crude product obtained after evaporation was purified by column chromatography on silica gel to give the remdesivir analog.

Compound MMT5-14:

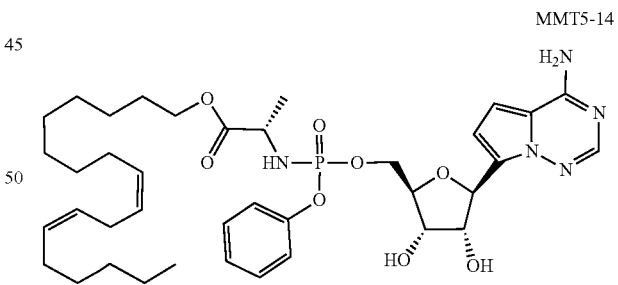

MMT5-14

$^1$H NMR (500 MHz, methanol-$d_4$) δ 7.85 (s, 1H), 7.29 (dt, J=9.1, 7.4 Hz, 2H), 7.21-7.10 (m, 3H), 6.93-6.85 (m, 2H), 5.43-5.23 (m, 4H), 4.79 (d, J=5.4 Hz, 1H), 4.47-4.33 (m, 2H), 4.33-4.23 (m, 1H), 4.19 (dt, J=17.5, 5.5 Hz, 1H), 4.10-3.94 (m, 2H), 3.92-3.76 (m, 1H), 2.76 (t, J=6.3 Hz, 2H), 2.11-1.98 (m, 4H), 1.60-1.52 (m, 2H), 1.41-1.19 (m, 23H), 0.89 (t, J=6.8 Hz, 3H); 13C NMR (126 MHz, methanol-$d_4$) δ 173.49, 155.83, 150.44, 146.93, 146.89, 129.51, 129.49, 129.29, 129.26, 127.64, 124.64, 124.14, 120.01, 119.97, 119.96, 119.92, 116.53, 116.17, 110.97, 110.91, 101.18, 82.92, 82.85, 79.89, 79.70, 74.21, 70.28, 70.12, 65.00, 64.93, 50.04, 48.09, 31.24, 29.30, 29.06, 29.04, 28.89, 28.88, 28.85, 28.28, 28.22, 26.74, 25.49, 25.48, 25.12, 22.20, 19.03, 13.01; $^{31}$P NMR (202 MHz, methanol-d$_4$) δ 3.52 (s), 3.50 (s); MS (m/z)=767.2 [M+1]

Compound MMT5-15:

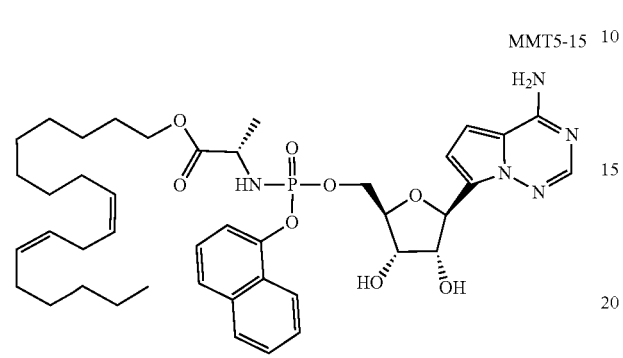

$^1$H NMR (500 MHz, methanol-d$_4$) δ 8.09 (ddd, J=24.8, 7.6, 2.2 Hz, 1H), 7.88-7.78 (m, 2H), 7.66 (t, J=7.9 Hz, 1H), 7.52-7.46 (m, 2H), 7.46-7.40 (m, 1H), 7.38-7.28 (m, 1H), 6.87-6.77 (m, 2H), 5.43-5.18 (m, 4H), 4.69 (t, J=5.5 Hz, 1H), 4.49-4.41 (m, 1H), 4.42-4.37 (m, 1H), 4.34 (td, J=10.6, 10.0, 4.4 Hz, 1H), 4.19 (t, J=5.5 Hz, 1H), 4.03-3.91 (m, 3H), 2.75 (t, J=6.3 Hz, 2H), 2.09-1.91 (m, 4H), 1.55-1.42 (m, 2H), 1.39-1.07 (m, 23H), 0.89 (t, J=6.8 Hz, 3H); $^{13}$C NMR (126 MHz, methanol-d$_4$) δ 173.46, 155.62, 146.86, 134.68, 129.51, 129.49, 127.64, 127.63, 127.41, 126.30, 125.99, 125.94, 125.02, 124.52, 124.47, 124.09, 121.31, 121.24, 116.17, 114.74, 110.92, 110.79, 101.22, 83.01, 79.82, 74.28, 74.21, 70.28, 69.99, 65.36, 65.02, 64.91, 48.09, 31.23, 29.27, 29.04, 29.02, 28.86, 28.83, 28.23, 28.19, 26.74, 26.72, 25.46, 25.44, 25.12, 22.19, 18.93, 13.01; $^{31}$P NMR (202 MHz, methanol-d$_4$) δ 3.93 (s), 3.87 (s); MS (m/z)= 817.1 [M+1]

Compound MM5-1:

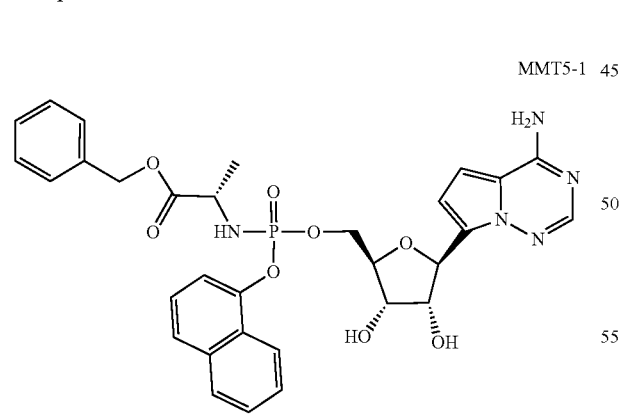

$^1$H NMR (500 MHz, methanol-d$_4$) δ 8.12-8.01 (m, 1H), 7.88-7.78 (m, 2H), 7.65 (dd, J=10.7, 8.2 Hz, 1H), 7.52-7.36 (m, 3H), 7.35-7.20 (m, 6H), 6.91-6.71 (m, 2H), 5.09-4.95 (m, 2H), 4.67 (dd, J=9.2, 5.5 Hz, 1H), 4.47-4.25 (m, 3H), 4.20-4.13 (m, 1H), 4.02-3.89 (m, 1H), 1.31-1.24 (m, 3H); $^{13}$C NMR (126 MHz, methanol-d$_4$) δ 172.32, 156.25, 146.86, 146.44, 135.73, 128.10, 128.08, 127.84, 127.83, 127.81, 127.37, 126.29, 125.00, 124.46, 121.19, 116.45, 101.20, 74.21, 70.23, 70.16, 66.51, 66.42, 48.08, 38.46, 18.90; $^{31}$P NMR (202 MHz, methanol-d$_4$) δ 3.95 (s), 3.82 (s); MS (m/z)=659.4 [M+1].

Compound MMT4-70:

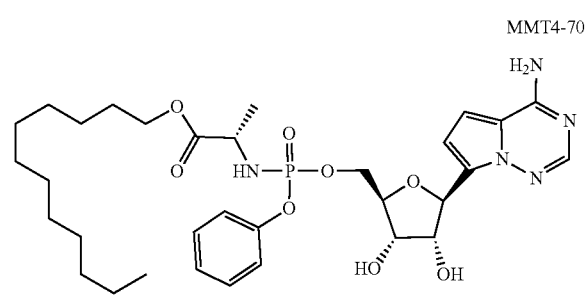 [SMILES: CCCCCCCCCCCCOC(=O)[C@H](C)NP(=O)(OC[C@H]1O[C@@H](c2ccc3c(N)ncnn23)[C@H](O)[C@@H]1O)Oc1ccccc1]

$^1$H NMR (500 MHz, methanol-d$_4$) δ 7.85 (d, J=7.5 Hz, 1H), 7.29 (dt, J=9.2, 7.2 Hz, 2H), 7.22-7.07 (m, 3H), 6.97-6.73 (m, 2H), 4.79 (d, J=5.4 Hz, 1H), 4.45-4.33 (m, 2H), 4.33-4.24 (m, 1H), 4.18 (dt, J=17.3, 5.5 Hz, 1H), 4.10-3.96 (m, 3H), 1.64-1.48 (m, 2H), 1.26 (tdd, J=13.7, 5.7, 2.2 Hz, 25H), 0.89 (t, J=6.8 Hz, 3H); $^{13}$C NMR (126 MHz, methanol-d$_4$) δ 173.49, 155.83, 150.78, 150.72, 146.91, 146.87, 129.28, 129.25, 124.68, 124.64, 124.15, 124.12, 120.01, 116.52, 116.17, 110.97, 110.91, 101.19, 83.08, 82.92, 82.85, 79.88, 79.70, 74.23, 74.22, 71.49, 70.28, 70.15, 70.12, 65.78, 65.74, 65.01, 64.94, 50.05, 48.09, 31.64, 29.32, 29.31, 29.25, 29.19, 29.03, 28.90, 28.28, 28.21, 27.56, 25.49, 25.48, 22.30, 13.01; $^{31}$P NMR (202 MHz, methanol-d$_4$) δ 3.53 (s), 3.49 (s); MS (m/z)=687.0 [M+1].

Compound MMT4-98:

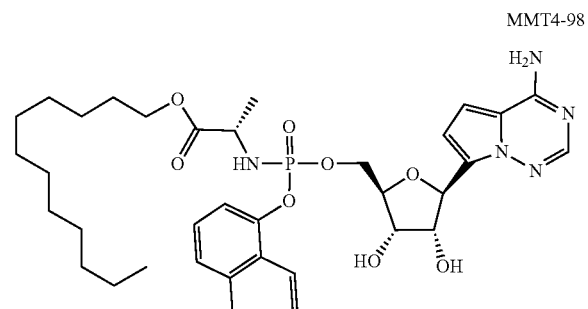

$^1$H NMR (500 MHz, methanol-d$_4$) δ 8.16-8.02 (m, 1H), 7.87-7.79 (m, 2H), 7.66 (t, J=8.0 Hz, 1H), 7.53-7.40 (m, 3H), 7.34 (dt, J=9.5, 7.9 Hz, 1H), 6.88-6.76 (m, 2H), 4.69 (t, J=5.6 Hz, 1H), 4.46 (dddd, J=11.4, 8.9, 6.0, 2.8 Hz, 1H), 4.41-4.30 (m, 2H), 4.19 (t, J=5.5 Hz, 1H), 4.04-3.90 (m, 3H), 1.58-1.43 (m, 2H), 1.37-1.09 (m, 25H), 0.89 (t, J=6.8, 3H); $^{13}$C NMR (126 MHz, methanol-d$_4$) δ 173.42, 155.83, 146.94, 146.87, 134.83, 127.40, 126.30, 125.98, 125.93, 125.01, 124.46, 124.10, 124.02, 121.31, 121.23, 116.46, 116.17, 114.74, 110.91, 110.78, 101.21, 79.82, 74.28, 74.21, 70.28, 70.16, 69.99, 65.03, 64.92, 48.08, 31.63, 29.29, 29.22, 29.15, 29.13, 29.03, 28.88, 28.86, 28.23, 28.19, 25.44, 22.30, 13.01; $^{31}$P NMR (202 MHz, methanol-d$_4$) δ 3.92 (s), 3.87 (s); MS (m/z)=737.1 [M+1].

Example 10

Bioanalysis of Remdesivir Analogs and Related Metabolites

For nucleoside triphosphate analysis, LC-MS/MS was performed by ion-pairing chromatography using LC 20AD UFLC (Shimadzu, Japan) couple with an API 5500 (AB Sciex, USA). The separation was achieved on a 50×2.1 mm Agilent 3.5 µm C18 column. The mobile phase consisted of 3 mM ammonium formate with 10 mM dimethylhexylamine in water (mobile phase A), and 0.1% formic Acid in ACN (mobile phase B). A multi-stage linear gradient initiated with 2% B for 1 min, increased to 95% B in 2 min and maintained with 95% B for 1 min at a flow rate of 0.4 mL/min. Detection was performed on negative ion mode and multiple reaction monitoring modes.

Remdesivir, analogs and their metabolites alanine metabolite and Nuc were analyzed on an X500R QTOF System (AB Sciex, USA). Chromatographic separation was obtained on a 50×2.1 mm Agilent 3.5 µm C18 column using constant flow rate of 0.6 mL/min. The gradient mobile phase consisted of 0.1% formic acid in water (mobile phase A) and 0.1% formic acid acetonitrile (mobile phase B), running from 5% B to 95% B within 3 min and then maintaining 95% B for 1 min. The eluent was introduced into quadrupole time-of-flight mass spectrometry by electrospray ionization (ESI) operated in positive modes.

All the analytes were quantified using 10-point standard curves ranging from 5 to 5000 ng/mL.

Example 11

Plasma Stability of Remdesivir Analogs

To test the in-vitro plasma stability, 5 ul of 100M test compound (remdesivir, MMT4-70, MMT4-98, MMT5-1) was added to 495 ul human, hamster, and mouse plasma, respectively. The structures of MMT4-70, MMT4-98, MMT5-1 are shown below. Aliquot of 40 µL was pipetted from the reaction solution and stopped by the addition of 160 µL cold acetonitrile at different sampling time (0, 10 min, 30 min, 60 min and 120 min). The incubation solution was centrifuged at 3500 rpm for 10 minutes to precipitate protein. The supernatant was used for LC/MS/MS analysis.

Figure 7:
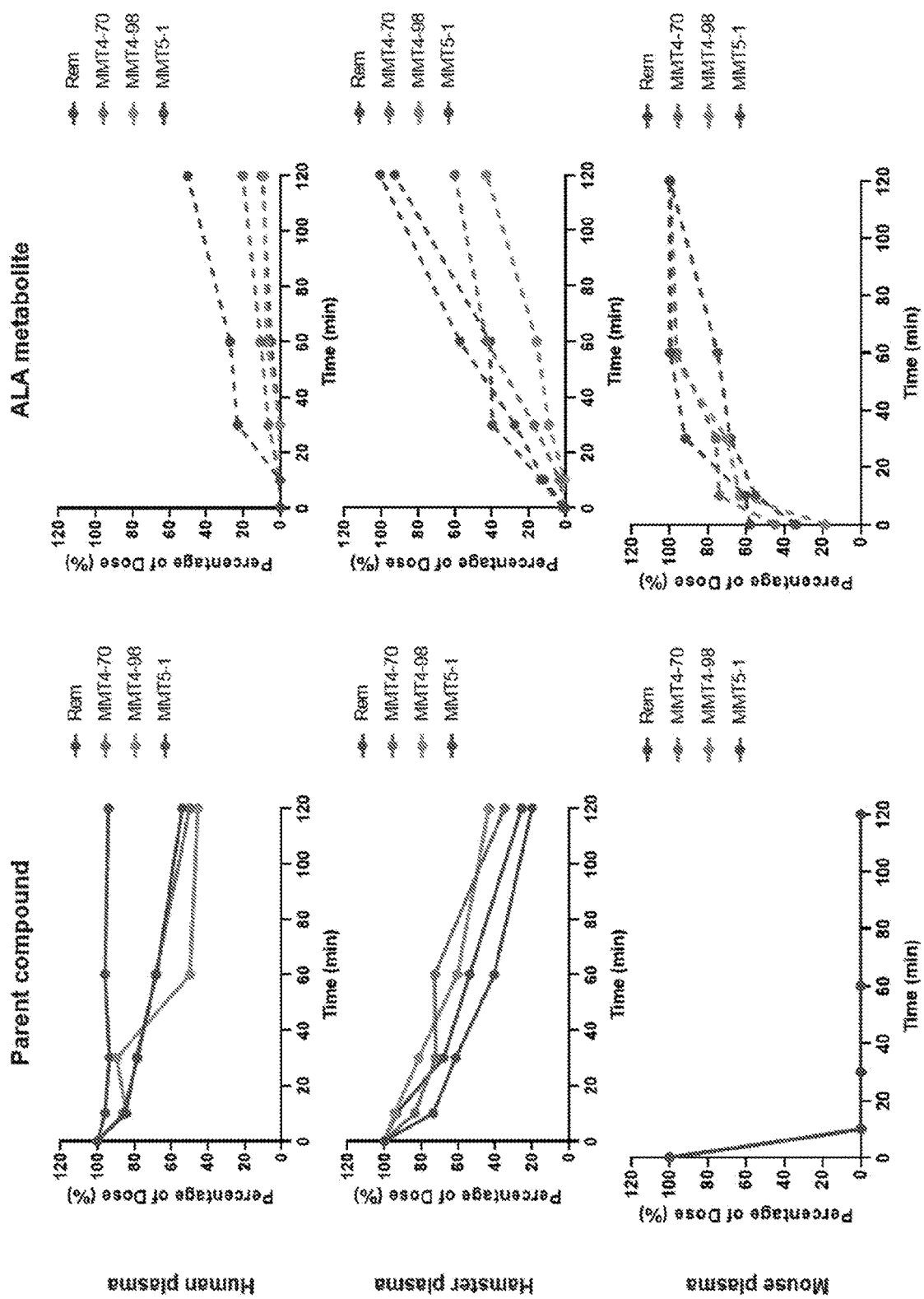
Figure 8A:
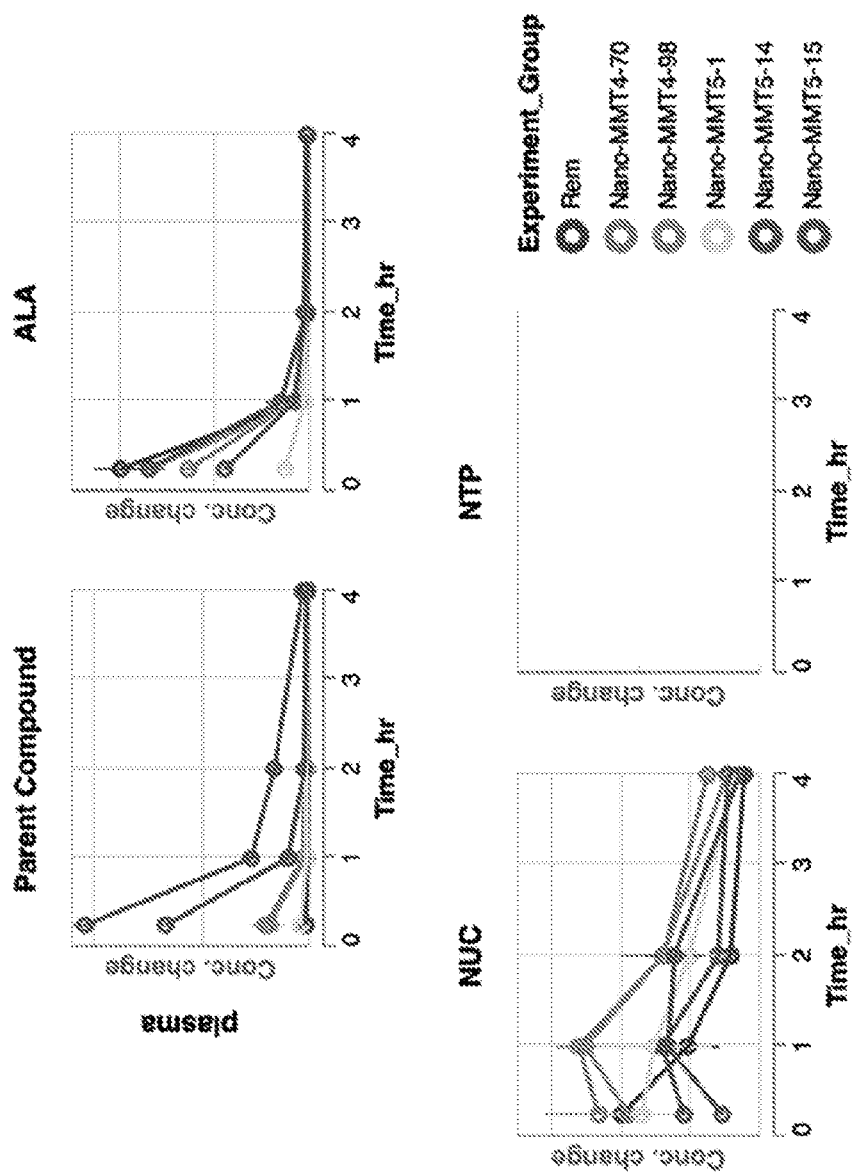
Figure 8B:
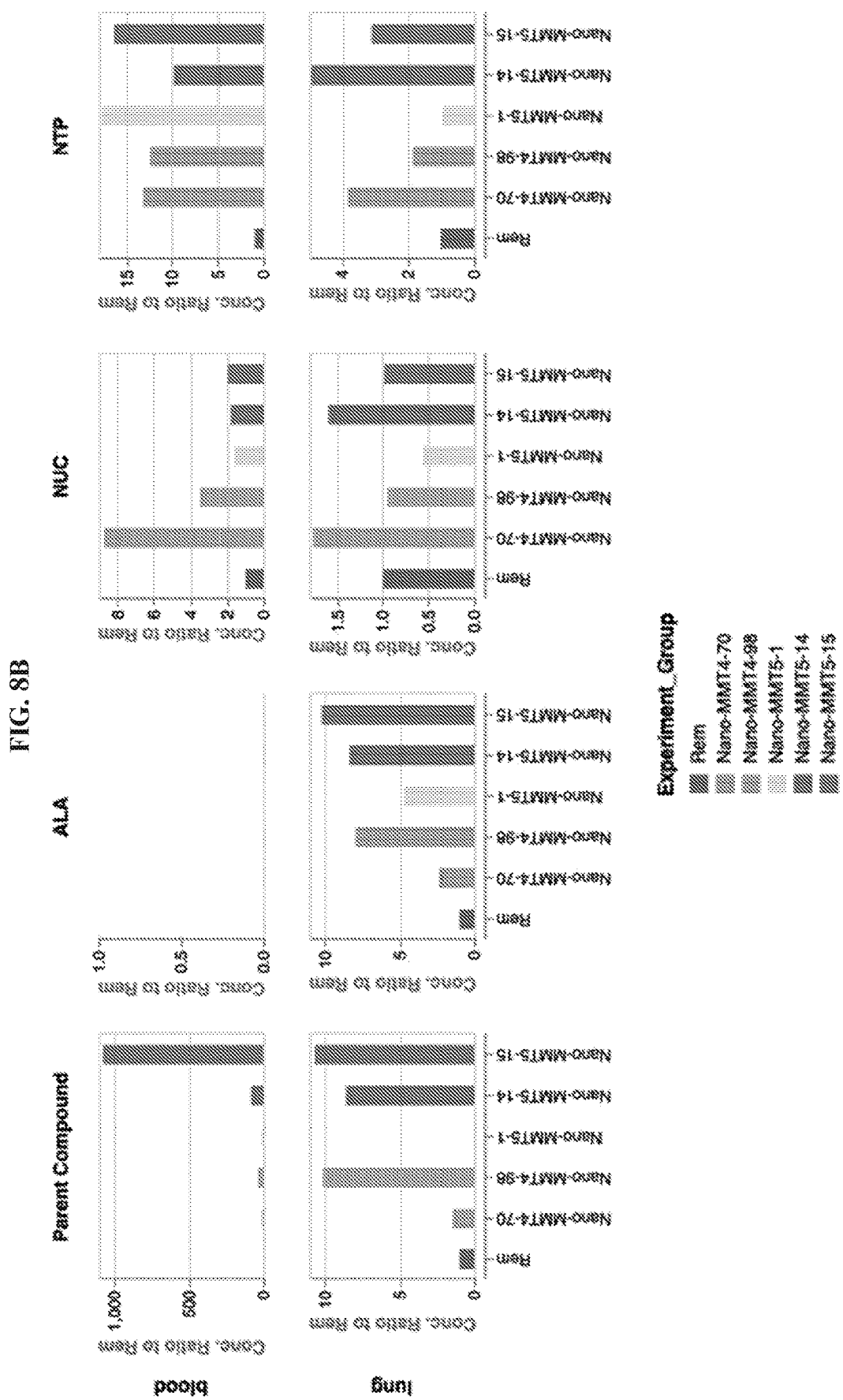
Figure 9A:
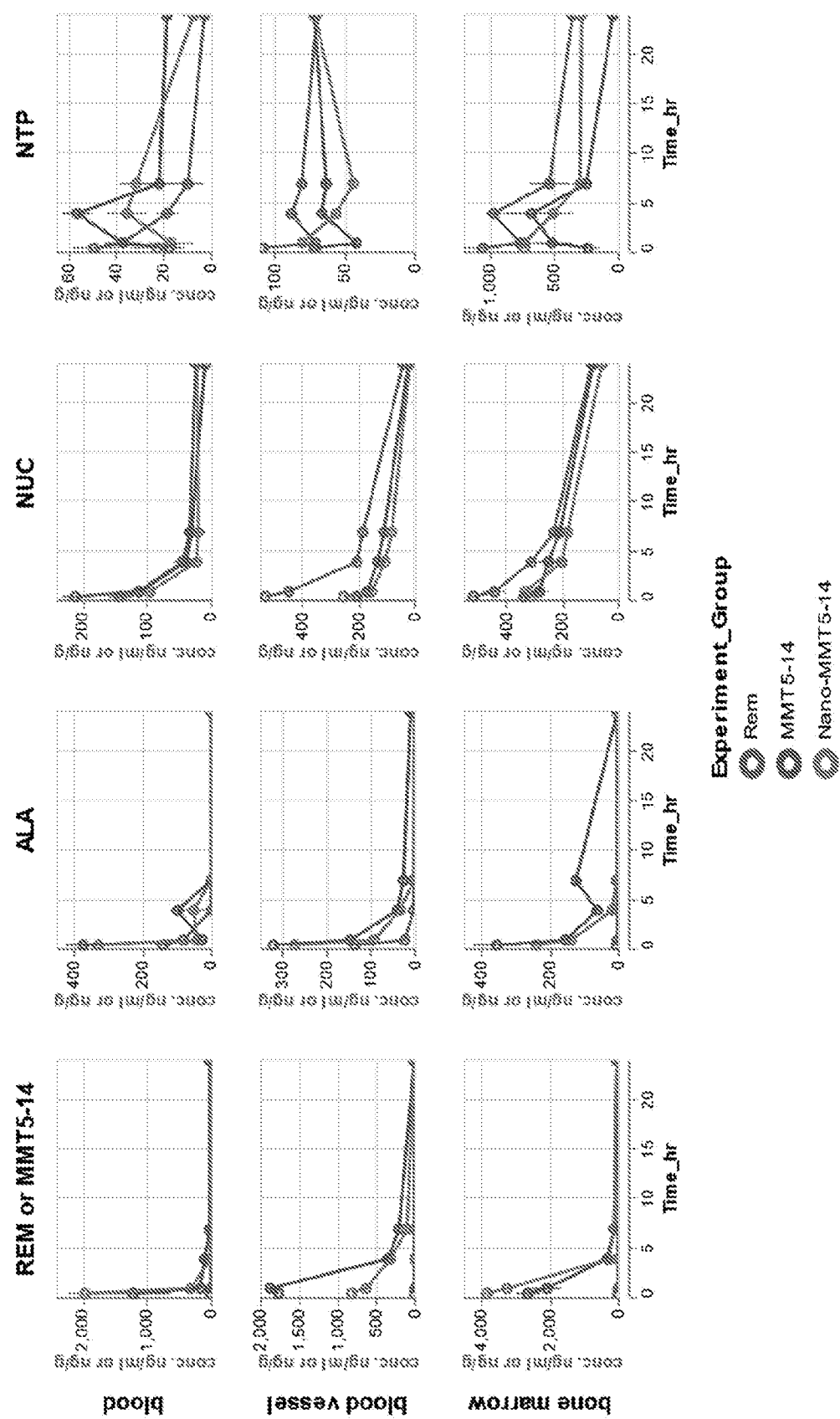
Figure 9B:
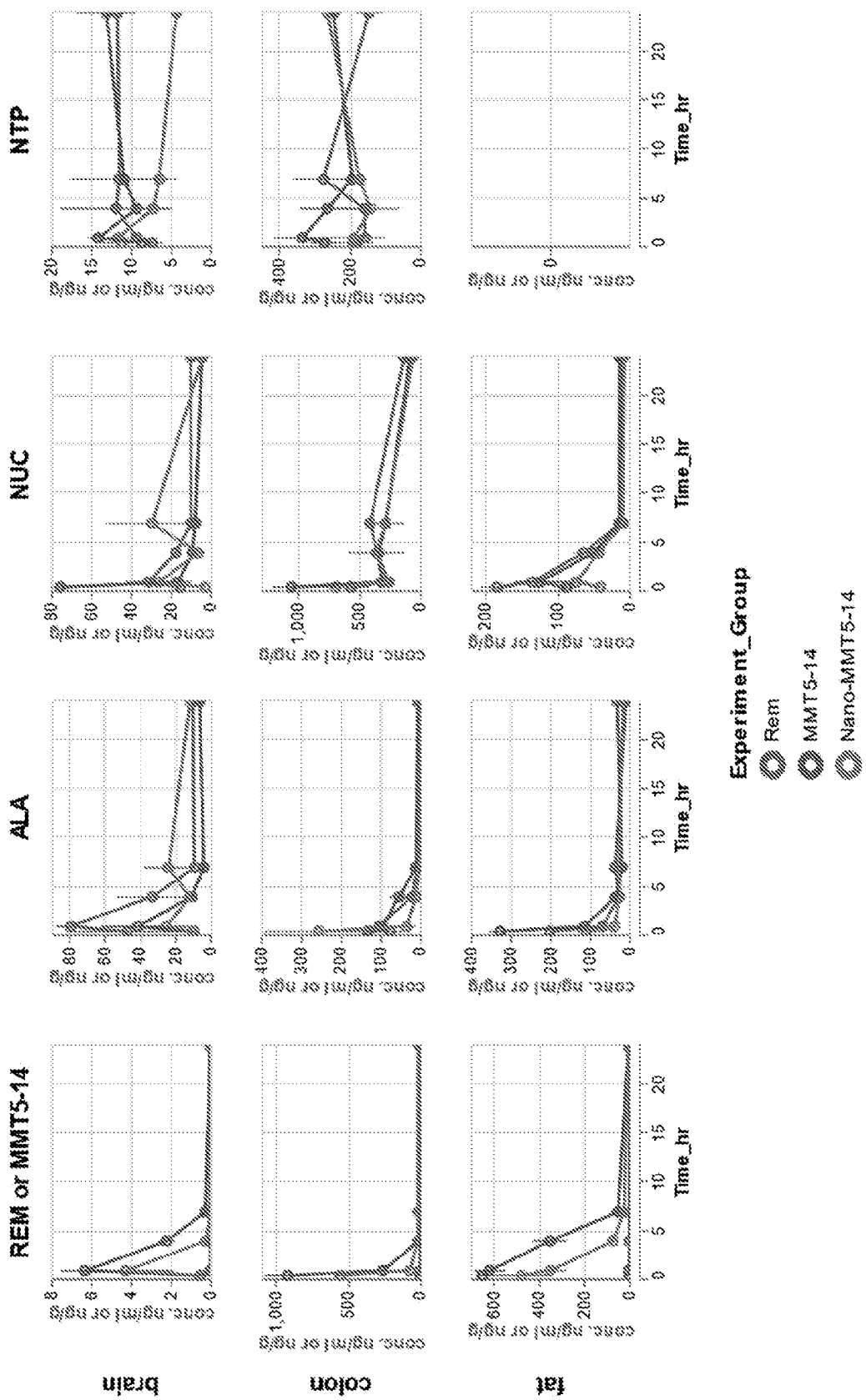
Figure 9C:
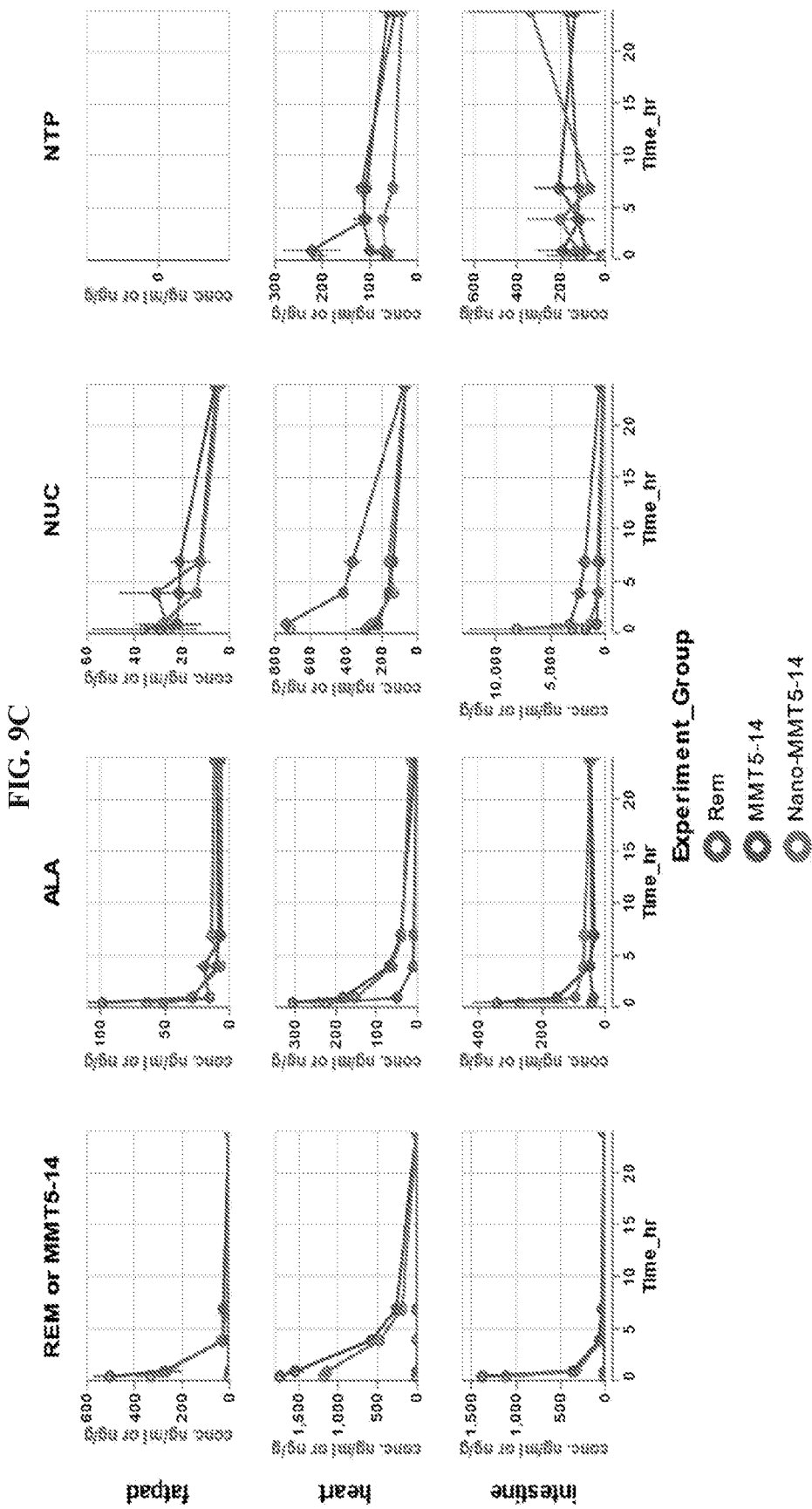
Figure 9D:
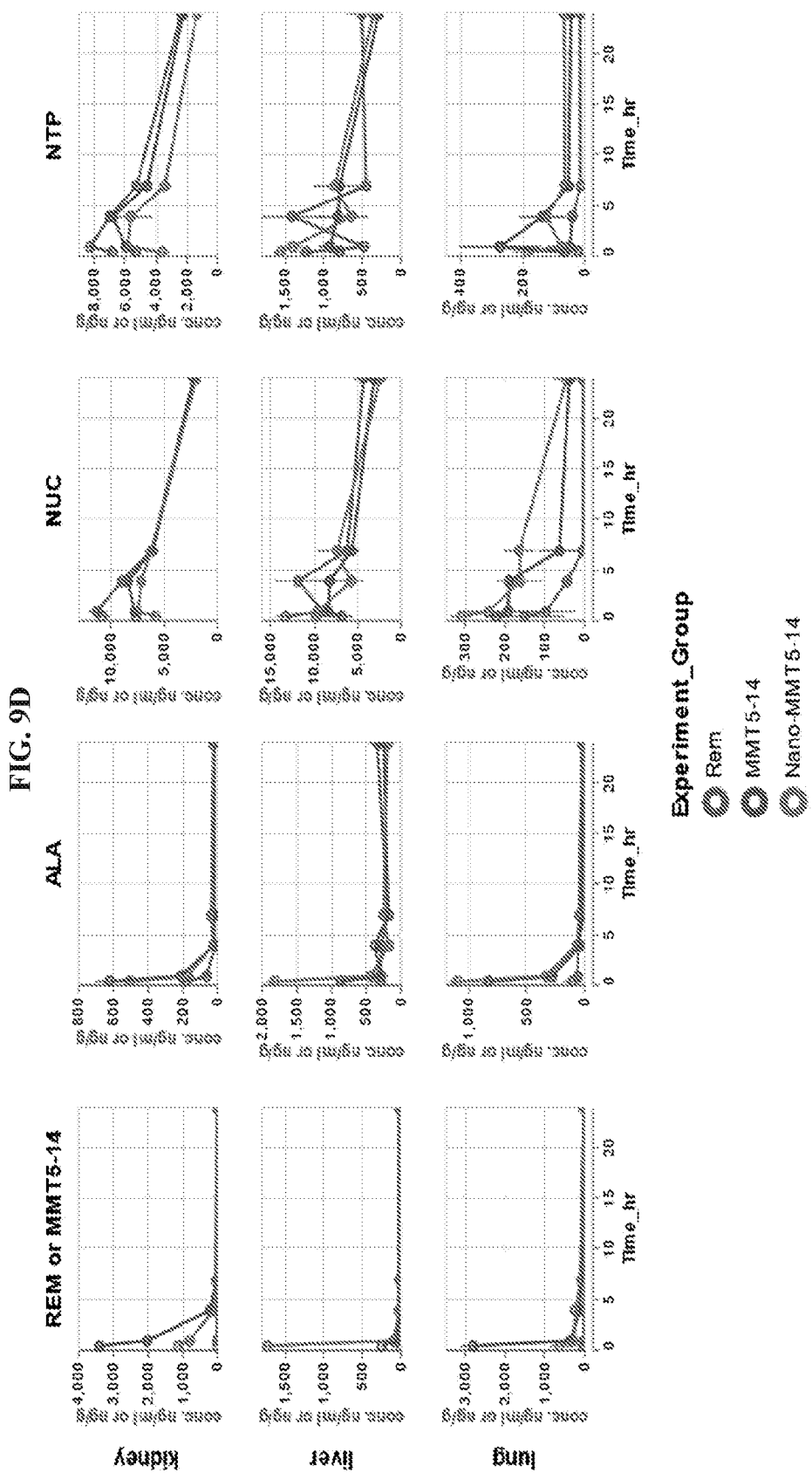
Figure 9E:
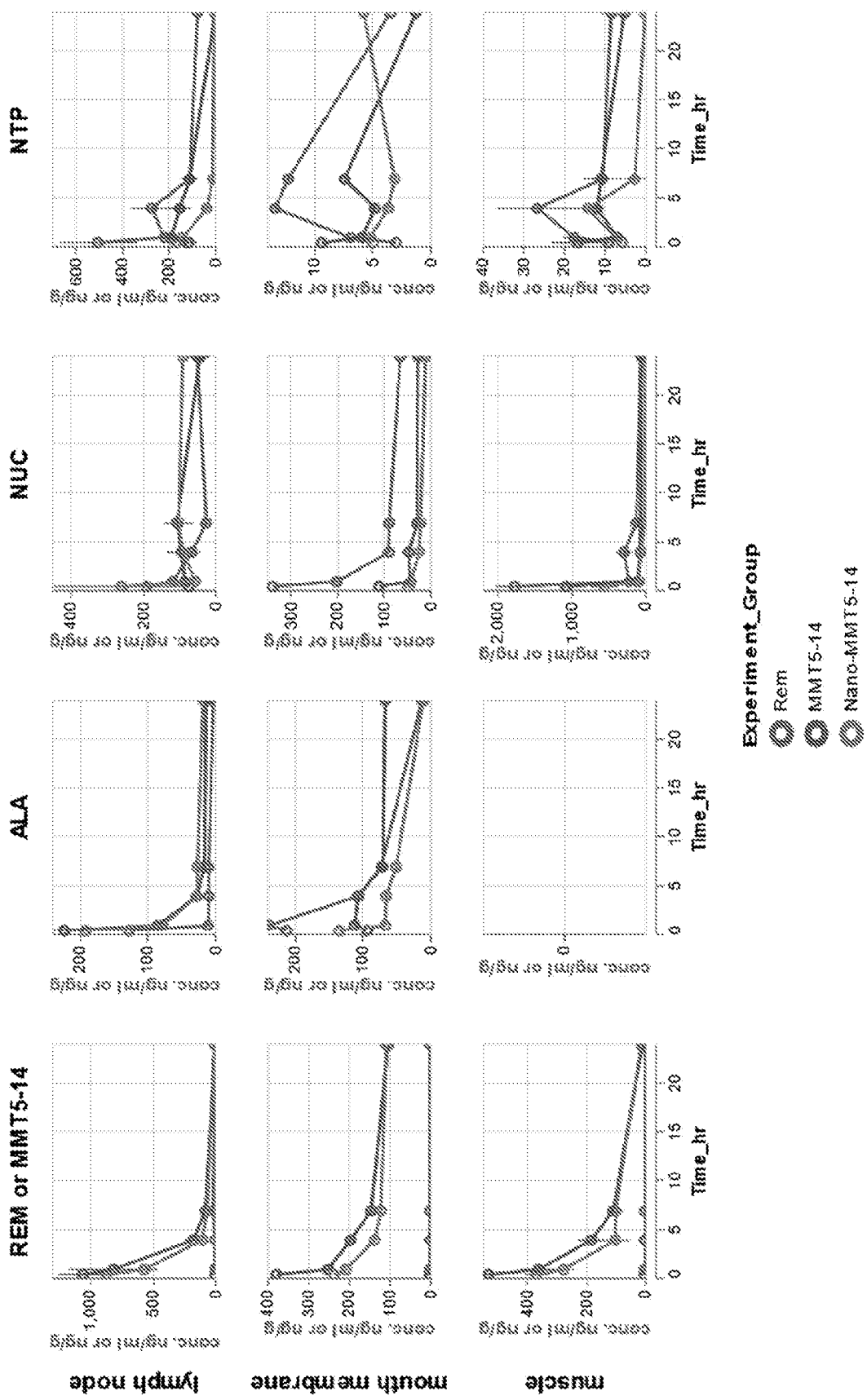
Figure 9F:
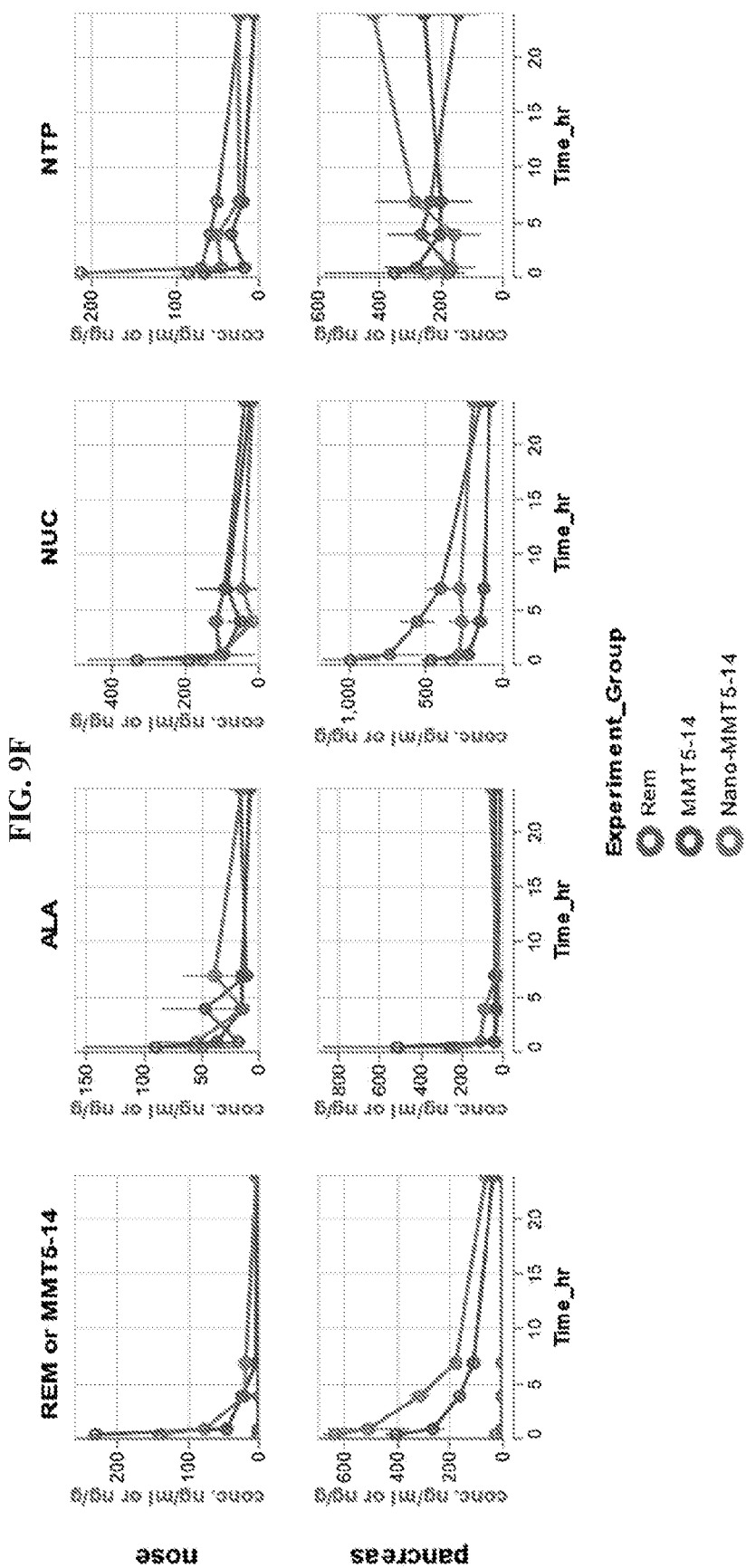
Figure 9G:
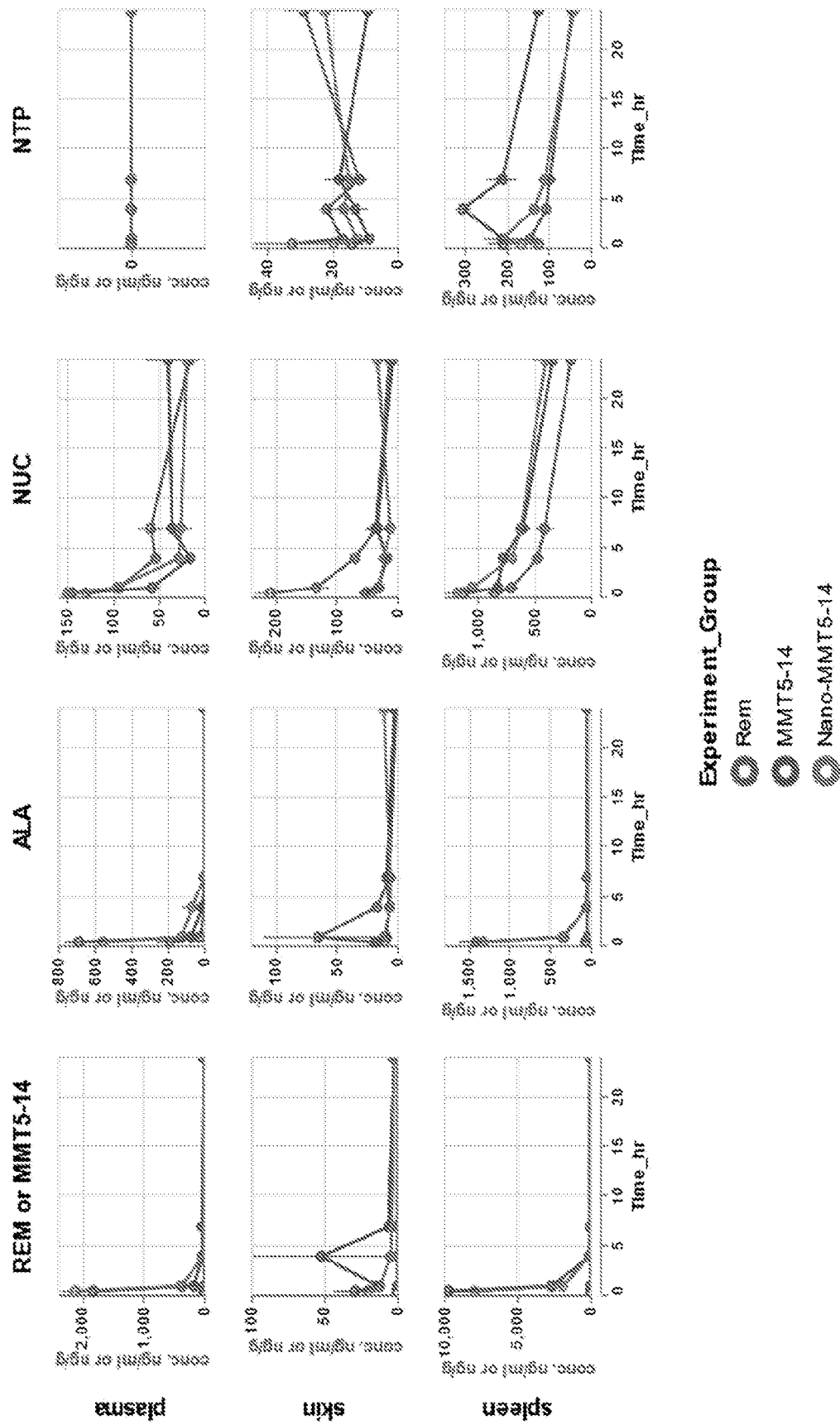
Figure 9H:
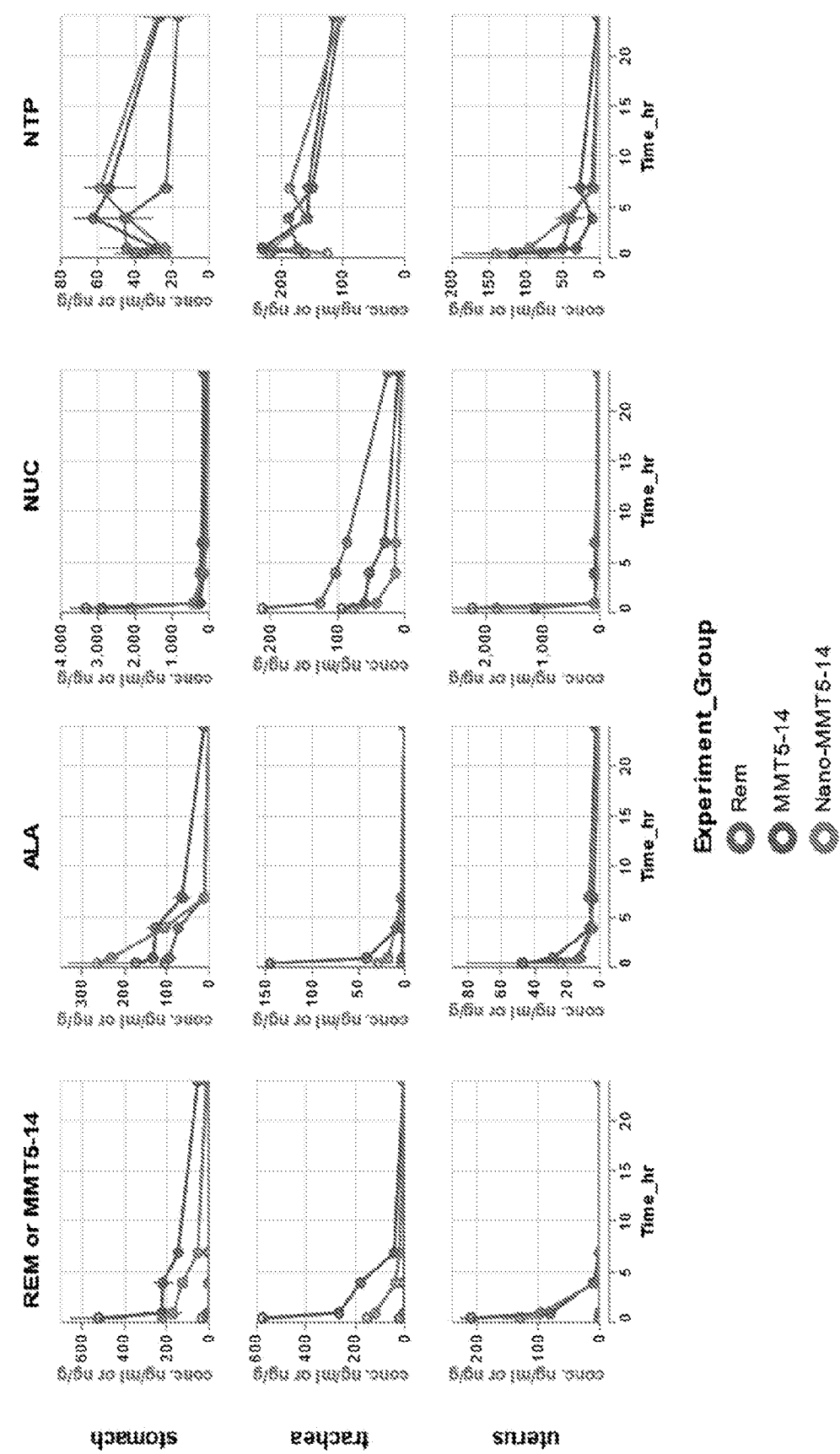
Figure 10A:
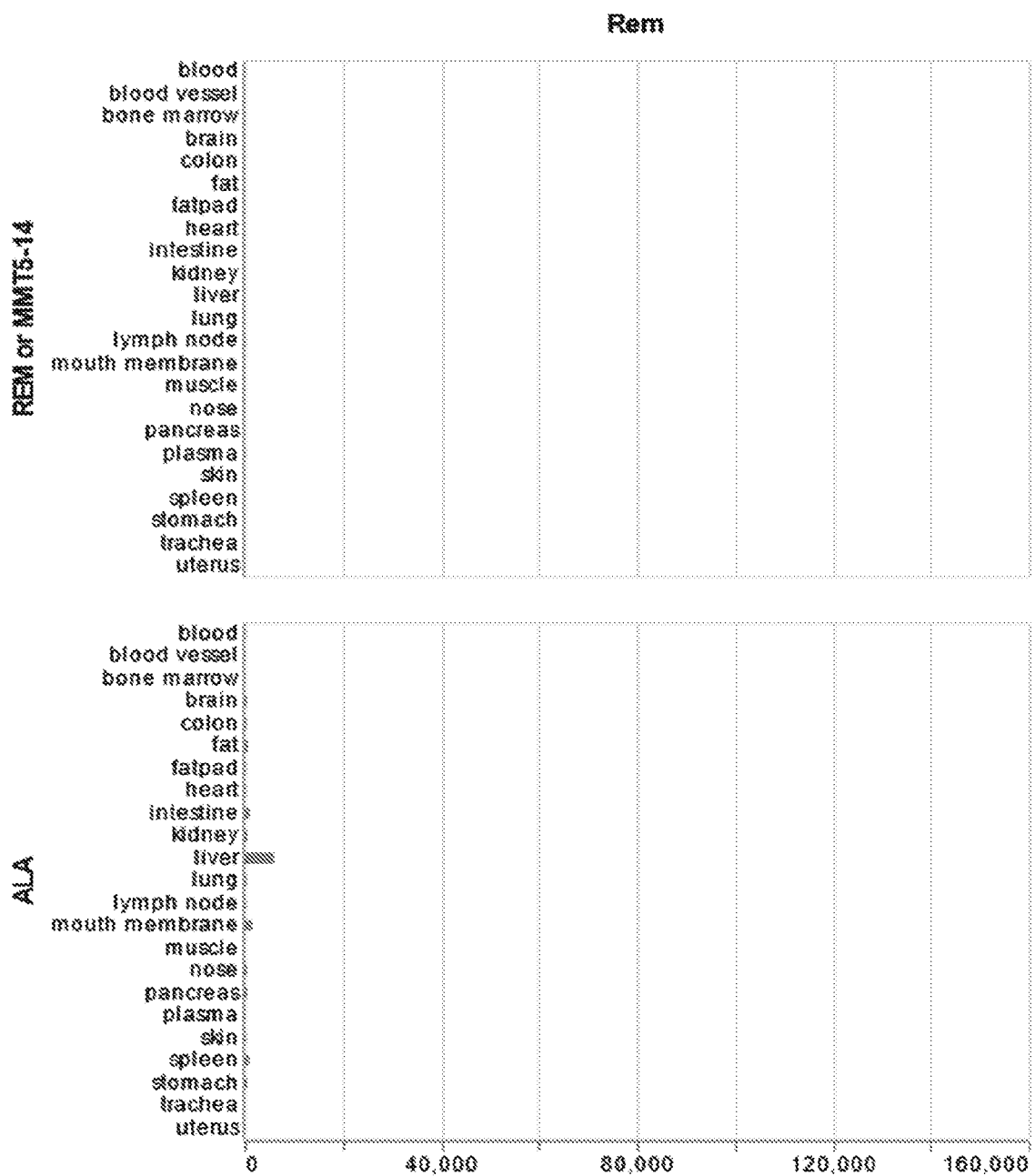
Figure 10B:
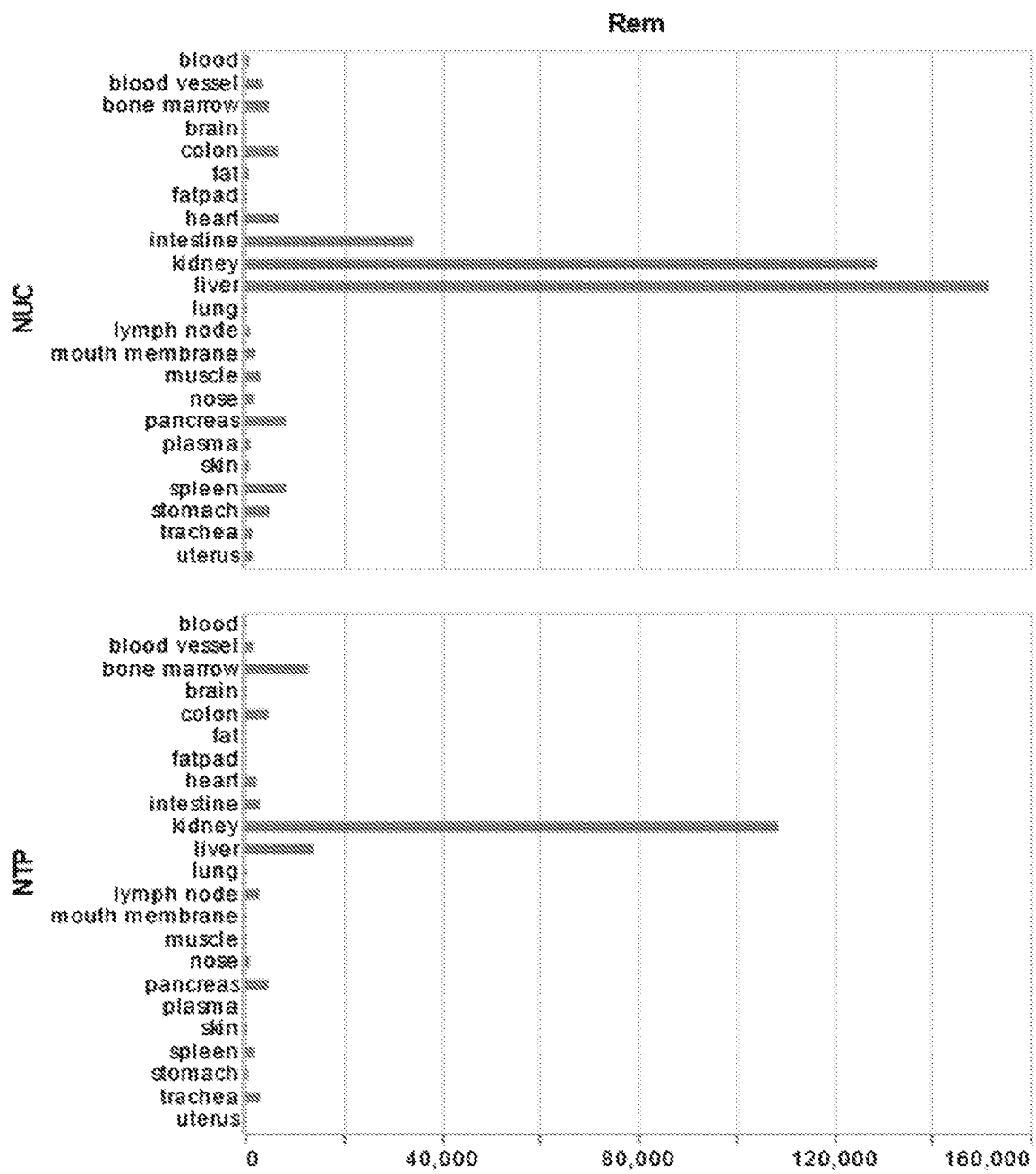
Figure 10C:
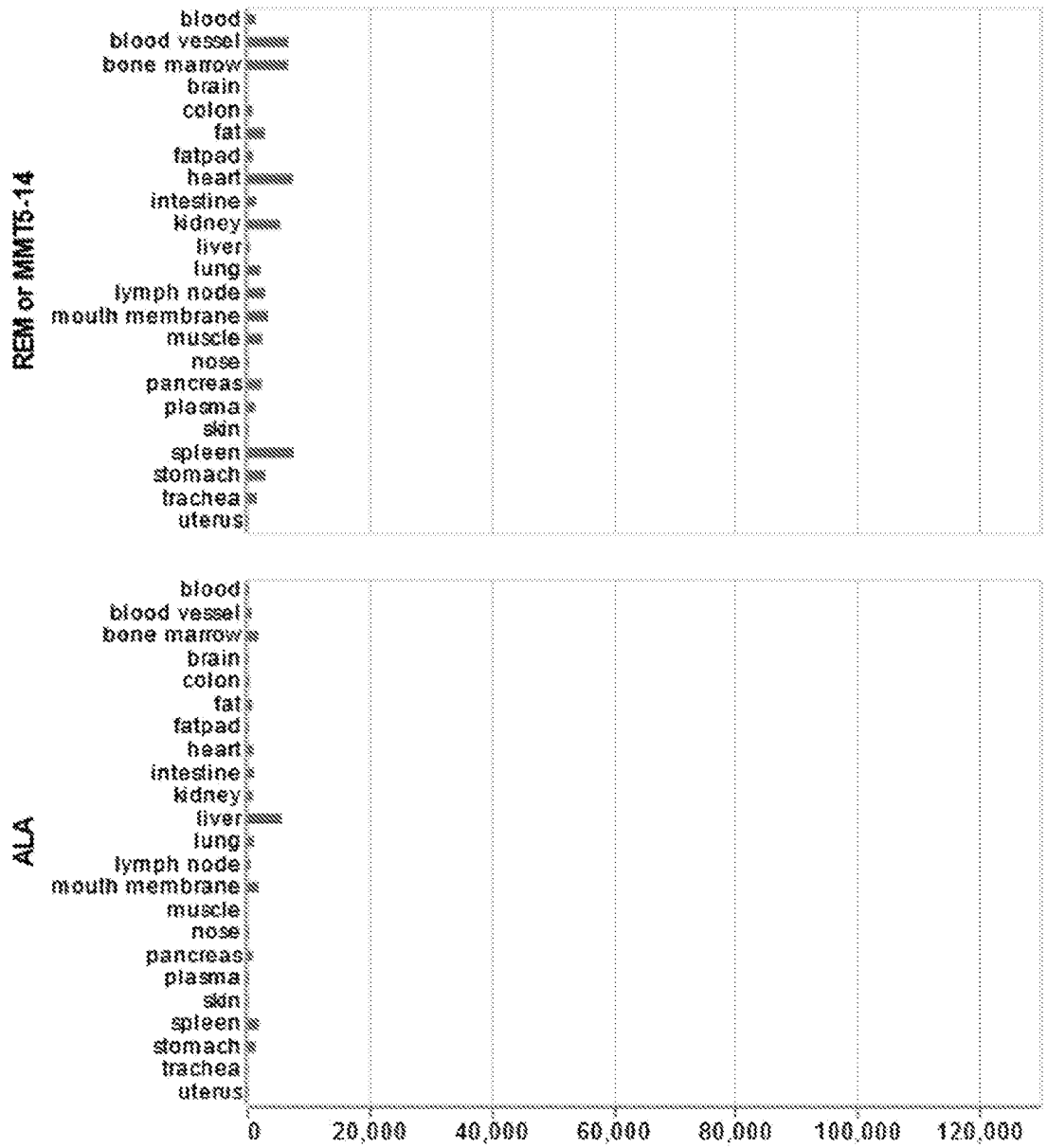
Figure 10D:
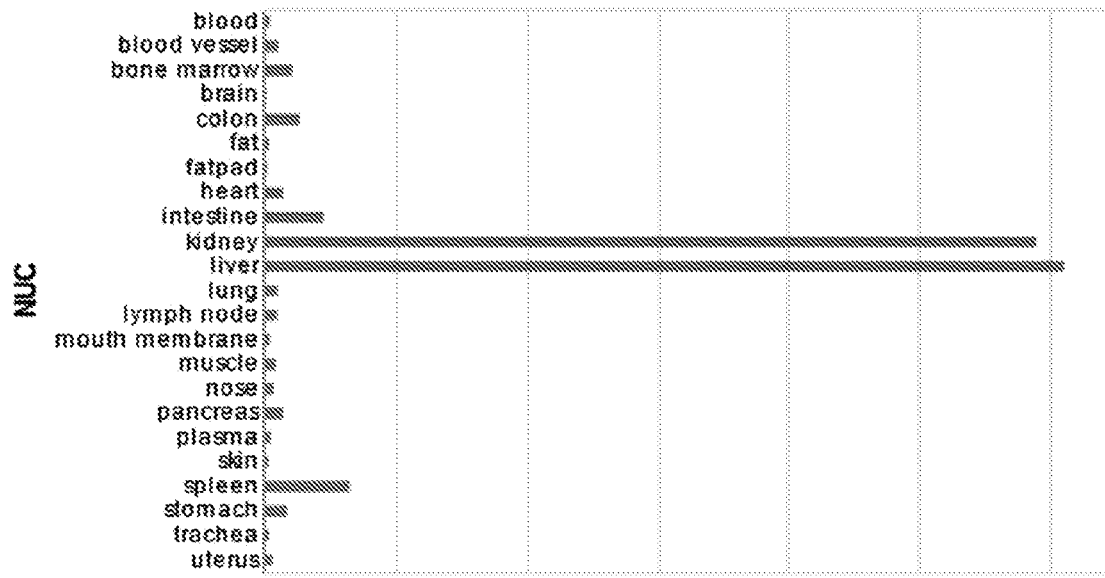
Figure 10D:
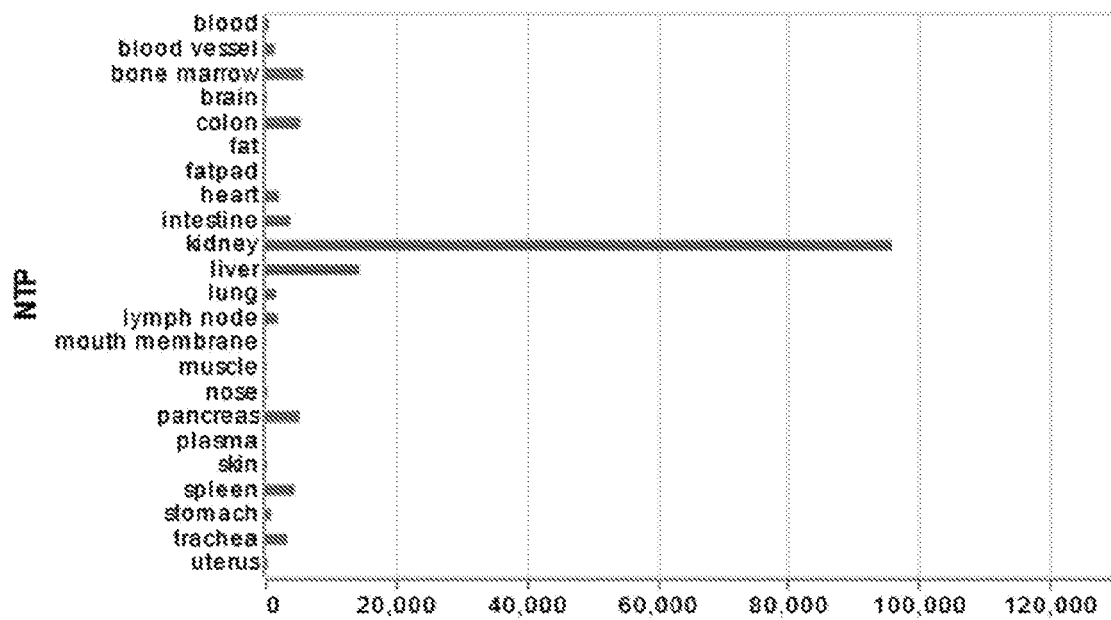
Figure 10E:
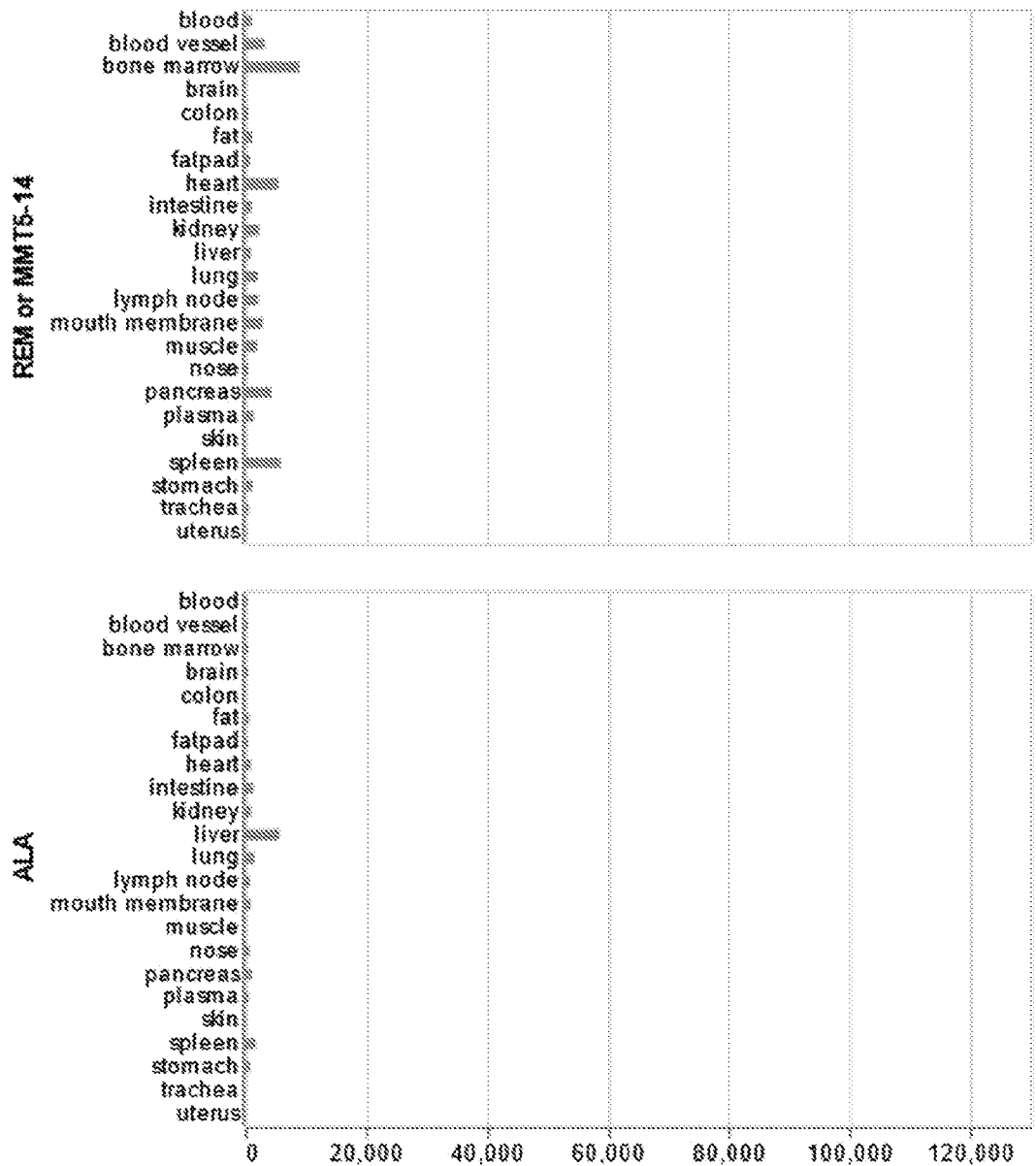
Figure 10F:
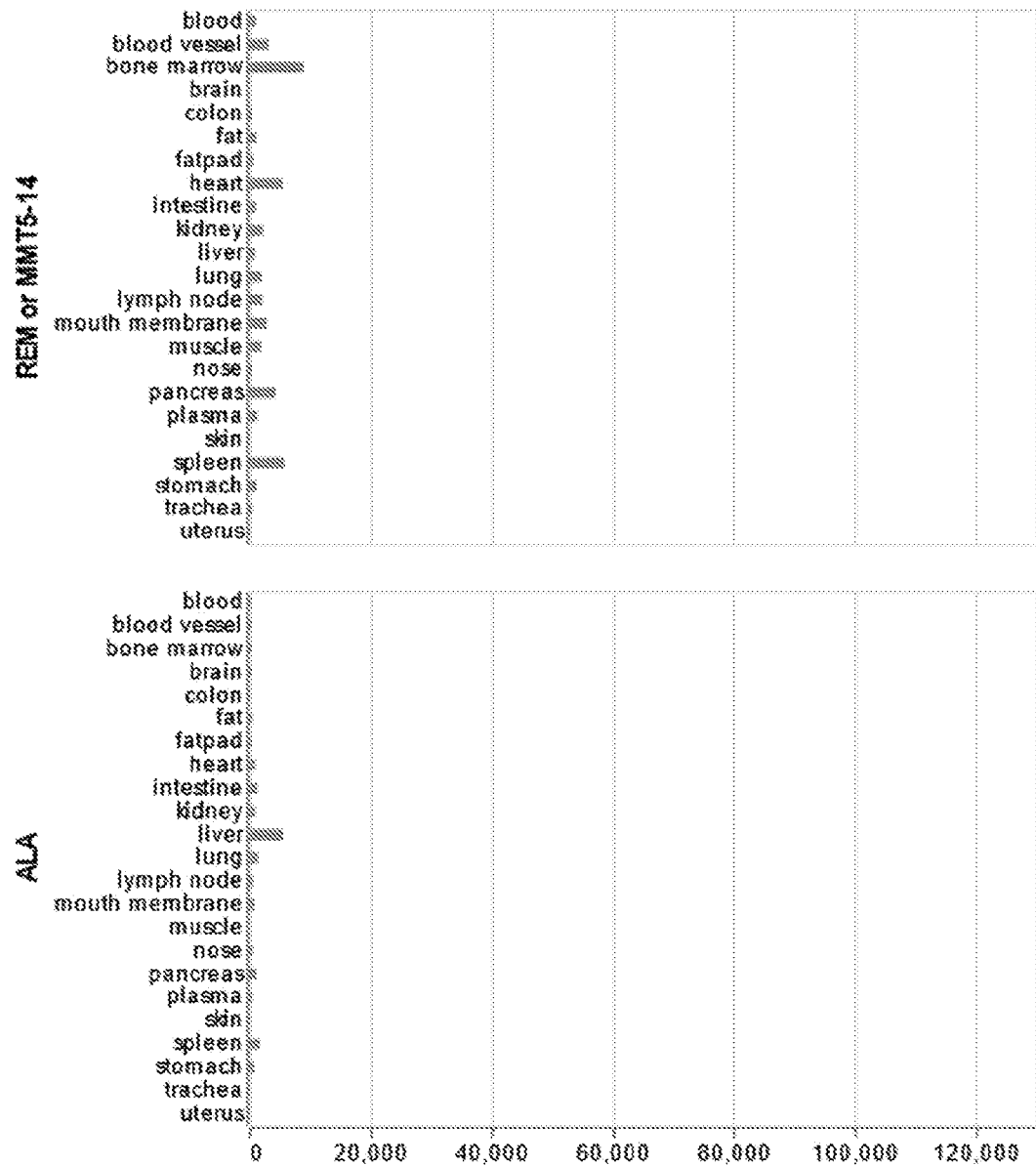

As shown in FIG. 7, all compounds were metabolized to ALA at different speeds and no other metabolites like NUC and NTP were observed. In mouse plasma, all compounds were metabolized within 10 min and the synthesized compounds (MMT4-70, MMT4-98, and MMT5-1) had similar/better stability when taking account of ALA generation. The stability of compounds in human and hamster plasma were much better with at least 20% of the parent compounds observed after 2 hr. MMT5-1 behaved best in human plasma while no significant difference among synthesized compounds was observed in hamster plasma. Overall, MMT4-70, MMT4-98, and MMT5-1 were more stable than remdesivir in different plasmas.

Example 12

Pharmacokinetics and Initial Tissue Targeting

Short-time PK test was used to compare different compounds. Five remdesivir analogs (MMT4-70, MMT4-98, MMT5-1, MMT5-14, and MMT5-15) were compared to remdesivir. The structures of MMT5-14 and MMT5-15 are shown below. Albumin nanocomplexes of the remdesivir analogs were made according to the following procedure: organic phase was prepared by dissolving the synthesized compounds (20 mg) into chloroform (1 ml). 20 ml of marketed HSA solution (5%) was then mixed with organic phase and dispersed vigorously by a rotor-stator homogenizer (Ultra-Turrax T25, 8K rpm-12K rpm, 5 min) to generate a milk-like emulsion. The emulsion was then processed by a high-pressure homogenizer (Nano DeBEE) with the parameters set as pressure=15,000 psi-20,000 psi, condensation temp=5° C., cycles=6. Remaining organic solvent in the product was removed by a rotatory evaporator. The final nano-suspension was filtered with 0.22 μm membrane and freeze dried (primary drying temp=−5° C. for 30 h and secondary drying temp=30° C. for 6 h). The vials were filled with nitrogen before sealing and stored at −20° C.

The formulations and remdesivir (marketed formulation) were i.v. administered to catheterized hamsters with dose of 10 mg/Kg. Each group had two hamsters. At different time points (0.25 hr, 1 hr, 2 hr and 4 hr), plasma was collected for future LC-MS analysis. At 4 hr time point, the hamsters were euthanized and blood and lung were collected for future LC-MS analysis.

As shown in FIG. 8A, plasma concentration change was observed for different groups. Nano-MMT5-15 and Nano-MMT5-14 had the highest stability in plasma, followed by Nano-MMT4-98 and Nano-MMT4-70. Nano-MMT5-1 and Rem were both quickly metabolized in plasma. High concentration of ALA and NUC was observed in short time points in Rem group. No NTP were tested in plasma for all groups, meaning that NTP was generated within the cells according to the known route. This was also confirmed by the blood sample at 4 hr time point (FIG. 8B), where synthesized compounds had a 10-15 fold higher concentration of NTP than remdesivir. The highest concentration of the parent compound in blood was observed in Nano-MMT5-15, which demonstrated the best stability of this compound. The lung tissue was the most important virus target. Higher concentration of the parent compound (2-10 fold) was observed for all synthesized compounds except MMT5-1. This higher stability also resulted in higher active metabolite NTP in lung tissue with 2-5 fold increase. For similar structures (MMT4-70 vs MMT4-98, MMT5-14 vs MMT5-15), more stable compounds inclined to have higher parent compound and ALA, while lower late-phase metabolite like NUC and NTP.

Example 13

Tissue Targeting of Formulations

MMT5-14 was selected for further PK analysis due to its balanced stability and high concentration in blood and lung tissue. Besides nano formulation, a cyclodextrin-based formulation was also prepared for MMT5-14. Briefly, 2% cremophor and 2% ethanol was added to dissolve the MMT5-14, followed by mixing with 20% SBE-CD. Two formulated MMT5-14 compounds together with remdesivir (marketed formulation) were i.v. administered to catheterized hamsters with dose as 10 mg/Kg. Each group has two hamsters. At different time points (0.5 hr, 1 hr, 4 hr, 7 hr and 24 hr), the hamsters were euthanized and samples including plasma, blood, blood vessel, heart, intestine, kidney, lung, lymph node, spleen, trachea, and others were collected for future LC-MS analysis.

The concentration-time profiles for different administration groups and tissues are shown in FIG. 9. Through all tissues, remdesivir parent compound was quickly metabolized while the other two groups (MMT5-14, Nano-MMT5-14) had much higher parent concentration at short time points. No significance was observed between MMT5-14 and Nano-MMT5-14 groups for most tissues except in blood vessel, kidney, and trachea, higher the parent compound was observed in MMT5-14 group. A similar trend was also found in ALA metabolite change with higher ALA metabolites were observed in both MMT5-14 and Nano-MMT5-14 groups. However, for late-phase metabolites NUC, high concentration was observed in several tissues for remdesivir group like heart and trachea. For the active metabolite NTP, remdesivir group had better accumulation in blood vessel, heart, and lymph node, while MMT5-14 and Nano-MMT5-14 groups behaved better in blood, lung, and spleen.

Figure 11B:
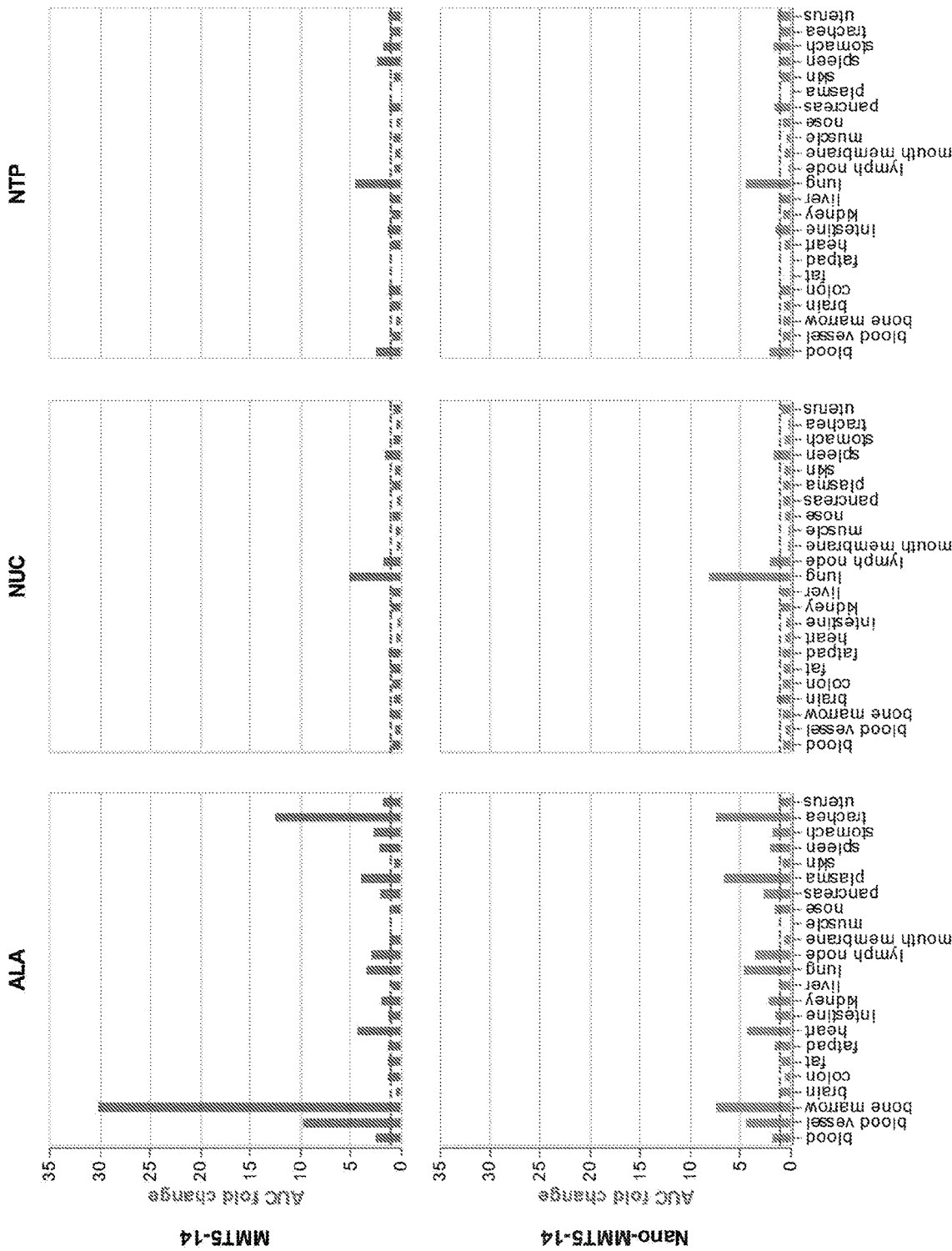

After calculating the AUC for these concentration-time plots, clear comparison among different tissues can be observed in FIG. 10. For the parent compound and ALA, both MMT5-14 and Nano-MMT5-14 had higher AUCs among all analyzed tissues. Much higher metabolite accumulation was observed in kidney for NUC and NTP, which can be explained by the higher specific metabolism enzyme in this tissue. To further compare formulated MMT5-14 groups with remdesivir, AUC fold is shown in FIG. 11. For NUC and NTP metabolites, the highest increase was observed in lung tissue with 4-5 fold change. Tissues like blood and spleen were also shown to have 2-3 fold increase in NTP metabolite.

Example 14

Cellular Uptake of Formulations

THP-1, Calu-3, HUVEC, and AMJ2-C11 cells (0.5-1×$10^6$) were cultured in 12-well plate and incubated for 12 h before any treatment. 10 µM remdesivir, MMT5-14, and nano-MMT5-14 were added into the cells and incubated for 2 h, 6 h, 12 h, and 24 h. At different time points, cells were collected by adding trypsin and the drug-containing medium was removed by washing the cell suspension with ice-cold PBS three times. Ice-cold 70% methanol (200 µl) was added to isolated cells after the last washing and the cell solution was stored at −20° C. overnight. Extracts were centrifuged at 15,000 g for 15 min and supernatants were tested by LC-MS.

Figure 12:
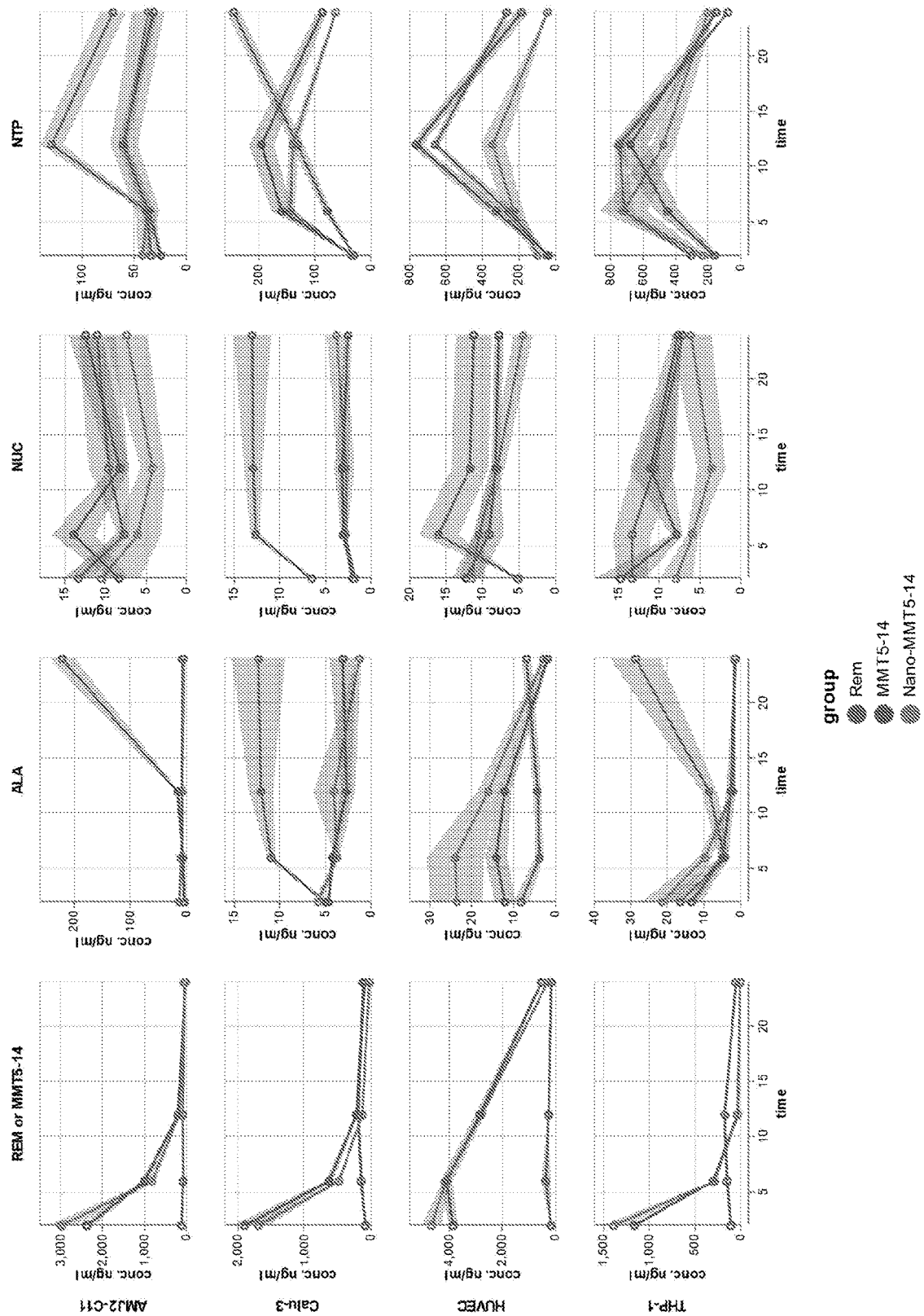

The parent compound and related active metabolites were tested at different time points (FIG. 12). The parent compound of MMT5-14 and nano-MMT5-14 showed much higher concentration in all cells and slowly decreased to low level as incubation time increased. The alanine metabolite, on the contrary, showed higher concentrations for remdesivir in AMJ2-C11, Calu-3, and THP-1 cells. The instability of remdesivir also partially led to the higher generation of NTP as seen in AMJ2-C11 and Calu-3 cells. However, a similar amount of NTP was also seen for MMT5-14 and remdesivir in HUVEC and THP-1 cells. MMT5-14 and Nano-MMT5-14 showed similar cellular uptake behavior while the overall generation of NUC and NTP was lower in Nano-MMT5-14 group, which may be due to higher stability of the compound in the nano-formulation.

REFERENCES

1. Wang, M., et al., Remdesivir and chloroquine effectively inhibit the recently emerged novel coronavirus (2019-nCoV) in vitro. Cell Res, 2020. 30(3): p. 269-271.
2. Warren, T. K., et al., Therapeutic efficacy of the small molecule GS-5734 against Ebola virus in rhesus monkeys. Nature, 2016. 531(7594): p. 381-5.
3. Sheahan, T. P. and A. C. Sims, Broad-spectrum antiviral GS-5734 inhibits both epidemic and zoonotic coronaviruses. Sci Transl Med, 2017. 9(396): p. eaal3653.
4. Sheahan, T. P., et al., Comparative therapeutic efficacy of remdesivir and combination lopinavir, ritonavir, and interferon beta against MERS-CoV. Nat Commun, 2020. 11(1): p. 222.
5. de Wit, E., et al., Prophylactic and therapeutic remdesivir (GS-5734) treatment in the rhesus macaque model of MERS-CoV infection. Proc Natl Acad Sci USA, 2020. 117(12): p. 6771-6776.
6. Mulangu, S., et al., A Randomized, Controlled Trial of Ebola Virus Disease Therapeutics. N Engl J Med, 2019. 381(24): p. 2293-2303.
7. Holshue, M. L., et al., First Case of 2019 Novel Coronavirus in the United States. N Engl J Med, 2020. 382(10): p. 929-936.
8. Available from: https://clinicaltrials.gov/.
9. Cao, B. Mild/Moderate 2019-nCoV Remdesivir RCT Feb. 12, 2020]; Available from: https://clinicaltrials.gov/ct2/show/NCT04252664.
10. Sheahan, T. P. and A. C. Sims, Broad-spectrum antiviral GS-5734 inhibits both epidemic and zoonotic coronaviruses. Sci Transl Med, 2017. 9(396): p. 1-10.
11. Li, B., et al., Butyrylcholinesterase, paraoxonase, and albumin esterase, but not carboxylesterase, are present in human plasma. Biochem Pharmacol, 2005. 70(11): p. 1673-84.
12. Li, F., et al., Different Nanoformulations Alter the Tissue Distribution of Paclitaxel, Which Aligns with Reported Distinct Efficacy and Safety Profiles. Mol Pharm, 2018. 15(10): p. 4505-4516.
13. Luo, R., et al., Distinct biodistribution of doxorubicin and the altered dispositions mediated by different liposomal formulations. Int J Pharm, 2017. 519(1-2): p. 1-10.
14. Li, C., et al., Recent progress in drug delivery. Acta Pharm Sin B, 2019. 9(6): p. 1145-1162.
15. D'Mello, S. R., et al., The evolving landscape of drug products containing nanomaterials in the United States. Nat Nanotechnol, 2017. 12(6): p. 523-529.
16. Samad, A., Y. Sultana, and M. Aqil, Liposomal drug delivery systems: an update review. Curr Drug Deliv, 2007. 4(4): p. 297-305.
17. Yong, S. B., et al., Mononuclear phagocytes as a target, not a barrier, for drug delivery. J Control Release, 2017. 259: p. 53-61.
18. Qin, L., et al., Polymeric micelles for enhanced lymphatic drug delivery to treat metastatic tumors. J Control Release, 2013. 171(2): p. 133-42.
19. Davies, B. and T. Morris, Physiological parameters in laboratory animals and humans. Pharm Res, 1993. 10(7): p. 1093-5.
20. Nikolic, V., Administration Routes for Nano Drugs and Characterization of Nano Drug Loading. 2019, Elsevier. p. 587-625.
21. Sercombe, L., et al., Advances and Challenges of Liposome Assisted Drug Delivery. Front Pharmacol, 2015. 6: p. 286.
22. Ingle, A. P., et al., Chapter 15—Nanotechnological applications for the control of pulmonary infections, in The Microbiology of Respiratory System Infections, K. Kon and M. Rai, Editors. 2016, Academic Press. p. 223-235.

23. Wang, J. and P. Li, Pulmonary surfactant-biomimetic nanoparticles potentiate heterosubtypic influenza immunity. Science, 2020. 367(6480): p. eaau0810.
24. https://www.fda.gov/news-events/press-announcements/fda-approves-new-antibacterial-drug-treat-serious-lung-disease-using-novel-pathway-spur-innovation. (accessed: Mar. 30, 2020).
25. Siegel, D., et al., Discovery and Synthesis of a Phosphoramidate Prodrug of a Pyrrolo[2,1-f][triazin-4-amino] Adenine C-Nucleoside (GS-5734) for the Treatment of Ebola and Emerging Viruses. Journal of Medicinal Chemistry, 2017. 60(5): p. 1648-1661.
26. Miele, E., et al., Albumin-bound formulation of paclitaxel (Abraxane ABI-007) in the treatment of breast cancer. Int J Nanomedicine, 2009. 4: p. 99-105.
27. Rudokas, M., et al., Liposome Delivery Systems for Inhalation: A Critical Review Highlighting Formulation Issues and Anticancer Applications. Med Princ Pract, 2016. 25 Suppl 2: p. 60-72.
28. Muralidharan, P., et al., Inhalable nanoparticulate powders for respiratory delivery. Nanomedicine, 2015. 11(5): p. 1189-99.
29. Mehta, P., Dry Powder Inhalers: A Focus on Advancements in Novel Drug Delivery Systems. J Drug Deliv, 2016. 2016: p. 8290963.
30. Pilcer, G. and K. Amighi, Formulation strategy and use of excipients in pulmonary drug delivery. Int J Pharm, 2010. 392(1-2): p. 1-19.
31. Emami, F., S. J. Mostafavi Yazdi, and D. H. Na, Poly(lactic acid)/poly(lactic-co-glycolic acid) particulate carriers for pulmonary drug delivery. Journal of Pharmaceutical Investigation, 2019. 49(4): p. 427-442.
32. Slusarczyk, M., et al., Synthesis and biological evaluation of 6-substituted-5-fluorouridine ProTides. Bioorganic & Medicinal Chemistry, 2018. 26(3): p. 551-565.
33. Dominique, C., M. Christopher, and B. Jan, Aryloxy Phosphoramidate Triesters as ProTides. Mini-Reviews in Medicinal Chemistry, 2004. 4(4): p. 371-381.
34. van der Vusse, G. J., Albumin as Fatty Acid Transporter. Drug Metabolism and Pharmacokinetics, 2009. 24(4): p. 300-307.

All publications and patents mentioned in the above specification are herein incorporated by reference. Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

We claim:

1. A compound of Formula I,

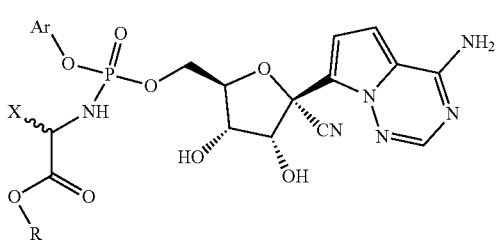

(I)

wherein:

X is or comprises proteinogenic amino acid side chain;

R is a lipid chain comprising 10 to 40 carbons; and

Ar is an unsubstituted aryl or heteroaryl.

2. The compound of claim 1, wherein X is an alanine side chain.

3. The compound of claim 1, wherein X is a tryptophan side chain or a phenylalanine side chain.

4. The compound of claim 1, wherein X is an amino acid side chain selected from the group consisting of: alanine, phenylalanine, valine, leucine, isoleucine, methionine, tryptophan, proline, glycine, cysteine, glutamine, asparagine, serine, tyrosine, and threonine.

5. The compound of claim 1, wherein R is a lipid chain comprising 10 to 20 carbons.

6. The compound of claim 1, wherein Ar is an unsubstituted phenyl or naphthyl.

7. The compound of claim 1, wherein Ar is selected from

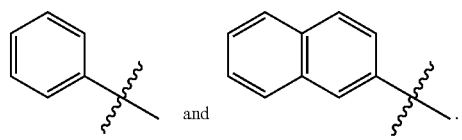 [SMILES: *c1ccccc1 ; *c1ccc2ccccc2c1]

and

8. The compound of claim 1, wherein the compound is a compound of Formula Ia:

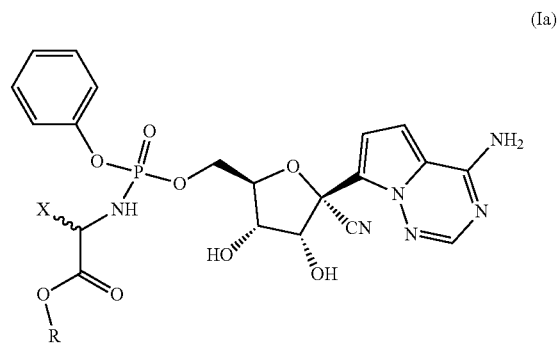

(Ia)

wherein:

X is or comprises proteinogenic amino acid side chain; and

R is a lipid chain comprising 10 to 40 carbons.

9. The compound of claim 8, wherein X is an amino acid side chain selected from the group consisting of: alanine, phenylalanine, valine, leucine, isoleucine, methionine, tryptophan, proline, glycine, cysteine, glutamine, asparagine, serine, tyrosine, and threonine.

10. The compound of claim 8, wherein X is an alanine side chain.

11. The compound of claim 8, wherein R is a lipid chain comprising 10 to 20 carbons.

12. A compound of Formula II:

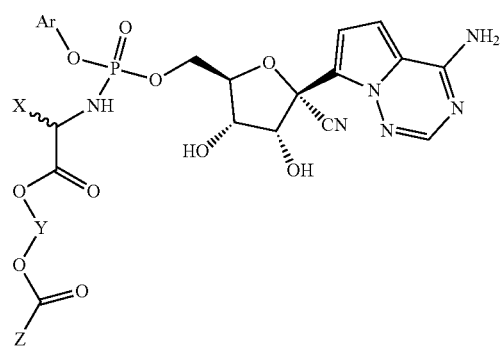

wherein:
X is or comprises proteinogenic amino acid side chain;
Y is $C_2$-$C_{20}$ alkylene or $C_2$-$C_{20}$ alkenylene; and
Z is $C_4$-$C_{40}$ alkyl, $C_4$-$C_{40}$ alkenyl, or $C_2$-$C_{20}$ alkynyl.

13. The compound of claim 12, wherein X is an amino acid side chain selected from the group consisting of: alanine, phenylalanine, valine, leucine, isoleucine, methionine, tryptophan, proline, glycine, cysteine, glutamine, asparagine, serine, tyrosine, and threonine.

14. The compound of claim 12, wherein Y is $C_4$-$C_{20}$ alkylene.

15. The compound of claim 12, wherein Z is $C_4$-$C_{20}$ alkyl or $C_4$-$C_{20}$ alkenyl.

16. A compound of claim 1 selected from the group consisting of:

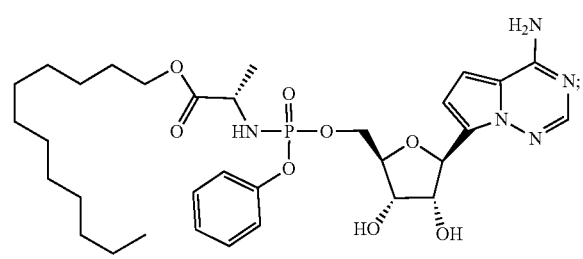

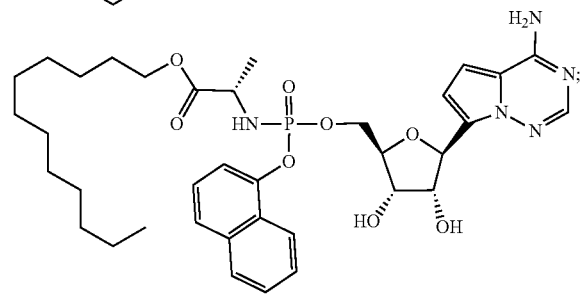

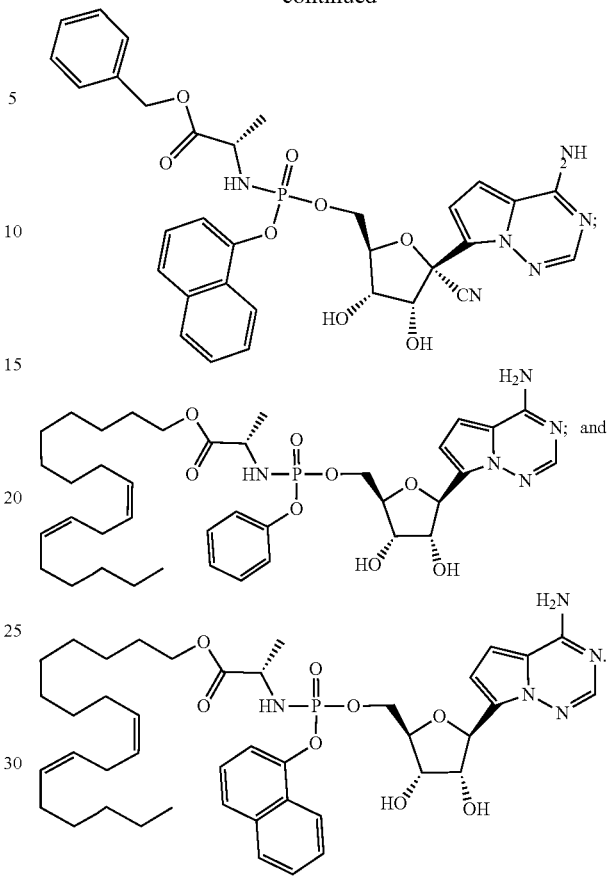

17. A composition comprising an effective amount of a compound of claim 1, and a pharmaceutically acceptable carrier.

18. A method of treating a subject comprising:
administering or providing a composition to a subject infected with a virus, wherein the composition comprises:
a) a remdesivir analog,
b) a remdesivir analog, and a surfactant, a cyclodextrin, or a combination thereof,
c) a plurality of nanoparticles each comprising albumin and a remdesivir analog, and/or
d) a plurality of liposomes each comprising lipids forming a bilayer and a remdesivir analog, and/or
e) a plurality of microparticles each comprising: i) poly(lactic acid) (PLA) and/or poly(lactic-co-glycolic acid) (PLGA), and ii) a remdesivir analog,
wherein each remdesivir analog is independently a compound of claim 1.

* * * * *